(12) United States Patent
Odani et al.

(10) Patent No.: US 11,394,057 B2
(45) Date of Patent: Jul. 19, 2022

(54) ELECTROLYTE FOR SECONDARY BATTERY, SECONDARY BATTERY, BATTERY PACK, ELECTRIC VEHICLE, ELECTRIC POWER STORAGE SYSTEM, ELECTRIC TOOL AND ELECTRONIC DEVICE

(71) Applicant: MURATA MANUFACTURING CO., LTD., Kyoto (JP)

(72) Inventors: Toru Odani, Kyoto (JP); Katsuaki Kawasumi, Kyoto (JP); Kazumasa Takeshi, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 296 days.

(21) Appl. No.: 16/540,749

(22) Filed: Aug. 14, 2019

(65) Prior Publication Data
US 2020/0083564 A1    Mar. 12, 2020

Related U.S. Application Data

(63) Continuation of application No. PCT/JP2017/036250, filed on Oct. 5, 2017.

(30) Foreign Application Priority Data

Feb. 15, 2017  (JP) .............................. JP2017-025963

(51) Int. Cl.
| | |
|---|---|
| *H01M 10/0568* | (2010.01) |
| *H01M 10/0525* | (2010.01) |
| *H01M 10/0569* | (2010.01) |
| *H01M 10/0567* | (2010.01) |

(Continued)

(52) U.S. Cl.
CPC ... *H01M 10/0568* (2013.01); *H01M 10/0525* (2013.01); *H01M 10/0565* (2013.01); *H01M 10/0567* (2013.01); *H01M 10/0569* (2013.01); *H01M 2004/027* (2013.01); *H01M 2004/028* (2013.01); *H01M 2300/0022* (2013.01);
(Continued)

(58) Field of Classification Search
CPC ......... H01M 10/0568; H01M 10/0525; H01M 10/0565; H01M 10/0567; H01M 10/0569; H01M 2004/027; H01M 2004/028; H01M 2300/0022; H01M 2300/0051; H01M 2300/0054
See application file for complete search history.

(56) References Cited

U.S. PATENT DOCUMENTS

| | | | | |
|---|---|---|---|---|
| 2012/0316716 A1* | 12/2012 | Odani | ................. | H01M 10/052 701/22 |
| 2016/0126592 A1* | 5/2016 | Saito | ................. | H01M 10/0525 429/338 |

FOREIGN PATENT DOCUMENTS

| | | |
|---|---|---|
| CN | 102820483 | 12/2012 |
| CN | 105009347 | 10/2015 |
| JP | 2001307738 A | 11/2001 |

(Continued)

OTHER PUBLICATIONS

International Search Report for Application No. PCT/JP2017/036250, dated Dec. 26, 2017.

(Continued)

*Primary Examiner* — Osei K Amponsah
(74) *Attorney, Agent, or Firm* — K&L Gates LLP

(57) ABSTRACT

A secondary battery includes a positive electrode, a negative electrode, and an electrolytic solution containing a sulfonamide compound.

17 Claims, 6 Drawing Sheets

(51) Int. Cl.
*H01M 10/0565* (2010.01)
*H01M 4/02* (2006.01)
(52) U.S. Cl.
CPC .............. *H01M 2300/0051* (2013.01); *H01M 2300/0054* (2013.01)

(56) References Cited

FOREIGN PATENT DOCUMENTS

| JP | 2016192382 A | 11/2016 |
| JP | 2017073318 A | 4/2017 |
| WO | 2014125946 A1 | 8/2014 |
| WO | 2014/125946 | 2/2017 |

OTHER PUBLICATIONS

Japanese Office Action dated Jun. 16, 2020 in corresponding Japanese Application No. 2017-025963.
Chinese Office Action dated Dec. 24, 2021 in corresponding Chinese Application No. 201780086484.8.

* cited by examiner

ELECTROLYTE FOR SECONDARY BATTERY, SECONDARY BATTERY, BATTERY PACK, ELECTRIC VEHICLE, ELECTRIC POWER STORAGE SYSTEM, ELECTRIC TOOL AND ELECTRONIC DEVICE

CROSS-REFERENCE TO RELATED APPLICATIONS

The present application is a continuation of PCT patent application no. PCT/JP2017/036250, filed on Oct. 5, 2017, which claims priority to Japanese Application No. 2017-025963, filed on Feb. 15, 2017, the entire contents of which are incorporated herein by reference.

TECHNICAL FIELD

The present technology relates to an electrolytic solution to be used in a secondary battery, a secondary battery including the electrolytic solution, and a battery pack, an electrically driven vehicle, an electric power storage system, an electric tool, and an electronic device including the secondary battery.

BACKGROUND ART

A variety of electronic devices such as mobile phones and personal digital assistants (PDAs) are widely used, and there is a demand for downsizing, weight saving, and prolonged lifetime of the electronic devices. Hence, the development of batteries, particularly secondary batteries which are small and lightweight and capable of providing a high energy density as a power source is underway.

It is investigated to apply secondary batteries not only to the electronic devices but also to other applications. Examples thereof include battery packs detachably mounted on electronic devices, electrically driven vehicles such as electric vehicles, electric power storage systems such as household electric power servers, and electric tools such as electric drills.

These secondary batteries include an electrolytic solution together with a positive electrode and a negative electrode. Various investigations on the composition of electrolytic solution have been conducted since the composition of electrolytic solution greatly affects the battery characteristics.

Specifically, in order to improve high temperature characteristics and the like, a compound having a sulfonamide structure is contained in the electrolytic solution (see, for example, Patent Documents 1 to 3).

PRIOR ART DOCUMENTS

Patent Documents

Patent Document 1: Japanese Patent Application Laid-Open No. 2007-172990
Patent Document 2: Japanese Patent Application Laid-Open No. 2010-090068
Patent Document 3: International Publication No. 2014/125946

SUMMARY OF THE INVENTION

Electronic devices and the like have been sophisticated and multi-functioned more and more. The frequency of use of electronic devices and the like have increased as well as the use environment of the electronic devices and the like have expanded. Hence, there is still room for improvement with regard to the battery characteristics of secondary batteries.

Accordingly, it is desirable to provide an electrolytic solution for secondary battery capable of providing excellent battery characteristics, a secondary battery, a battery pack, an electrically driven vehicle, an electric power storage system, an electric tool, and an electronic device.

An electrolytic solution for secondary battery according to an embodiment of the present technology contains a sulfonamide compound represented by the following Formula (1).

[Chem. 1]

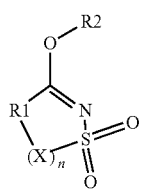

R1 represents either a divalent hydrocarbon group or a divalent halogenated hydrocarbon group. R2 represents any of a hydrogen group (—H), a monovalent hydrocarbon group, a monovalent nitrogen-containing hydrocarbon group, a monovalent oxygen-containing hydrocarbon group, a monovalent sulfur-containing hydrocarbon group, a monovalent halogenated hydrocarbon group, and a monovalent group in which two or more kinds among these groups are bonded to each other. X represents any of an ether bond (—O—), a thio bond (—S—), and an amine bond (—NR3-), where R3 represents either of a hydrogen group or a monovalent hydrocarbon group. n represents either 0 or 1.

A secondary battery according to an embodiment of the present technology includes a positive electrode, a negative electrode, and an electrolytic solution, and the electrolytic solution has a configuration similar to that of the above-described electrolytic solution for secondary battery according to an embodiment of the present technology.

A battery pack, an electrically driven vehicle, an electric power storage system, an electric tool, and an electronic device according to an embodiment of the present technology each include a secondary battery, and the secondary battery has a configuration similar to that of the above-described secondary battery according to an embodiment of the present technology.

Here, a "divalent hydrocarbon group" is a general term for divalent groups composed of carbon (C) and hydrogen (H). A "monovalent hydrocarbon group" is a general term for monovalent groups composed of carbon and hydrogen. The divalent hydrocarbon group and the monovalent hydrocarbon group may each have one or two or more carbon-carbon unsaturated bonds (either or both of a carbon-carbon double bond and a carbon-carbon triple bond) or may not have the carbon-carbon unsaturated bonds. In addition, the divalent hydrocarbon group and the monovalent hydrocarbon group may each be linear, branched having one or two or more side chains, or cyclic.

A "divalent halogenated hydrocarbon group" is a general term for groups in which the above-described divalent hydrocarbon groups are halogenated. A "monovalent halogenated hydrocarbon group" is a general term for groups in which the above-described monovalent hydrocarbon groups are halogenated.

A "monovalent nitrogen-containing hydrocarbon group" is a general term for monovalent groups composed of nitrogen (N) together with carbon and hydrogen. A "monovalent oxygen-containing hydrocarbon group" is a general term for monovalent groups composed of oxygen (O) together with carbon and hydrogen. A "monovalent sulfur-containing hydrocarbon group" is a general term for monovalent groups composed of sulfur (S) together with carbon and hydrogen.

The value of "n" is either of 0 or 1 as described above, and thus X may be present or may not be present. In a case in which X is not present, the carbon atom in R1 (divalent hydrocarbon group) and the sulfur atom in the sulfonyl group (—S(=O)$_2$—) are bonded to each other.

According to each of the electrolytic solution for secondary battery and the secondary battery of an embodiment of the present technology, excellent battery characteristics can be attained since the electrolytic solution contains the sulfonamide compound described above. In addition, similar effects can be attained in each of the battery pack, the electrically driven vehicle, the electric power storage system, the electric tool, and the electronic device according to an embodiment of the present technology.

Incidentally, the effects described here are not necessarily limited and may be any effect described in the present technology.

MODE FOR CARRYING OUT THE INVENTION

Figure 1:
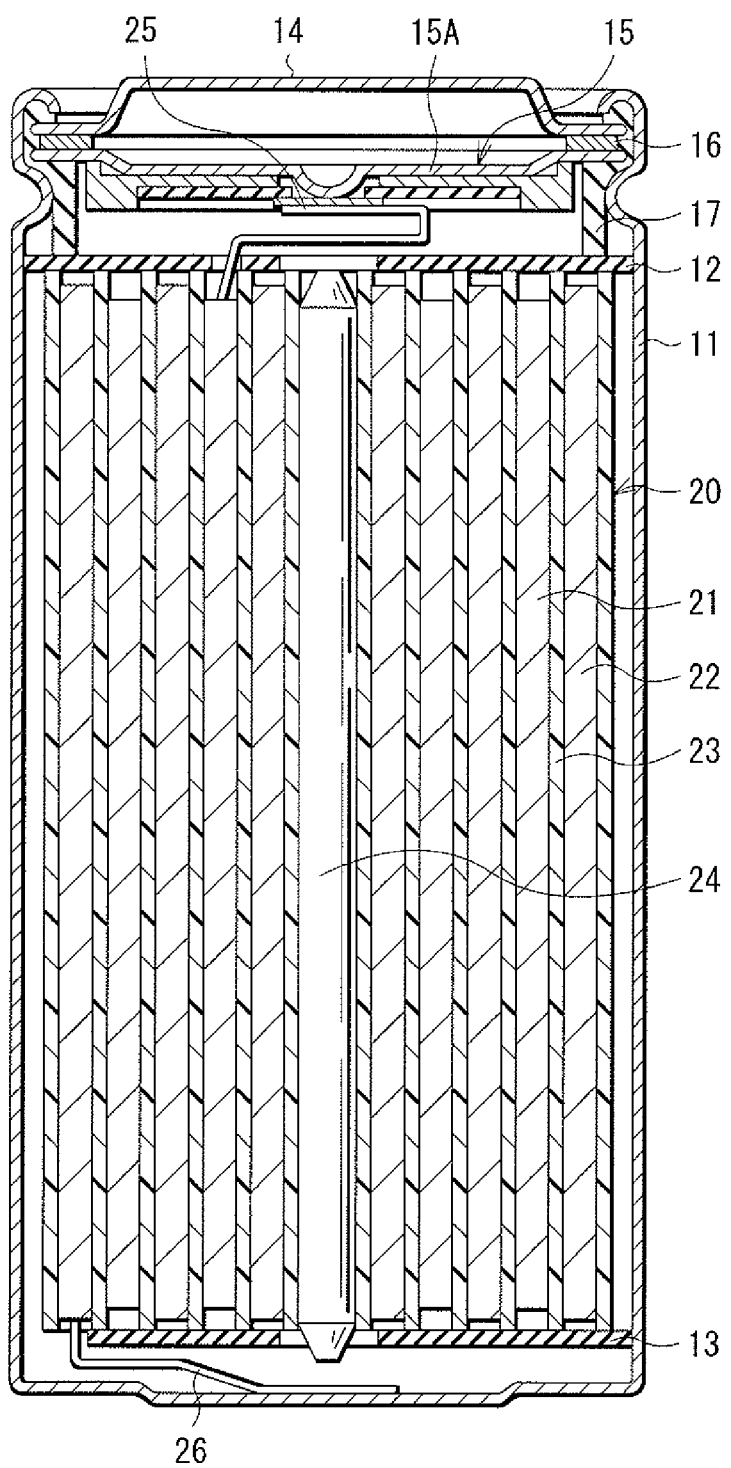
FIG. 1 is a cross-sectional diagram illustrating the configuration of a secondary battery (cylindrical type) according to an embodiment of the present technology.

Hereinafter, an embodiment of the present technology will be described in detail with reference to the drawings. Incidentally, the order of description is as follows.

1. Electrolytic solution for secondary battery
 1-1. Configuration
 1-2. Production method
 1-3. Action and effect
2. Secondary battery
 2-1. Lithium ion secondary battery (cylindrical type)
 2-2. Lithium ion secondary battery (laminated film type)
 2-3. Lithium metal secondary battery
3. Application of secondary battery
 3-1. Battery pack (single battery)
 3-2. Battery pack (assembled battery)
 3-3. Electrically driven vehicle
 3-4. Electric power storage system
 3-5. Electric tool <1. Electrolytic Solution for Secondary Battery>

First, an electrolytic solution for secondary battery of an embodiment of the present technology will be described.

The electrolytic solution for secondary battery (hereinafter simply referred to as "electrolytic solution") to be described here is used in, for example, a secondary battery such as a lithium ion secondary battery. However, the kind of secondary battery in which the electrolytic solution is used is not limited to a lithium ion secondary battery.

<1-1. Configuration>

The electrolytic solution contains any one kind or two or more kinds among sulfonamide compounds represented by the following Formula (1). In other words, the kind of sulfonamide compound contained in the electrolytic solution may be only one kind or two or more kinds.

[Chem. 2]

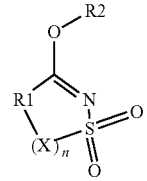

(1)

R1 represents either a divalent hydrocarbon group or a divalent halogenated hydrocarbon group. R2 represents any of a hydrogen group, a monovalent hydrocarbon group, a monovalent nitrogen-containing hydrocarbon group, a monovalent oxygen-containing hydrocarbon group, a monovalent sulfur-containing hydrocarbon group, a monovalent halogenated hydrocarbon group, and a monovalent group in which two or more kinds among these groups are bonded to each other. X represents any of an ether bond, a thio bond, and an amine bond (—NR3-), where R3 represents either of a hydrogen group or a monovalent hydrocarbon group. n represents either 0 or 1.

[Sulfonamide Compound]

As illustrated in Formula (1), a sulfonamide compound includes a cyclic moiety composed of a sulfonamide structure (=N—S(=O)$_2$—) and the like and a branch moiety (—O—R2) bonded to the cyclic moiety.

The electrolytic solution contains a sulfonamide compound because the chemical stability of the electrolytic solution is improved. This suppresses the decomposition reaction of the electrolytic solution as well as the generation of gas due to the decomposition reaction of the electrolytic solution, and thus the battery characteristics of a secondary battery including this electrolytic solution are improved. In this case, the decomposition reaction of the electrolytic solution is sufficiently suppressed as well as the generation of gas is sufficiently suppressed particularly even when the secondary battery is used (charged and discharged) in a severe environment such as a high temperature environment and a low temperature environment as well as the secondary battery is preserved in these environments, and thus the battery characteristics are greatly improved.

The details of the configuration of a sulfonamide compound are as follows.

(Details of R1)

R1 represents either a divalent hydrocarbon group or a divalent halogenated hydrocarbon group as described above.

A "divalent hydrocarbon group" is a general term for divalent groups composed of carbon and hydrogen as described above. The divalent hydrocarbon group may be a group (divalent unsaturated hydrocarbon group) having one or two or more carbon-carbon unsaturated bonds or a group (divalent saturated hydrocarbon group) not having the carbon-carbon unsaturated bonds. The carbon-carbon unsaturated bond is, for example, either or both of a carbon-carbon double bond and a carbon-carbon triple bond. In addition, the divalent hydrocarbon group may be linear, branched having one or two or more side chains, or cyclic.

A "divalent halogenated hydrocarbon group" is a general term for groups in which divalent hydrocarbon groups are halogenated as described above.

(Divalent Hydrocarbon Group)

Examples of the divalent hydrocarbon group include a divalent saturated hydrocarbon group, a divalent unsaturated hydrocarbon group, and a divalent group (divalent bond group) in which two or more kinds among these are bonded to each other.

Examples of the divalent saturated hydrocarbon group include an alkylene group, a cycloalkylene group, and a divalent group (divalent saturated bond group) in which two or more kinds among these are bonded to each other. Examples of the divalent unsaturated hydrocarbon group include an alkenylene group, an alkynylene group, an arylene group, and a divalent group (divalent unsaturated bond group) in which two or more kinds among these are bonded to each other. Examples of the divalent bond group include a divalent group in which an alkylene group and an alkenylene group are bonded to each other, a divalent group in which an alkylene group and an alkynylene group are bonded to each other, a divalent group in which an alkylene group and a cycloalkylene group are bonded to each other, a divalent group in which an alkylene group and an arylene group are bonded to each other, and a divalent group in which a cycloalkylene group and an arylene group are bonded to each other.

The kind of alkylene group is not particularly limited, and examples thereof include a methylene group, an ethylene group, a propylene group, a butylene group, a pentylene group, a hexylene group, a heptylene group, an octylene group, a nonylene group, and a decylene group.

The kind of cycloalkylene group is not particularly limited, and examples thereof include a cyclopropylene group, a cyclobutylene group, a cyclopentylene group, a cyclohexylene group, and a cyclodecylene group.

The kind of divalent saturated bond group is not particularly limited, and examples thereof include a divalent group in which a methylene group and a cyclopropylene group are bonded to each other and a divalent group in which a methylene group and a cyclobutylene group are bonded to each other.

The kind of alkenylene group is not particularly limited, and examples thereof include an ethenylene group, a propenylene group, a butenylene group, a pentenylene group, a hexenylene group, a heptenylene group, an octenylene group, a nonenylene group, and a decenylene group.

The kind of alkynylene group is not particularly limited, and examples thereof include an ethynylene group, a propynylene group, a butynylene group, a pentynylene group, a hexynylene group, a heptynylene group, an octynylene group, a nonylylene group, and a decynylene group.

The kind of arylene group is not particularly limited, and examples thereof include a phenylene group and a naphthylene group.

The kind of divalent unsaturated bond group is not particularly limited, and examples thereof include a divalent group in which an ethenylene group and a phenylene group are bonded to each other and a divalent group in which an ethynylene group and a phenylene group are bonded to each other.

The kind of divalent bond group is not particularly limited, and examples thereof include a divalent group in which a methylene group and an ethenylene group are bonded to each other, a divalent group in which a methylene group and an ethynylene group are bonded to each other, a divalent group in which a cyclohexylene group and a phenylene group are bonded to each other, and a divalent group in which a methylene group and a phenylene group are bonded to each other.

The number of carbon atoms in the divalent hydrocarbon group is not particularly limited but, among others, is preferably 18 or less. This is because the solubility, compatibility and the like of the sulfonamide compound are secured.

In detail, the number of carbon atoms in the alkylene group is not particularly limited but, among others, is preferably 1 to 18 and more preferably 1 to 4. The number of carbon atoms in each of the alkenylene group and the alkynylene group is not particularly limited but, among others, is preferably 2 to 18 and more preferably 2 to 4. The number of carbon atoms in the cycloalkylene group is not particularly limited but, among others, is preferably 3 to 18 and more preferably 3 to 8. The number of carbon atoms in the arylene group is not particularly limited but, among others, is preferably 6 to 18 and more preferably 6 to 10.

(Divalent Halogenated Hydrocarbon Group)

The divalent halogenated hydrocarbon group is, for example, a group in which one or two or more hydrogen groups in a divalent hydrocarbon group are substituted with a halogen group.

The kind of halogen group is not particularly limited and is, for example, any one kind or two or more kinds among a fluorine group (—F), a chlorine group (—Cl), a bromine group (—Br), and an iodine group (—I). In other words, the kind of halogen group contained in the divalent halogenated hydrocarbon group may be only one kind or two or more kinds. In addition, in a case in which the kind of halogen group contained in the divalent halogenated hydrocarbon group is only one kind, the number of halogen groups may be only one or two or more.

Specifically, examples of the divalent halogenated hydrocarbon group include a halogenated alkylene group, a halogenated cycloalkylene group, a halogenated alkenylene group, a halogenated alkynylene group, a halogenated arylene group, and a divalent group in which two or more kinds among these are bonded to each other. Among these, the divalent halogenated hydrocarbon group is preferably a divalent fluorinated hydrocarbon group and may be a divalent perfluorohydrocarbon group.

(Details of R2)

R2 represents any of a hydrogen group, a monovalent hydrocarbon group, a monovalent nitrogen-containing hydrocarbon group, a monovalent oxygen-containing hydrocarbon group, a monovalent sulfur-containing hydrocarbon group, a monovalent halogenated hydrocarbon group, and a monovalent group (monovalent bond group) in which two or more kinds among these groups are bonded to each other as described above.

A "monovalent hydrocarbon group" is a general term for monovalent groups composed of carbon and hydrogen as described above. The monovalent hydrocarbon group may be a group (monovalent unsaturated hydrocarbon group) having one or two or more carbon-carbon unsaturated bonds or a group (monovalent saturated hydrocarbon group) not having the carbon-carbon unsaturated bonds. In addition, the monovalent hydrocarbon group may be linear, branched having one or two or more side chains, or cyclic.

A "monovalent halogenated hydrocarbon group" is a general term for groups in which monovalent hydrocarbon groups are halogenated as described above.

A "monovalent nitrogen-containing hydrocarbon group" is a general term for monovalent groups composed of nitrogen together with carbon and hydrogen as described above. A "monovalent oxygen-containing hydrocarbon group" is a general term for monovalent groups composed of oxygen together with carbon and hydrogen as described above. A "monovalent sulfur-containing hydrocarbon group" is a general term for monovalent groups composed of sulfur together with carbon and hydrogen as described above.

(Monovalent Hydrocarbon Group)

Examples of the monovalent hydrocarbon group include a monovalent saturated hydrocarbon group, a monovalent unsaturated hydrocarbon group, and a monovalent group (monovalent hydrocarbon bond group) in which two or more kinds among these are bonded to each other.

Examples of the monovalent saturated hydrocarbon group include an alkyl group, a cycloalkyl group, and a monovalent group (monovalent saturated bond group) in which two or more kinds among these are bonded to each other. Examples of the monovalent unsaturated hydrocarbon group include an alkenyl group, an alkynyl group, an aryl group, and a monovalent group (monovalent unsaturated bond group) in which two or more kinds among these are bonded to each other. Examples of the monovalent hydrocarbon bond group include a monovalent group in which an alkyl group and an alkenyl group are bonded to each other, a monovalent group in which an alkyl group and an alkynyl group are bonded to each other, a monovalent group in which an alkyl group and a cycloalkyl group are bonded to each other, a monovalent group in which an alkyl group and an aryl group are bonded to each other, and a monovalent group in which a cycloalkyl group and an aryl group are bonded to each other.

The kind of alkyl group is not particularly limited, and examples thereof include a methyl group, an ethyl group, a propyl group, a butyl group, a pentyl group, a hexyl group, a heptyl group, an octyl group, a nonyl group, and a decyl group.

The kind of cycloalkyl group is not particularly limited, and examples thereof include a cyclopropyl group, a cyclobutyl group, a cyclopentyl group, a cyclohexyl group, and a cyclodecyl group.

The kind of monovalent saturated bond group is not particularly limited, and examples thereof include a monovalent group in which a methyl group and a cyclopropyl group are bonded to each other and a monovalent group in which a methyl group and a cyclobutyl group are bonded to each other.

The kind of alkenyl group is not particularly limited, and examples thereof include an ethenyl group, a propenyl group, a butenyl group, a pentenyl group, a hexenyl group, a heptenyl group, an octenyl group, a nonenyl group, and a decenyl group.

The kind of alkynyl group is not particularly limited, and examples thereof include an ethynyl group, a propynyl group, a butynyl group, a pentynyl group, a hexynyl group, a heptynyl group, an octynyl group, a nonylyl group, and a decynyl group.

The kind of aryl group is not particularly limited, and examples thereof include a phenyl group and a naphthyl group.

The kind of monovalent saturated bond group is not particularly limited, and examples thereof include a monovalent group in which an ethenyl group and a phenyl group are bonded to each other and a monovalent group in which an ethynyl group and a phenyl group are bonded to each other.

The kind of monovalent bond group is not particularly limited, and examples thereof include a monovalent group in which a methyl group and an ethenyl group are bonded to each other, a monovalent group in which a methyl group and an ethynyl group are bonded to each other, a monovalent group in which a methyl group and a phenyl group are bonded to each other, and a monovalent group in which a cyclopropyl group and a phenyl group are bonded to each other.

The number of carbon atoms in the monovalent hydrocarbon group is not particularly limited but, among others, is preferably 18 or less. This is because the solubility, compatibility and the like of the sulfonamide compound are secured.

In detail, the number of carbon atoms in the alkyl group is not particularly limited but, among others, is preferably 1 to 18 and more preferably 1 to 4. The number of carbon atoms in each of the alkenyl group and the alkynyl group is not particularly limited but, among others, is preferably 2 to 18 and more preferably 2 to 4. The number of carbon atoms in the cycloalkyl group is not particularly limited but, among others, is preferably 3 to 18 and more preferably 3 to 8. The number of carbon atoms in the aryl group is not particularly limited but, among others, is preferably 6 to 18 and more preferably 6 to 10.

(Monovalent Nitrogen-Containing Hydrocarbon Group)

The configuration of the monovalent nitrogen-containing hydrocarbon group is not particularly limited as long as it is a monovalent group composed of nitrogen together with carbon and hydrogen as described above. Specific examples of the monovalent nitrogen-containing hydrocarbon group include a monovalent group (monovalent nitrogen-containing bond group) in which one monovalent hydrocarbon group and one or two or more monovalent nitrogen-containing groups are bonded to each other, a monovalent group (monovalent amine bond group) in which one or two or more monovalent hydrocarbon groups and one or two or more amine bonds are bonded to each other, and a monovalent group (monovalent nitrogen-based bond group) in which two or more kinds among these are bonded to each other.

(Monovalent Nitrogen-Containing Bond Group)

The kind of monovalent nitrogen-containing group contained in the monovalent nitrogen-containing bond group may be only one kind or two or more kinds. In addition, the number of monovalent nitrogen-containing groups contained in the monovalent nitrogen-containing bond group may be only one or two or more.

A "monovalent nitrogen-containing group" is a general term for monovalent groups containing nitrogen as a constituent element. The kind of the monovalent nitrogen-containing group is not particularly limited, and examples thereof include a cyano group (—CN), a nitro group (—$NO_2$), an amino group (—$NH_2$), an isocyanate group (—NCO), and an amide group (—$CONH_2$—).

However, in order to distinguish the monovalent nitrogen-containing group to be described here from the monovalent oxygen-containing group and monovalent sulfur-containing group to be described later, a monovalent group containing nitrogen as a constituent element is regarded to correspond to the monovalent nitrogen-containing group.

Examples of the monovalent nitrogen-containing bond group include a monovalent group in which one alkyl group and one or two or more monovalent nitrogen-containing groups are bonded to each other, a monovalent group in which one alkenyl group and one or two or more monovalent nitrogen-containing groups are bonded to each other, a monovalent group in which one alkynyl group and one or two or more monovalent nitrogen-containing groups are bonded to each other, a monovalent group in which one cycloalkyl group and one or two or more monovalent nitrogen-containing groups are bonded to each other, and a monovalent group in which one aryl group and one or two or more monovalent nitrogen-containing groups are bonded to each other.

Here, when the monovalent group in which one alkyl group and one or two or more monovalent nitrogen-containing groups are bonded to each other described above is taken as an example, the details of the kind, number, and position of the monovalent nitrogen-containing group are, for example, as follows. First, the kind of monovalent nitrogen-containing group to be bonded to an alkyl group may be only one kind or two or more kinds as described above. Second, the number of monovalent nitrogen-containing groups to be bonded to an alkyl group may be only one or two or more as described above. For this reason, in a case in which the kind of monovalent nitrogen-containing group to be bonded to an alkyl group is only one kind, the number of monovalent nitrogen-containing groups may be only one or two or more. Third, the position of the monovalent nitrogen-containing group to be introduced into an alkyl group is not particularly limited. For this reason, the position of the monovalent nitrogen-containing group to be introduced into an alkyl group may be the end of the alkyl group or the middle of the alkyl group.

The kind of monovalent nitrogen-containing bond group is not particularly limited, and examples thereof include a monovalent group in which a cyano group is introduced into a methyl group, and a monovalent group in which a cyano group is introduced at the end of an ethyl group, a monovalent group in which a cyano group is introduced in the middle of an ethyl group, a group in which a cyano group is introduced at the end of a propyl group, a group in which a cyano group is introduced in the middle of a propyl group, a monovalent group in which a nitro group is introduced at the end of an ethyl group, a monovalent group in which an amino group is introduced at the end of an ethyl group, and a monovalent group in which an isocyanate group is introduced at the end of an ethyl group.

Incidentally, the details of the number of carbon atoms in the monovalent hydrocarbon group to be bonded to a monovalent nitrogen-containing group are, for example, as described above.

(Monovalent Amine Bond Group)

The kind of monovalent hydrocarbon group contained in the monovalent amine bond group may be only one kind or two or more kinds. In addition, the number of monovalent hydrocarbon groups contained in the monovalent amine bond group may be only one or two or more. Incidentally, in a case in which the kind of monovalent hydrocarbon group contained in the monovalent amine bond group is only one kind, the number of monovalent hydrocarbon groups may be only one or two or more.

The number of amine bonds contained in the monovalent amine bond group may be only one or two or more. In a case in which the number of amine bonds is two or more, two amine bonds adjacent to each other may be, for example, bonded to each other directly not through a monovalent hydrocarbon group or indirectly through a monovalent hydrocarbon group.

Examples of the monovalent amine bond group include a monovalent group in which one alkyl group and one amine bond are bonded to each other, a monovalent group in which one alkenyl group and one amine bond bonded to each other, a monovalent group in which one alkynyl group and one amine bond are bonded to each other, a monovalent group in which one cycloalkyl group and one amine bond are bonded to each other, a monovalent group in which one aryl group and one amine bond are bonded to each other, a monovalent group in which one alkyl group, one cycloalkyl group, and one amine bond are bonded to each other, a monovalent group in which one alkyl group, one aryl group, and one amine bond are bonded to each other, a monovalent group in which one cycloalkyl group, one aryl group, and one amine bond are bonded to each other, and a monovalent group in which two or more alkyl groups and one or more amine bonds are alternately bonded.

Here, when the monovalent group in which one or two or more alkyl groups and one or two or more amine bonds are bonded to each other described above is taken as an example, the details of the number of alkyl groups and the number of amine bonds are, for example, as follows. First, the number of alkyl groups is one as well as the number of amine bonds is one, and thus one alkyl group and one amine bond may be bonded to each other. Second, the number of alkyl groups is two or more as well as the number of amine bonds is one or more, and thus two or more alkyl groups and one or more amine bonds may be alternately bonded. Third, in a case in which the number of amine bonds is two or more, the monovalent group in which an alkyl group and an amine bond are bonded to each other may be linear or branched having one or two or more side chains. Incidentally, in a case in which the number of alkyl groups is two or more as well as the number of amine bonds is two or more, the bonding order of the two or more alkyl groups and the two or more amine bonds may be regular or random.

The kind of monovalent amine bond group is not particularly limited, and examples thereof include a monovalent group in which two methyl groups are bonded to each other through one ether bond, a monovalent group in which three methyl groups and two ether bonds are alternately bonded, a monovalent group in which two ethyl groups are bonded to each other through one ether bond, and a monovalent group in which three ethyl groups and two ether bonds are alternately bonded.

Incidentally, the details of the number of carbon atoms in the monovalent hydrocarbon group to be bonded to an amine bond are, for example, as described above.

(Monovalent Nitrogen-Based Bond Group)

The monovalent nitrogen-based bond group is a monovalent group in which a monovalent nitrogen-containing bond group and a monovalent amine bond group are bonded to each other.

The kind of monovalent nitrogen-containing bond group contained in the monovalent nitrogen-based bond group may be only one kind or two or more kinds. In addition, the number of monovalent nitrogen-containing bond groups contained in the monovalent nitrogen-based bond group may be only one or two or more. Incidentally, in a case in which the kind of monovalent nitrogen-containing bond group contained in the monovalent nitrogen-based bond group is only one kind, the number of monovalent nitrogen-containing bond groups may be only one or two or more.

The kind of monovalent amine bond group contained in the monovalent nitrogen-based bond group may be only one kind or two or more kinds. In addition, the number of monovalent amine bond groups contained in the monovalent nitrogen-based bond group may be only one or two or more. Incidentally, in a case in which the kind of monovalent amine bond group contained in the monovalent nitrogen-based bond group is only one kind, the number of monovalent amine bond groups may be only one or two or more.

The kind of monovalent nitrogen-based bond group is not particularly limited, and examples thereof include a monovalent group in which a monovalent nitrogen-containing bond group (monovalent group in which a cyano group is introduced at the end of an ethyl group) and a monovalent amine bond group (monovalent group in which three methyl groups and two amine bonds are alternately bonded) are bonded to each other.

(Monovalent Oxygen-Containing Hydrocarbon Group)

The configuration of the monovalent oxygen-containing hydrocarbon group is not particularly limited as long as it is a monovalent group composed of oxygen together with carbon and hydrogen as described above. Specifically, examples of the monovalent oxygen-containing hydrocarbon group include a monovalent group (monovalent oxygen-containing bond group) in which one monovalent hydrocarbon group and one or two or more monovalent oxygen-containing groups are bonded to each other, a monovalent group (monovalent ether bond group) in which one or two or more monovalent hydrocarbon groups and one or two or more ether bonds are bonded to each other, a monovalent group (monovalent oxygen-based bond group) in which two or more kinds among these are bonded to each other.

(Monovalent Oxygen-Containing Bond Group)

The kind of monovalent oxygen-containing group contained in the monovalent oxygen-containing bond group may be only one kind or two or more kinds. In addition, the number of monovalent oxygen-containing groups contained in the monovalent oxygen-containing bond group may be only one or two or more. Incidentally, in a case in which the kind of monovalent oxygen-containing group contained in the monovalent oxygen-containing bond group is one kind, the number of monovalent oxygen-containing groups may be only one or two or more.

A "monovalent oxygen-containing group" is a general term for monovalent groups containing oxygen as a constituent element. The kind of monovalent oxygen-containing group is not particularly limited, and examples thereof include a hydroxyl group (—OH), an aldehyde group (—CHO), and a carboxyl group (—COOH).

However, in order to distinguish the monovalent oxygen-containing group to be described here from the monovalent nitrogen-containing group and monovalent sulfur-containing group, a monovalent group which contains oxygen as a constituent element but does not contain either or both of nitrogen and sulfur as a constituent element is regarded to correspond to the monovalent oxygen-containing group.

Examples of the monovalent oxygen-containing bond group include a monovalent group in which one alkyl group and one or two or more monovalent oxygen-containing groups are bonded to each other, a monovalent group in which one alkenyl group and one or two or more monovalent oxygen-containing groups are bonded to each other, a monovalent group in which one alkynyl group and one or two or more monovalent oxygen-containing groups are bonded to each other, a monovalent group in which one cycloalkyl group and one or two or more monovalent oxygen-containing groups are bonded to each other, and a monovalent group in which one aryl group and one or two or more monovalent oxygen-containing groups are bonded to each other.

Here, when the monovalent group in which one alkyl group and one or two or more monovalent oxygen-containing groups are bonded to each other described above is taken as an example, the details of the kind, number, and position of the monovalent oxygen-containing group are, for example, as follows. First, the kind of monovalent oxygen-containing group to be bonded to an alkyl group may be only one kind or two or more kinds as described above. Second, the number of monovalent oxygen-containing groups to be bonded to an alkyl group may be only one or two or more as described above. Third, the position of the monovalent oxygen-containing group to be introduced into an alkyl group is not particularly limited. For this reason, the position of the monovalent oxygen-containing group to be introduced into an alkyl group may be the end of the alkyl group or the middle of the alkyl group.

The kind of monovalent oxygen-containing bond group is not particularly limited, and examples thereof include a monovalent group in which a hydroxyl group is introduced into a methyl group, a monovalent group in which a hydroxyl group is introduced at the end of an ethyl group, a monovalent group in which a hydroxyl group is introduced in the middle of an ethyl group, a monovalent group in which a hydroxyl group is introduced at the end of a propyl group, a monovalent group in which a hydroxyl group is introduced in the middle of a propyl group, a monovalent group in which an aldehyde group is bonded to the end of an ethyl group, and a monovalent group in which a carboxyl group is bonded to the end of an ethyl group.

Incidentally, the details of the number of carbon atoms in the monovalent hydrocarbon group to be bonded to a monovalent oxygen-containing group are, for example, as described above.

(Monovalent Ether Bond Group)

The kind of monovalent hydrocarbon group contained in the monovalent ether bond group may be only one kind or two or more kinds. In addition, the number of monovalent hydrocarbon groups contained in the monovalent ether bond group may be only one or two or more. Incidentally, in a case in which the kind of monovalent hydrocarbon group contained in the monovalent ether bond group is only one kind, the number of monovalent hydrocarbon groups may be only one or two or more.

The number of ether bonds contained in the monovalent ether bond group may be only one or two or more. In a case in which the number of ether bonds is two or more, two ether bonds adjacent to each other may be, for example, bonded to each other directly not through a monovalent hydrocarbon group or indirectly through a monovalent hydrocarbon group.

Examples of the monovalent ether bond group include a monovalent group in which one alkyl group and one ether bond are bonded to each other, a monovalent group in which one alkenyl group and one ether bond are bonded to each other, a monovalent group in which one alkynyl group and one ether bond are bonded to each other, a monovalent group in which one cycloalkyl group and one ether bond are bonded to each other, a monovalent group in which one aryl group and one ether bond are bonded to each other, and a monovalent group in which two or more alkyl groups and one or more ether bonds are alternately bonded.

Here, when the monovalent group in which one or two or more alkyl groups and one or two or more ether bonds are bonded to each other described above is taken as an example, the details of the number of alkyl groups and the number of ether bonds are, for example, as follows. First, the number of alkyl groups is one as well as the number of ether bonds is one, and thus one alkyl group and one ether bond may be bonded to each other. Second, the number of alkyl groups is two or more as well as the number of ether bonds is one or more, and thus two or more alkyl groups and one or more ether bonds may be alternately bonded. Third, in a case in which the number of ether bonds is two or more, the monovalent group in which an alkyl group and an ether bond are bonded to each other may be linear or branched having one or two or more side chains. Incidentally, in a case in which the number of alkyl groups is two or more as well as the number of ether bonds is two or more, the bonding order of the two or more alkyl groups and the two or more ether bonds may be regular or random.

The kind of monovalent ether bond group is not particularly limited, and examples thereof include a monovalent group in which two methyl groups are bonded to each other through one ether bond, a monovalent group in which three methyl groups and two ether bonds are alternately bonded, and a monovalent group in which two ethyl groups are bonded to each other through one ether bond, and a monovalent group in which three ethyl groups and two ether bonds are alternately bonded.

Incidentally, the details of the number of carbon atoms in the monovalent hydrocarbon group to be bonded to an ether bond are, for example, as described above.

(Monovalent Oxygen-Based Bond Group)

The monovalent oxygen-based bond group is a monovalent group in which a monovalent oxygen-containing bond group and a monovalent ether bond group are bonded to each other.

The kind of monovalent oxygen-containing bond group contained in the monovalent oxygen-based bond group may be only one kind or two or more kinds. In addition, the number of monovalent oxygen-containing bond groups contained in the monovalent oxygen-based bond group may be only one or two or more. Incidentally, in a case in which the kind of monovalent oxygen-containing bond group contained in the monovalent oxygen-based bond group is only one kind, the number of monovalent oxygen-containing bond groups may be only one or two or more.

The kind of monovalent ether bond group contained in the monovalent oxygen-based bond group may be only one kind or two or more kinds. In addition, the number of monovalent ether bond groups contained in the monovalent oxygen-based bond group may be only one or two or more. Incidentally, in a case in which the kind of monovalent ether bond group contained in the monovalent oxygen-based bond group is only one kind, the number of monovalent ether bond groups may be only one or two or more.

The kind of monovalent oxygen-based bond group is not particularly limited, and examples thereof include a monovalent group in which a monovalent oxygen-containing bond group (monovalent group in which a hydroxyl group is introduced at the end of an ethyl group) and a monovalent ether bond group (monovalent group in which three methyl groups and two ether bonds are alternately bonded) are bonded to each other.

(Monovalent Sulfur-Containing Hydrocarbon Group)

The configuration of the monovalent sulfur-containing hydrocarbon group is not particularly limited as long as it is a monovalent group composed of sulfur together with carbon and hydrogen as described above. Specifically, examples of the monovalent sulfur-containing hydrocarbon group include a monovalent group (monovalent sulfur-containing bond group) in which one monovalent hydrocarbon group and one or two or more monovalent sulfur-containing groups are bonded to each other, a monovalent group (monovalent thio bond group) in which one or two or more monovalent hydrocarbon groups and one or two or more thio bonds are bonded to each other, and a monovalent group (monovalent sulfur-based bond group) in which two or more kinds among these are bonded to each other.

(Monovalent Sulfur-Containing Bond Group)

The kind of monovalent sulfur-containing group contained in the monovalent sulfur-containing bond group may be only one kind or two or more kinds. In addition, the number of monovalent sulfur-containing groups contained in the monovalent sulfur-containing bond group may be only one or two or more. Incidentally, in a case in which the kind of monovalent sulfur-containing group contained in the monovalent sulfur-containing bond group is only one kind, the number of monovalent sulfur-containing groups may be only one or two or more.

A "monovalent sulfur-containing group" is a general term for monovalent groups containing sulfur as a constituent element. The kind of monovalent sulfur-containing group is not particularly limited, and examples thereof include a sulfonic acid group ($-SO_3H$) and a sulfonyl type group ($-SO_2R$). R represents, for example, a monovalent hydrocarbon group, and the details of the monovalent hydrocarbon group are, for example, as described above.

However, in order to distinguish the monovalent sulfur-containing group to be described here from the monovalent oxygen-containing group and monovalent nitrogen-containing group, a monovalent group containing sulfur as a constituent element is regarded to correspond to the monovalent sulfur-containing group.

Examples of the monovalent sulfur-containing bond group include a monovalent group in which one alkyl group and one monovalent sulfur-containing group are bonded to each other, a monovalent group in which one alkenyl group and one monovalent sulfur-containing group are bonded to each other, a monovalent group in which one alkynyl group and one monovalent sulfur-containing group are bonded to each other, a monovalent group in which one cycloalkyl group and one monovalent sulfur-containing group are bonded to each other, and a monovalent group in which one aryl group and one monovalent sulfur-containing group are bonded to each other.

Here, when the monovalent group in which one or two or more alkyl groups and one or two or more monovalent sulfur-containing groups are bonded to each other described above is taken as an example, the details of the kind, number, and position of the monovalent sulfur-containing group are, for example, as follows. First, the kind of monovalent sulfur-containing group to be bonded to an alkyl group may be only one kind or two or more kinds as described above. Second, the number of monovalent sulfur-containing groups to be bonded to an alkyl group may be only one or two or more as described above. Third, the position of the monovalent sulfur-containing group to be introduced into an alkyl group is not particularly limited. For this reason, the position of the monovalent sulfur-containing group to be introduced into an alkyl group may be the end of the alkyl group or the middle of the alkyl group, for example.

The kind of monovalent sulfur-containing bond group is not particularly limited, and examples thereof include a monovalent group in which a sulfonic acid group is bonded to a methyl group, a monovalent group in which a sulfonic acid group is bonded to the end of an ethyl group, a monovalent group in which a sulfonic acid group is introduced in the middle of an ethyl group, a monovalent group in which a sulfonic acid group is introduced at the end of a propyl group, and a monovalent group in which a sulfonic acid group is introduced in the middle of a propyl group.

Incidentally, the details of the number of carbon atoms in the monovalent hydrocarbon group to be bonded to a monovalent sulfur-containing group are, for example, as described above.

(Monovalent Thio Bond Group)

The kind of monovalent hydrocarbon group contained in the monovalent thio bond group may be only one kind or two or more kinds. In addition, the number of monovalent hydrocarbon groups contained in the monovalent thio bond group may be only one or two or more. Incidentally, in a case in which the kind of monovalent hydrocarbon group contained in the monovalent thio bond group is only one kind, the number of monovalent hydrocarbon groups may be only one or two or more.

The number of thio bonds contained in the monovalent thio bond group may be only one or two or more. In a case in which the number of thio bonds is two or more, two thio bonds adjacent to each other may be, for example, bonded to each other directly not through a monovalent hydrocarbon group or indirectly through a monovalent hydrocarbon group.

Examples of the monovalent thio bond group include a monovalent group in which one alkyl group and one thio bond are bonded to each other, or a monovalent group in which one alkenyl group and one thio bond are bonded to each other, a monovalent group in which one alkynyl group and one thio bond are bonded to each other, a monovalent group in which one cycloalkyl group and one thio bond are bonded to each other, a monovalent group in which one aryl group and one thio bond are bonded to each other, and a monovalent group in which two or more alkyl groups and one or more thio bonds are alternately bonded.

Here, when the monovalent group in which one or two or more alkyl groups and one or two or more thio bonds are bonded to each other described above is taken as an example, the details of the number of alkyl groups and the number of thio bonds are, for example, as follows. First, the number of alkyl groups is one as well as the number of thio bonds is one, and thus one alkyl group and one thio bond may be bonded to each other. Second, the number of alkyl groups is two or more as well as the number of thio bonds is one or more, and thus two or more alkyl groups and one or more thio bonds may be alternately bonded. Third, in a case in which the number of thio bonds is two or more, the monovalent group in which an alkyl group and a thio bond are bonded to each other may be linear or branched having one or two or more side chains. Incidentally, in a case in which the number of alkyl groups is two or more as well as the number of thio bonds is two or more, the bonding order of the two or more alkyl groups and the two or more thio bonds may be regular or random.

The kind of monovalent thio bond group is not particularly limited, and examples thereof include a monovalent group in which two methyl groups are bonded to each other through one thio bond, a monovalent group in which three methyl groups and two thio bonds are alternately bonded, a monovalent group in which two ethyl groups are bonded to each other through one thio bond, and a monovalent group in which three ethyl groups and two thio bonds are alternately bonded.

Incidentally, the details of the number of carbon atoms in the monovalent hydrocarbon group to be bonded to a thio bond are, for example, as described above.

(Monovalent Sulfur Bond Group)

The monovalent sulfur-based bond group is a monovalent group in which a monovalent sulfur-containing bond group and a monovalent thio bond group are bonded to each other.

The kind of monovalent sulfur-containing bond group contained in the monovalent sulfur-based bond group may be only one kind or two or more kinds. In addition, the number of monovalent sulfur-containing bond groups contained in the monovalent sulfur-based bond group may be only one or two or more. Incidentally, in a case in which the kind of monovalent sulfur-containing bond group contained in the monovalent sulfur-based bond group is only one kind, the number of monovalent sulfur-containing bond groups may be only one or two or more.

The kind of monovalent thio bond group contained in the monovalent sulfur-based bond group may be only one kind or two or more kinds. In addition, the number of monovalent thio bond groups contained in the monovalent sulfur-based bond group may be only one or two or more. Incidentally, in a case in which the kind of monovalent thio bond group contained in the monovalent sulfur-based bond group is only one kind, the number of monovalent thio bond groups may be only one or two or more.

The kind of monovalent sulfur-based bond group is not particularly limited, and examples thereof include a monovalent group in which a monovalent oxygen-containing bond group (monovalent group in which a sulfonic acid group is introduced at the end of an ethyl group) and a monovalent thio bond group (monovalent group in which three methyl groups and two thio bonds are alternately bonded) are bonded to each other.

(Monovalent Halogenated Hydrocarbon Group)

The monovalent halogenated hydrocarbon group is, for example, a group in which one or two or more hydrogen groups in a monovalent hydrocarbon group are substituted with a halogen group.

Incidentally, the details of the halogen group are, for example, as described above. In other words, the kind of halogen group contained in the monovalent halogenated hydrocarbon group may be only one kind or two or more kinds. In addition, in a case in which the kind of halogen group contained in the monovalent halogenated hydrocarbon group is only one kind, the number of halogen groups may be only one or two or more.

Specifically, examples of the monovalent halogenated hydrocarbon group include a halogenated alkyl group, a halogenated cycloalkyl group, a halogenated alkenyl group, a halogenated alkynyl group, a halogenated aryl group, and a divalent group in which two or more kinds among these are bonded to each other. Among these, the monovalent halogenated hydrocarbon group is preferably a monovalent fluorinated hydrocarbon group and may be a monovalent perfluorohydrocarbon group.

(Details of X)

X represents any of an ether bond, a thio bond, and an amine bond (—NR3-) as described above. However, R3 represents either a hydrogen group or a monovalent hydrocarbon group as described above.

The details (including the number of carbon atoms) of a monovalent hydrocarbon group which is R3 are, for example, similar to the details (including the number of carbon atoms) of a monovalent hydrocarbon group which is R2. The kind of amine bond is not particularly limited, and examples thereof include —NH—, —NCH$_3$—, and —NC$_2$H$_5$—.

The electrolytic solution may contain two or more kinds of sulfonamide compounds as described above. For this reason, the electrolytic solution may contain two or more kinds or three kinds among a sulfonamide compound containing an ether bond as X, a sulfonamide compound containing a thio bond as X, and a sulfonamide compound containing an amine bond as X.

(Details of n)

The value of "n" is either 0 or 1 as described above. For this reason, X may be present (n=1) or may not be present (n=0) as described above. In a case in which X is not present, the carbon atom in R1 (divalent hydrocarbon group) and the sulfur atom in the sulfonyl group (—S(=O)$_2$—) are bonded to each other.

(Specific Examples of Sulfonamide Compound)

The kind of sulfonamide compound is not particularly limited. Here, specific examples of the sulfonamide compound are as follows. Of course, the sulfonamide compound is not limited to the compounds exemplified below as long as it is a compound corresponding to the compound represented by Formula (1), and may be other compounds.

Specific examples of the sulfonamide compound in a case in which X is present (n=1) include compounds represented by the following respective Formulas (1-1) to (1-19) and (1-38) to (1-42).

Specific examples of the sulfonamide compound in a case in which X is not present (n=0) include compounds represented by the following respective Formulas (1-21) to (1-37).

[Chem. 3]

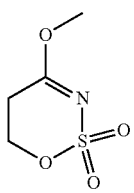

(1-1)

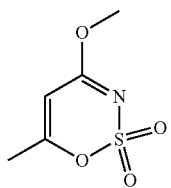

(1-2)

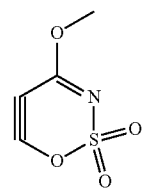

(1-3)

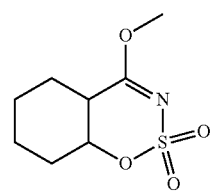

(1-4)

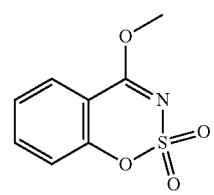

(1-5)

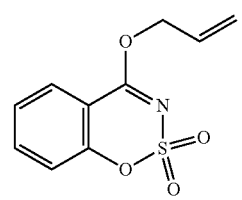

(1-6)

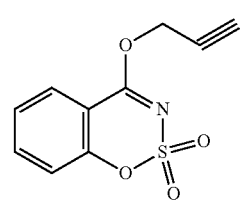

(1-7)

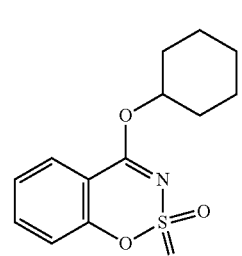

(1-8)

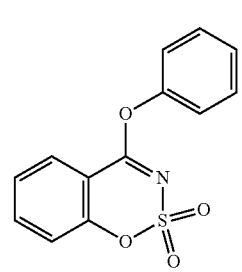

(1-9)

(1-10) 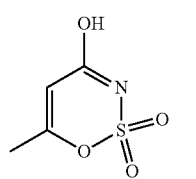
(1-11) 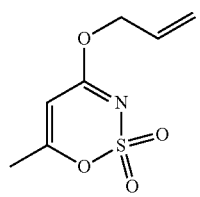
(1-12) 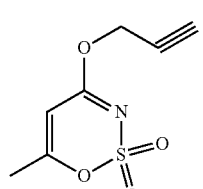
(1-13) 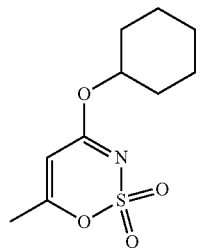
(1-14) 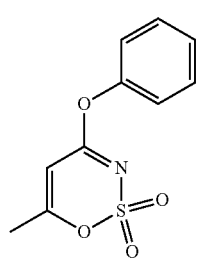
(1-15) 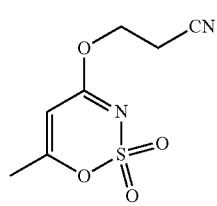
(1-16) 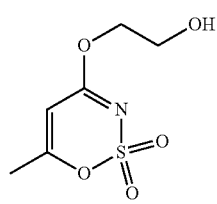
(1-17) 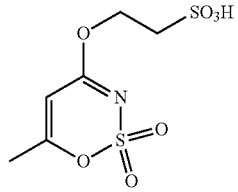
(1-18) 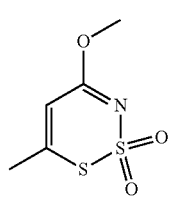
(1-19) 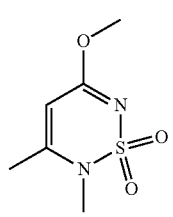
[Chem. 4]
(1-21) 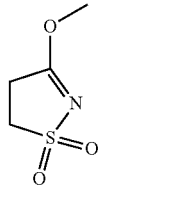
(1-22) 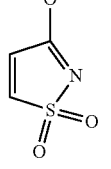
(1-23) 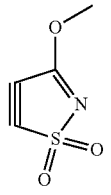
(1-24) 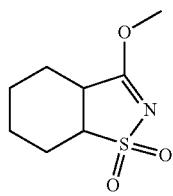

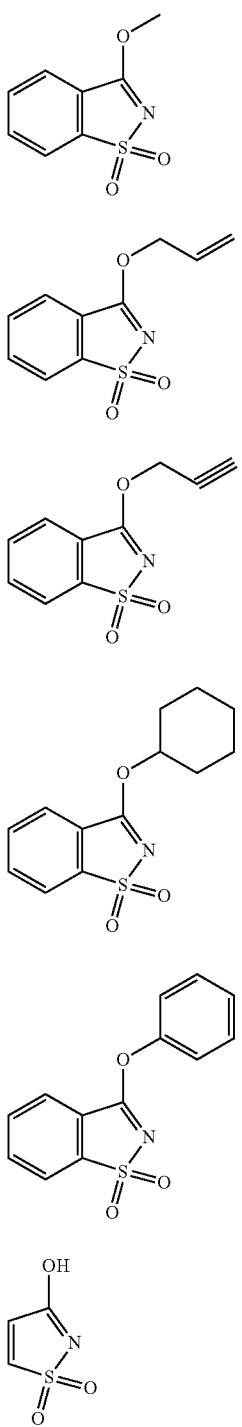
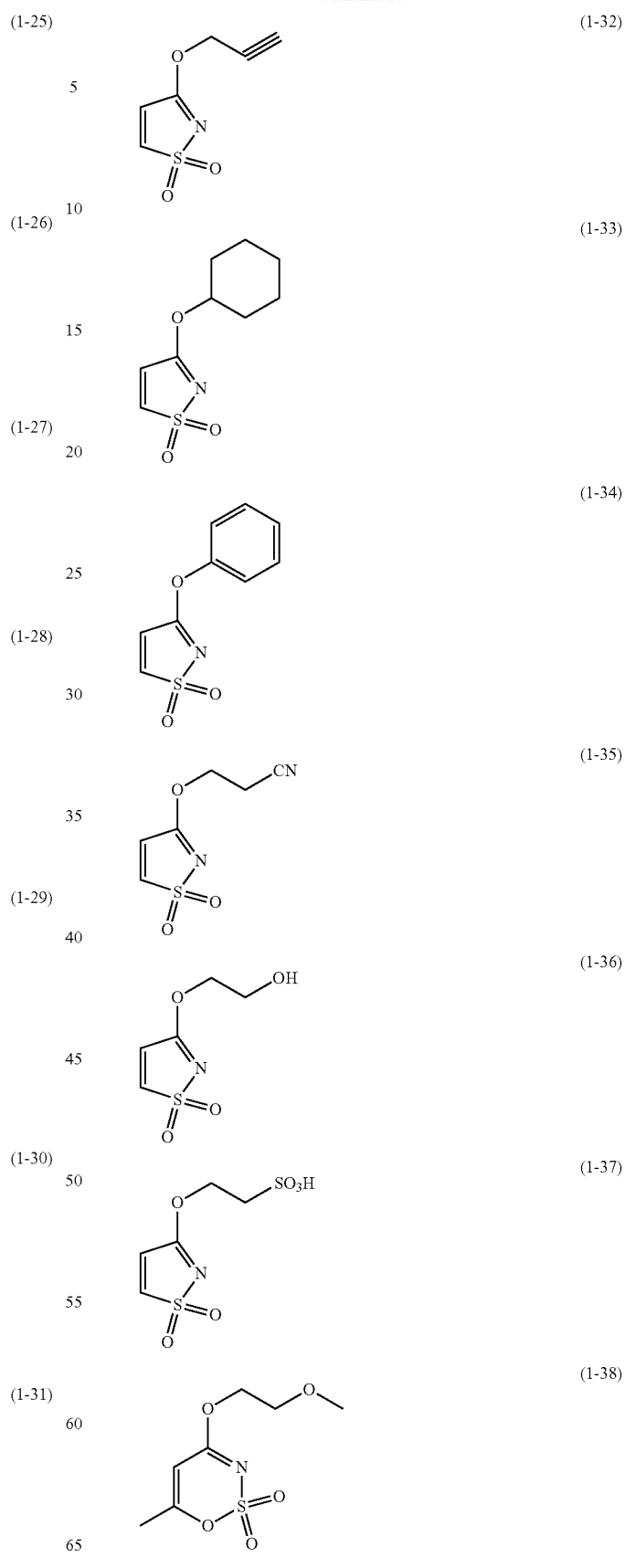

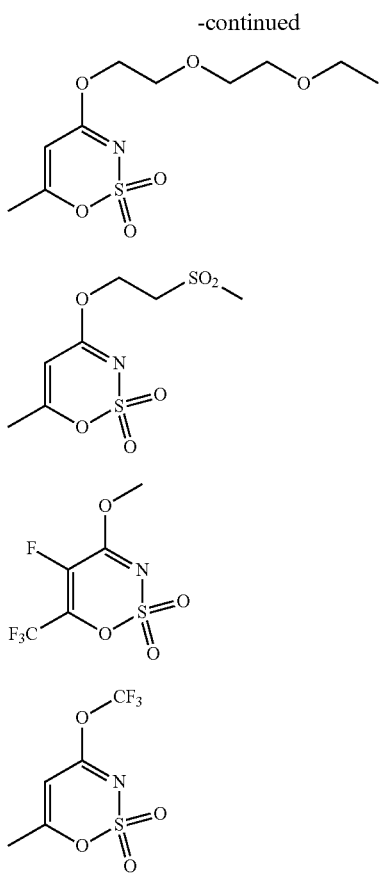

(1-39)

(1-40)

(1-41)

(1-42)

(Content of Sulfonamide Compound)

The content of sulfonamide compound in the electrolytic solution is not particularly limited but, among others, is preferably 0.001% by weight to 10% by weight, more preferably 0.001% by weight to 5% by weight, and still more preferably 0.001% by weight to 1% by weight. This is because the chemical stability of the electrolytic solution is sufficiently improved while the solubility, compatibility and the like of the sulfonamide compound are secured.

Incidentally, in a case in which the electrolytic solution contains two or more kinds of sulfonamide compounds, the "content of sulfonamide compound" is the sum of contents of the respective sulfonamide compounds.

[Other Materials]

Incidentally, the electrolytic solution may contain any one kind or two or more kinds among other materials in addition to the sulfonamide compound described above.

[N-Substituted Sulfonamide Compound]

The other materials are, for example, any one kind or two or more kinds among N-substituted sulfonamide compounds represented by the following Formula (2).

[Chem. 5]

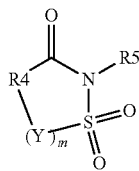

(2)

R4 represents either a divalent hydrocarbon group or a divalent halogenated hydrocarbon group. R5 represents any of a hydrogen group, a monovalent hydrocarbon group, and a monovalent halogenated hydrocarbon group. Y represents any of an ether bond (—O—), a thio bond (—S—), and an amine bond (—NR6-), where R6 represents either of a hydrogen group or a monovalent hydrocarbon group. m represents either 0 or 1.

This N-substituted sulfonamide compound is similar to a sulfonamide compound but is a different compound from the sulfonamide compound as is apparent from the comparison between Formula (1) and Formula (2).

Specifically, the N-substituted sulfonamide compound includes R4 corresponding to R1 and Y (and m) corresponding to X (and n) when being compared to the sulfonamide compound. However, the N-substituted sulfonamide compound does not have a group corresponding to R2, but has a carbonyl group (—C(=O)—) unlike the sulfonamide compound. In addition, in the N-substituted sulfonamide compound, R5 is bonded to the nitrogen atom constituting the sulfonamide structure unlike the sulfonamide compound.

The details (including the number of carbon atoms) of the divalent hydrocarbon group and divalent halogenated hydrocarbon group which are R4 are, for example, similar to the details of the divalent hydrocarbon group and divalent halogenated hydrocarbon group which are R1 described above. The details (including the number of carbon atoms) of the monovalent hydrocarbon group and monovalent halogenated hydrocarbon group which are R5 are, for example, similar to the details (including the number of carbon atoms) of the monovalent hydrocarbon group and monovalent halogenated hydrocarbon group which are R2 described above. The details of Y which is an ether bond or the like are, for example, similar to the details of X described above. The details of m by which the presence or absence of Y is determined are, for example, similar to the details of n described above.

When the electrolytic solution contains the N-substituted sulfonamide compound together with the sulfonamide compound, the chemical stability of the electrolytic solution is further improved by the synergistic action of the two. This suppresses the decomposition reaction of the electrolytic solution as well as the generation of gas due to the decomposition reaction of the electrolytic solution, and thus the battery characteristics of a secondary battery including this electrolytic solution are further improved.

The kind of N-substituted sulfonamide compound is not particularly limited. Here, specific examples of the N-substituted sulfonamide compound are as follows. Of course, the N-substituted sulfonamide compound is not limited to the compounds exemplified below as long as it is a compound corresponding to the compound represented by Formula (2), and may be other compounds.

Specific examples of the N-substituted sulfonamide compound in a case in which Y is present (m=1) include compounds represented by the following respective Formulas (2-1) to (2-15) and Formulas (2-34) to (2-38).

Specific examples of the N-substituted sulfonamide compound in a case in which Y is not present (m=0) include compounds represented by the following respective Formulas (2-21) to (2-33).

[Chem. 6]
(2-1) 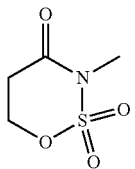
(2-2) 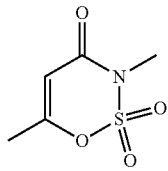
(2-3) 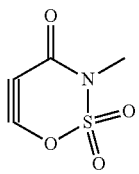
(2-4) 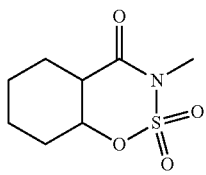
(2-5) 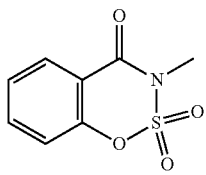
(2-6) 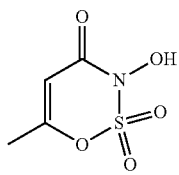
(2-7) 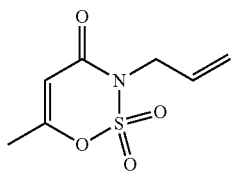
(2-8) 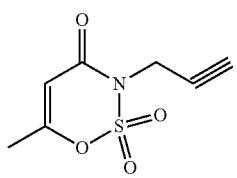
(2-9) 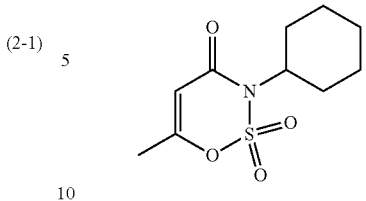
(2-10) 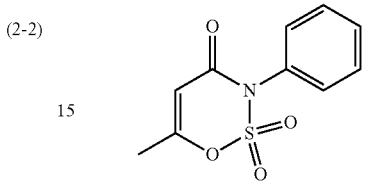
(2-11) 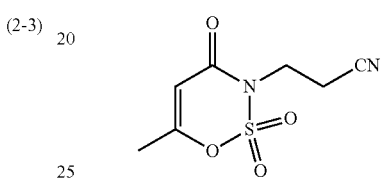
(2-12) 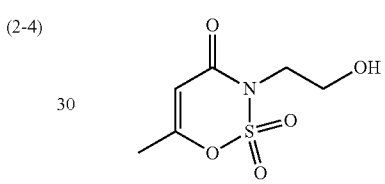
(2-13) 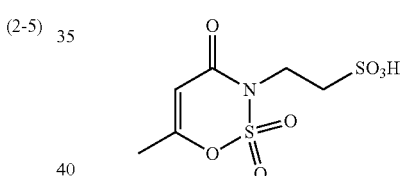
(2-14) 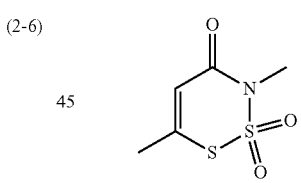
(2-15) 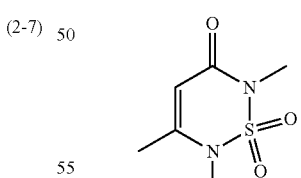
[Chem. 7]
(2-21) 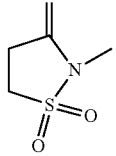

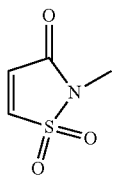 (2-22)
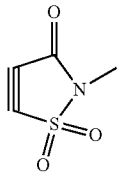 (2-23)
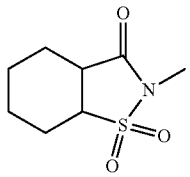 (2-24)
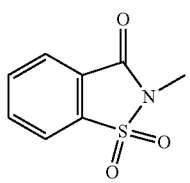 (2-25)
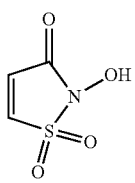 (2-26)
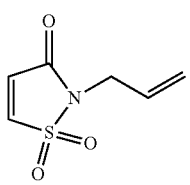 (2-27)
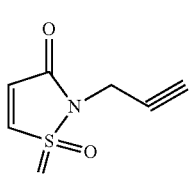 (2-28)
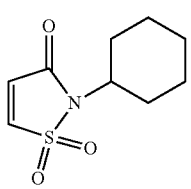 (2-29)
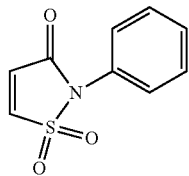 (2-30)
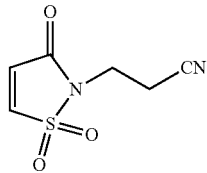 (2-31)
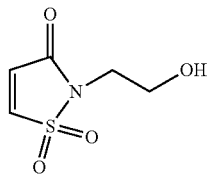 (2-32)
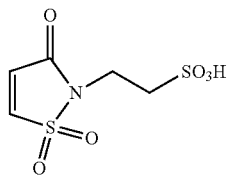 (2-33)
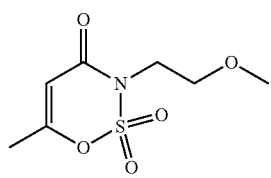 (2-34)
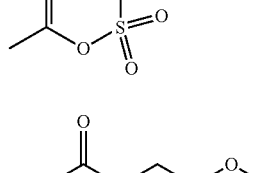 (2-35)
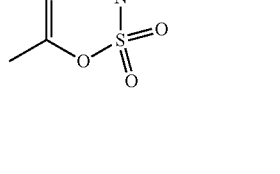 (2-36)
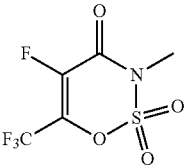 (2-37)

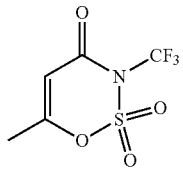

(2-38)

The content of N-substituted sulfonamide compound in the electrolytic solution is not particularly limited and is, for example, similar to the content of sulfonamide compound in the electrolytic solution. This is because the chemical stability of the electrolytic solution is sufficiently improved while the solubility, compatibility and the like of the N-substituted sulfonamide compound are secured.

Incidentally, in a case in which the electrolytic solution contains two or more kinds of N-substituted sulfonamide compounds, the "content of N-substituted sulfonamide compound" is the sum of contents of the respective N-substituted sulfonamide compounds.

[Solvent]

The other materials are, for example, any one kind or two or more kinds among solvents such as a non-aqueous solvent (organic solvent). The electrolytic solution containing a non-aqueous solvent is a so-called non-aqueous electrolytic solution.

(Cyclic Carbonate Ester, Chain Carbonate Ester, Lactone, Chain Carboxylate Ester, and Nitrile Compound)

Examples of the solvent include a cyclic carbonate ester, a chain carbonate ester, a lactone, a chain carboxylate ester, and a nitrile (mononitrile) compound. This is because an excellent battery capacity, excellent cycle characteristics, excellent storage characteristics and the like are attained.

Specific examples of the cyclic carbonate ester include ethylene carbonate, propylene carbonate, and butylene carbonate. Specific examples of the chain carbonate ester include dimethyl carbonate, diethyl carbonate, ethyl methyl carbonate, and methyl propyl carbonate. Specific examples of the lactone include γ-butyrolactone and γ-valerolactone. Specific examples of the chain carboxylate ester include methyl acetate, ethyl acetate, methyl propionate, ethyl propionate, propyl propionate, methyl butyrate, methyl isobutyrate, methyl trimethyl acetate, and ethyl trimethyl acetate. Specific examples of the nitrile compound include acetonitrile, methoxyacetonitrile, and 3-methoxypropionitrile.

In addition to these, the solvent may be, for example, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, N,N-dimethylformamide, N-methylpyrrolidinone, N-methyloxazolidinone, N,N'-dimethylimidazolidinone, nitromethane, nitroethane, sulfolane, trimethyl phosphate, and dimethyl sulfoxide. This is because the same advantages are attained.

Among these, it is preferable that the solvent contains any one kind or two or more kinds among ethylene carbonate, propylene carbonate, dimethyl carbonate, diethyl carbonate, ethyl methyl carbonate and the like. This is because a high battery capacity, excellent cycle characteristics, excellent storage characteristics and the like are attained. In this case, combinations of solvents having a high viscosity (high permittivity) (for example, relative permittivity ε≥30) such as ethylene carbonate and propylene carbonate with solvents having a low viscosity (for example, viscosity≤1 mPa) such as dimethyl carbonate, ethyl methyl carbonate, and diethyl carbonate are more preferable. This is because the dissociation property of the electrolyte salt and the mobility of ions are improved.

In addition, the solvent may contain any one kind or two or more kinds among an unsaturated cyclic carbonate ester, a halogenated carbonate ester, a dinitrile compound, a diisocyanate compound, a sulfonate ester, an acid anhydride and the like. This is because the chemical stability of the electrolytic solution is further improved.

(Unsaturated Cyclic Carbonate Ester)

An unsaturated cyclic carbonate ester is a cyclic carbonate ester having one or two or more carbon-carbon unsaturated bonds (carbon-carbon double bonds) and is, for example, any one kind or two or more kinds among compounds represented by the following Formulas (3) to (5). The content of unsaturated cyclic carbonate ester in the solvent is not particularly limited and is, for example, 0.01% by weight to 10% by weight.

[Chem. 8]

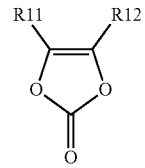

(3)

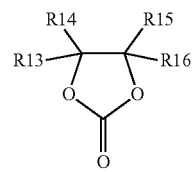

(4)

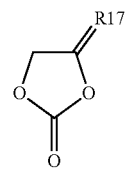

(5)

R11 and R12 each represent either a hydrogen group or an alkyl group. R13 to R16 each represent any of a hydrogen group, an alkyl group, a vinyl group, and an allyl group, and at least one of R13 to R16 represents either a vinyl group or an allyl group. R17 represents a group represented by =CR171R172, where R171 and R172 each represents either a hydrogen group or an alkyl group.

The compound represented by Formula (3) is a vinylene carbonate-based compound. R11 and R12 may be the same kind of group as or different kinds of groups from each other. The details of the alkyl group are as described above. Specific examples of the vinylene carbonate-based compound include vinylene carbonate (1,3-dioxol-2-one), methyl vinylene carbonate (4-methyl-1,3-dioxol-2-one), ethyl vinylene carbonate (4-ethyl-1,3-dioxol-2-one), 4,5-dimethyl-1,3-dioxol-2-one, 4,5-diethyl-1,3-dioxol-2-one, 4-fluoro-1,3-dioxol-2-one, and 4-trifluoromethyl-1,3-dioxol-2-one.

The compound represented by Formula (4) is a vinyl ethylene carbonate-based compound. R13 to R16 may be the same kind of group as or different kinds of groups from one another. Of course, some of R13 to R16 may be the same kind of group as one another. Specific examples of the vinyl ethylene carbonate-based compound include vinyl ethylene carbonate (4-vinyl-1,3-dioxolan-2-one), 4-methyl-4-vinyl-1,3-dioxolan-2-one, 4-ethyl-4-vinyl-1,3-dioxolan-2-one, 4-n-propyl-4-vinyl-1,3-dioxolan-2-one, 5-methyl-4-vinyl-1,3-dioxolan-2-one, 4,4-divinyl-1,3-dioxolan-2-one, and 4,5-divinyl-1,3-dioxolan-2-one.

The compound represented by Formula (5) is a methylene ethylene carbonate-based compound. R171 and R172 may be the same kind of group as or different kinds of groups from each other. Specific examples of the methylene ethylene carbonate-based compound include methylene ethylene carbonate (4-methylene-1,3-dioxolan-2-one), 4,4-dimethyl-5-methylene-1,3-dioxolan-2-one, and 4,4-diethyl-5-methylene-1,3-dioxolan-2-one.

In addition to these, the unsaturated cyclic carbonate ester may be catechol carbonate (catechol carbonate) having a benzene ring.

(Halogenated Carbonate Ester)

A halogenated carbonate ester is a carbonate ester containing one or two or more halogens as a constituent element and example thereof include either or both of compounds represented by the following respective Formulas (6) and (7). The content of halogenated carbonate ester in the solvent is not particularly limited and is, for example, 0.01% by weight to 10% by weight.

[Chem. 9]

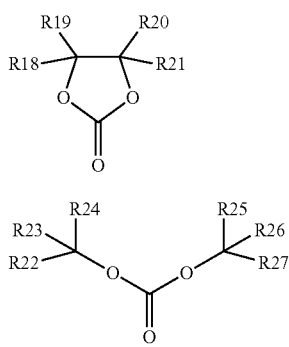

R18 to R21 each represent any of a hydrogen group, a halogen group, an alkyl group, and a halogenated alkyl group, and at least one of R18 to R21 represents either a halogen group or a halogenated alkyl group. R22 to R27 each represent any of a hydrogen group, a halogen group, an alkyl group, and a halogenated alkyl group, and at least one of R22 to R27 represents either a halogen group or a halogenated alkyl group.

The halogenated carbonate ester represented by Formula (6) is a cyclic halogenated carbonate ester. R18 to R21 may be the same kind of group as or different kinds of groups from one another. Of course, some of R18 to R21 may be the same kind of group as one another.

The kind of halogen group is not particularly limited, but among other, one kind or two or more kinds among a fluorine group, a chlorine group, a bromine group, and an iodine group are preferable and a fluorine group is more preferable. Incidentally, the number of halogen groups may be one or two or more.

The details of the alkyl group are as described above. A halogenated alkyl group is a group in which one or two or more hydrogen groups in an alkyl group are substituted with a halogen group (halogenated). The details of the halogen group are as described above.

Specific examples of the cyclic halogenated carbonate ester include compounds represented by the following respective Formulas (6-1) to (6-21), and these compounds include geometric isomers as well. Among these, 4-fluoro-1,3-dioxolan-2-one represented by Formula (6-1) and 4,5-difluoro-1,3-dioxolan-2-one represented by Formula (6-3), and the like are preferable. Incidentally, as 4,5-difluoro-1,3-dioxolan-2-one, a trans isomer is preferred to a cis isomer. This is because a trans isomer can be easily procured and a high effect is attained.

[Chem. 10]

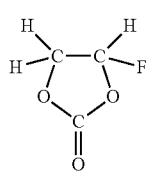

(6-1)

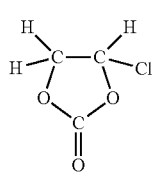

(6-2)

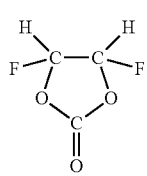

(6-3)

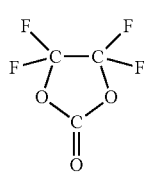

(6-4)

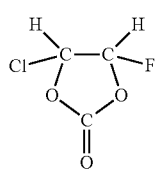

(6-5)

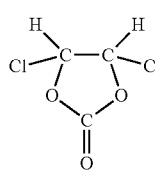

(6-6)

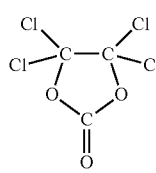

(6-7)

-continued (6-8) 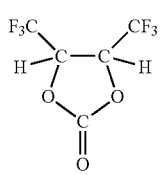

(6-9) 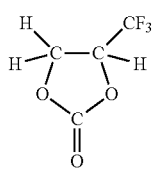

(6-10) 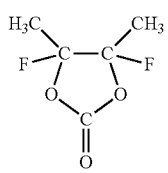

(6-11) 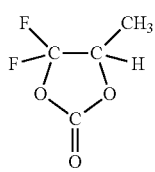

(6-12) 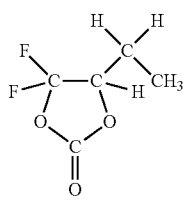

(6-13) 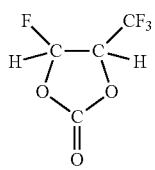

(6-14) 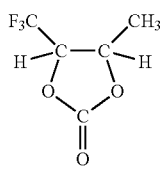

(6-15) 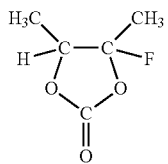

(6-16) 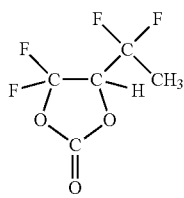

-continued (6-17) 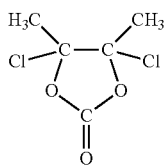

(6-18) 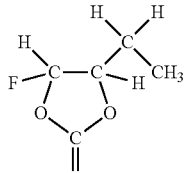

(6-19) 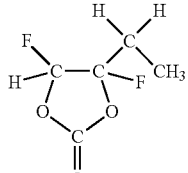

(6-20) 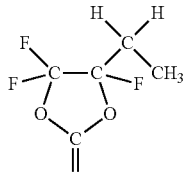

(6-21) 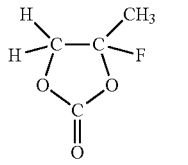

The halogenated carbonate ester represented by Formula (7) is a halogenated chain carbonate ester. R22 to R27 may be the same kind of group as or different kinds of groups from one another. Of course, some of R22 to R27 may be the same kind of group as one another.

Specific examples of the halogenated chain carbonate ester include fluoromethyl methyl carbonate, bis(fluoromethyl) carbonate, and difluoromethyl methyl carbonate.

(Dinitrile Compound)

A dinitrile compound is, for example, either or both of compounds represented by the following Formula (8). The content of dinitrile compound in the solvent is not particularly limited and is, for example, 0.5% by weight to 5% by weight.

$$NC—R28-CN \quad (8)$$

R28 represents either an alkylene group or an arylene group.

The details of each of the alkylene group and the arylene group are, for example, as described above. The number of carbon atoms in the alkylene group is not particularly limited but is, for example, 1 to 18 as well as the number of carbon atoms in the arylene group is not particularly limited but is, for example, 6 to 18.

Specific examples of the dinitrile compound include succinonitrile (NC—$C_2H_4$—CN), glutaronitrile (NC—$C_3H_6$—CN), adiponitrile (NC—$C_4H_8$—CN), sebaconitrile (NC—$C_8H_{10}$—CN), and phthalonitrile (NC—$C_6H_4$—CN).

(Diisocyanate Compound)

A diisocyanate compound is, for example, a compound represented by OCN—$C_nH_{2n}$—NCO (n represents an integer of 1 or more). The content of diisocyanate compound in the solvent is not particularly limited and is, for example, 0.1% by weight to 10% by weight. Specific examples of the diisocyanate compound include OCN—$C_6H_{12}$—NCO.

(Sulfonate Ester)

Examples of the sulfonate ester include a monosulfonate ester and a disulfonate ester. The content of sulfonate ester in the solvent is not particularly limited and is, for example, 0.01% by weight to 10% by weight.

The monosulfonate ester may be a cyclic monosulfonate ester or a chain monosulfonate ester. Specific examples of the cyclic monosulfonate ester include sultones such as 1,3-propane sultone and 1,3-propene sultone. Specific examples of the chain monosulfonate ester include a compound in which a cyclic monosulfonate ester in the middle is cleaved.

The disulfonate ester may be a cyclic disulfonate ester or a chain disulfonate ester. Specific examples of the cyclic disulfonate ester include compounds represented by the following respective Formulas (9-1) to (9-3). Specific examples of the chain disulfonate ester include a compound in which a cyclic disulfonate ester in the middle is cleaved.

[Chem. 11]

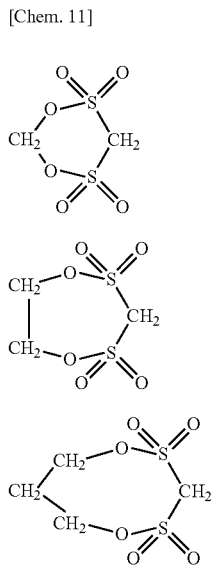

(9-1)

(9-2)

(9-3)

(Acid Anhydride)

Examples of the acid anhydride include carboxylic anhydrides, disulfonic anhydrides, and carboxylic sulfonic anhydrides. The content of acid anhydride in the solvent is not particularly limited and is, for example, 0.01% by weight to 10% by weight.

Specific examples of the carboxylic anhydrides include succinic anhydride, glutaric anhydride, and maleic anhydride. Specific examples of the disulfonic anhydrides include anhydrous ethanedisulfonic acid and anhydrous propanedisulfonic acid. Specific examples of the carboxylic sulfonic anhydrides include anhydrous sulfobenzoic acid, anhydrous sulfopropionic acid, and anhydrous sulfobutyric acid.

[Electrolyte Salt]

In addition, the other materials are, for example, any one kind or two or more kinds among electrolyte salts such as lithium salts. However, the electrolyte salt may contain, for example, salts other than lithium salts. Examples of the salts other than lithium salts include salts of light metals other than lithium.

Specific examples of the lithium salts include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethanesulfonate ($LiCF_3SO_3$), lithium tetrachloroaluminate ($LiAlCl_4$), dilithium hexafluorosilicate ($Li_2SiF_6$), lithium chloride (LiCl), and lithium bromide (LiBr).

Among these, any one kind or two or more kinds among lithium hexafluorophosphate, lithium tetrafluoroborate, lithium perchlorate, and lithium hexafluoroarsenate are preferable and lithium hexafluorophosphate is more preferable. This is because the internal resistance decreases.

In addition, the electrolyte salt may be any one kind or two or more kinds among compounds represented by the following respective Formulas (10) to (12). R41 and R43 may be the same kind of group as or different kinds of groups from each other. R51 to R53 may be the same kind of group as or different kinds of groups from one another. Of course, some of R51 to R53 may be the same kind of group as each other. R61 and R62 may be the same kind of group as or different kinds of groups from each other.

[Chem. 12]

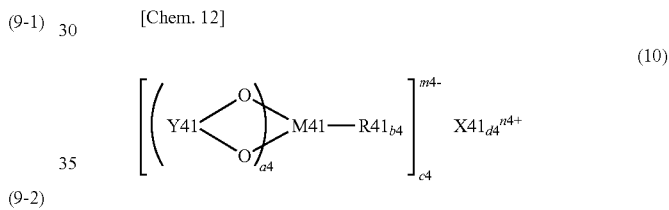

(10)

X41 represents any of a group 1 element and a group 2 element in the extended periodic table or aluminum (Al). M41 represents any of a transition metal and a group 13 element, a group 14 element, or a group 15 element in the extended periodic table. R41 represents a halogen group. Y41 represents any of —C(=O)—R42-C(=O)—, —C(=O)—CR43$_2$—, and —C(=O)—C(=O)—. However, R42 represents any of an alkylene group, a halogenated alkylene group, an arylene group, and a halogenated arylene group. R43 represents any of an alkyl group, a halogenated alkyl group, an aryl group, and a halogenated aryl group. a4 represents an integer 1 to 4, b4 represents an integer 0, 2, or 4, and c4, d4, m4, and n4 each represent an integer 1 to 3.

[Chem. 13]

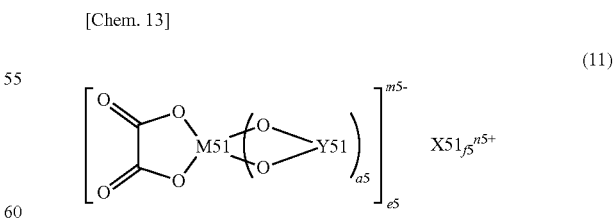

(11)

X51 represents any of a group 1 element and a group 2 element in the extended periodic table. (M51 represents any of a transition metal or a group 13 element, a group 14 element, and a group 15 element in the extended periodic table. Y51 represents any of —C(=O)—(CR51$_2$)$_{b5}$—C(=O)—, —R53$_2$C—(CR52$_2$)$_{c5}$—C(=O)—, —R53$_2$C—

$(CR52_2)_{c5}$—$CR53_2$—, —$R53_2C$—$(CR52_2)_{c5}$—$S(=O)_2$—, —$S(=O)_2$—$(CR52_2)_{d5}$—$S(=O)_2$—, and —$C(=O)$—$(CR52_2)_{d5}$—$S(=O)_2$—. R51 and R53 each represent any of a hydrogen group, an alkyl group, a halogen group, and a halogenated alkyl group. However, at least one of R51 represents either of a halogen group or a halogenated alkyl group and at least one of R53 represents either of a halogen group or a halogenated alkyl group. R52 represents any of a hydrogen group, an alkyl group, a halogen group, and a halogenated alkyl group. a5, e5, and n5 each represent an integer 1 or 2, b5 and d5 each represent an integer 1 to 4, c5 represents an integer 0 to 4, and f5 and m5 each represent an integer 1 to 3.

[Chem. 14]

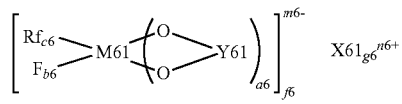

(12)

X61 represents any of a group 1 element and a group 2 element in the extended periodic table. M61 represents any of a transition metal or a group 13 element, a group 14 element, and a group 15 element in the extended periodic table. Rf represents either of a fluorinated alkyl group or a fluorinated aryl group, and the fluorinated alkyl group and the fluorinated aryl group each have 1 to 10 carbon atoms. Y61 represents any of —$C(=O)$—$(CR61_2)_{d6}$—$C(=O)$—, —$R62_2C$—$(CR61_2)_{d6}$—$C(=O)$—, —$R62_2C$—$(CR61_2)_{d6}$—$CR62_2$—, —$R62_2C$—$(CR61_2)_{d6}$—$S(=O)_2$—, —$S(=O)_2$ —$(CR61_2)_{e6}$—$S(=O)_2$—, and —$C(=O)$—$(CR61_2)_{e6}$—$S(=O)_2$—. However, R61 represents any of a hydrogen group, an alkyl group, a halogen group, and a halogenated alkyl group. R62 represents any of a hydrogen group, an alkyl group, a halogen group, and a halogenated alkyl group, and at least one of R62 represents either of a halogen group or a halogenated alkyl group. a6, f6, and n6 each represent an integer 1 or 2, b6, c6, and e6 each represent an integer 1 to 4, d6 represents an integer 0 to 4, and g6 and m6 each represent an integer 1 to 3.

Incidentally, group 1 elements are hydrogen (H), lithium (Li), sodium (Na), potassium (K), rubidium (Rb), cesium (Cs), and francium (Fr). Group 2 elements are beryllium (Be), magnesium (Mg), calcium (Ca), strontium (Sr), barium (Ba), and radium (Ra). Group 13 elements are boron (B), aluminum (Al), gallium (Ga), indium (In), and thallium (Tl). Group 14 elements are carbon (C), silicon (Si), germanium (Ge), tin (Sn), and lead (Pb). Group 15 elements are nitrogen (N), phosphorus (P), arsenic (As), antimony (Sb), and bismuth (Bi).

Specific examples of the compound represented by Formula (10) include compounds represented by the following respective Formulas (10-1) to (10-6). Specific examples of the compound represented by Formula (11) include compounds represented by the following respective Formulas (11-1) to (11-8). Specific examples of the compound represented by Formula (12) include compounds represented by the following Formula (12-1).

[Chem. 15]

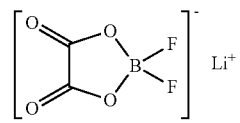 (10-1)

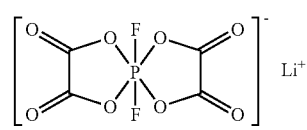 (10-2)

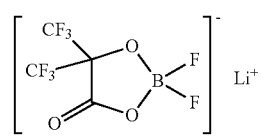 (10-3)

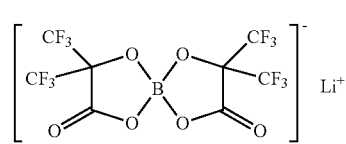 (10-4)

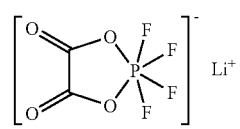 (10-5)

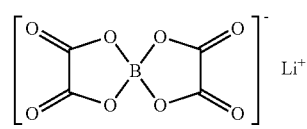 (10-6)

[Chem. 16]

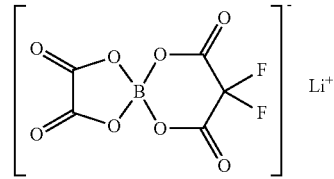 (11-1)

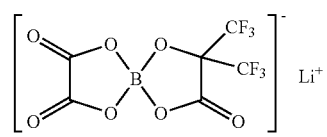 (11-2)

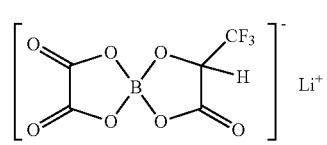 (11-3)

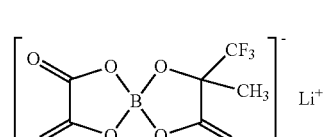 (11-4)

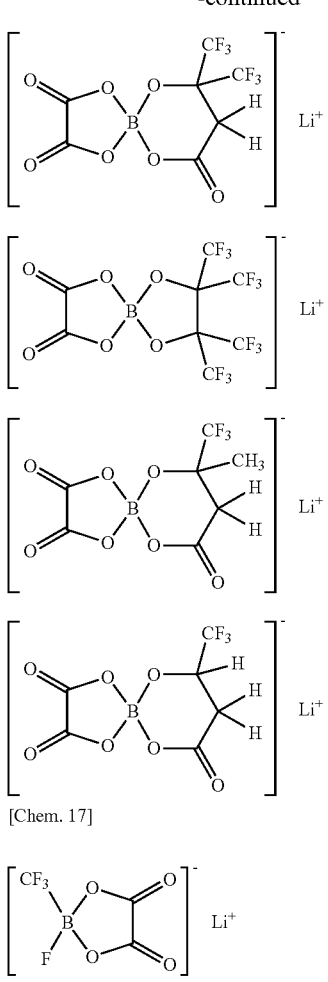

[Chem. 17]

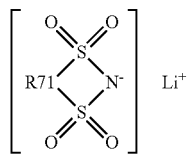

In addition, the electrolyte salt may be any one kind or two or more kinds among compounds represented by the following respective Formulas (13) to (15). m and n may be the same value as or different values from each other. In addition, p, q, and r may be the same value as or different values from one another. Of course, some of p, q, and r may be the same value as one another.

$$LiN(C_mF_{2m+1}SO_2)(C_nF_{2n+1}SO_2) \quad (13)$$

m and n each represent an integer of 1 or more.

[Chem. 18]

R71 represents a linear or branched perfluoroalkylene group having 2 to 4 carbon atoms.

$$LiC(C_pF_{2p+1}SO_2)(C_qF_{2q+1}SO_2)(C_rF_{2r+1}SO_2) \quad (15)$$

p, q, and r each represent an integer of 1 or more.

The compound represented by Formula (13) is a chain imide compound. Specific examples of the chain imide compound include lithium bis(fluorosulfonyl)imide (LiN(SO$_2$F)$_2$), lithium bis(trifluoromethanesulfonyl)imide (LiN(CF$_3$SO$_2$)$_2$), lithium bis(pentafluoroethanesulfonyl)imide (LiN(C$_2$F$_5$SO$_2$)$_2$), lithium (trifluoromethanesulfonyl) (pentafluoroethanesulfonyl)imide (LiN(CF$_3$SO$_2$)(C$_2$F$_5$SO$_2$)), lithium (trifluoromethanesulfonyl)(heptafluoropropanesulfonyl)imide (LiN(CF$_3$SO$_2$)(C$_3$F$_7$SO$_2$)), and lithium (trifluoromethanesulfonyl) (nonafluorobutanesulfonyl)imide (LiN(CF$_3$SO$_2$)(C$_4$F$_9$SO$_2$)).

The compound represented by Formula (14) is a cyclic imide compound. Specific examples of the cyclic imide compound include compounds represented by the following respective Formulas (14-1) to (14-4).

[Chem. 19]

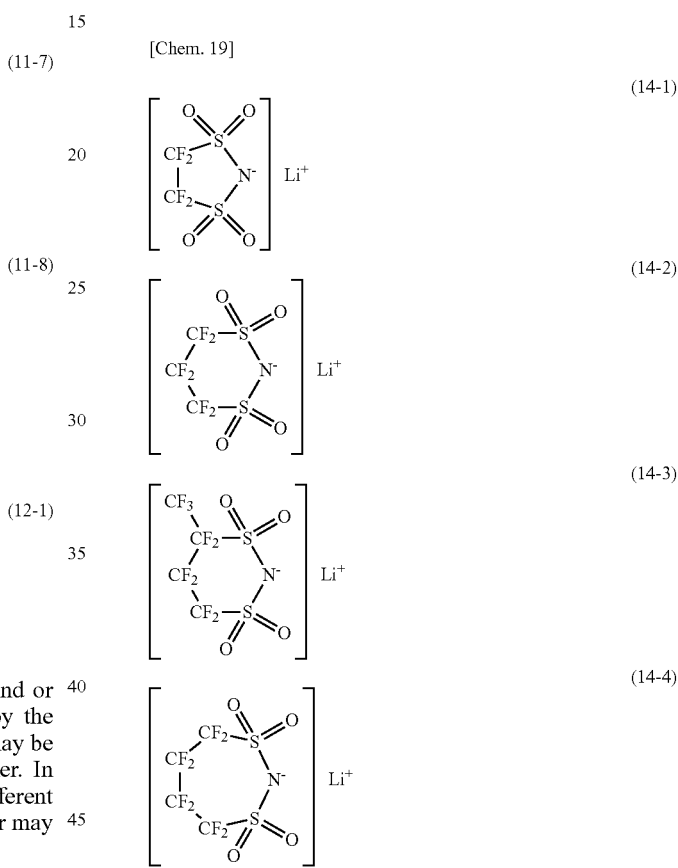

The compound represented by Formula (15) is a chain methide compound. Specific examples of the chain methide compound include lithium tris(trifluoromethanesulfonyl)methide (LiC(CF$_3$SO$_2$)$_3$).

In addition, the electrolyte salt may also be phosphorus and fluorine-containing salts such as lithium difluorophosphate (LiPF$_2$O$_2$) and lithium fluorophosphate (Li$_2$PFO$_3$).

The content of electrolyte salt is not particularly limited but, among others, is preferably 0.3 mol/kg to 3.0 mol/kg with respect to the solvent. This is because high ionic conductivity is attained.

<1-2. Production Method>

The electrolytic solution is produced, for example, according to the following procedure.

In the case of producing an electrolytic solution, an electrolyte salt is added to a solvent and then the solvent is stirred. The electrolyte salt is thus dissolved or dispersed in the solvent. Subsequently, a sulfonamide compound is added to the solvent in which the electrolyte salt is dissolved or dispersed, and then the solvent is stirred. The sulfonyl compound is thus dissolved or dispersed in the solvent. The kind of sulfonamide compound may be only one kind or two or more kinds as described above. In addition, an N-substituted sulfonamide compound may be used together with a sulfonamide compound. The kind of N-substituted sulfonamide compound may be only one kind or two or more kinds as described above. An electrolytic solution containing a sulfonamide compound is thus obtained.

<1-3. Action and Effect>

According to this electrolytic solution, the above-described sulfonamide compound is contained. In this case, as described above, the chemical stability of the electrolytic solution is improved as compared to a case in which the electrolytic solution does not contain a sulfonamide compound and a case in which the electrolytic solution does not contain a sulfonamide compound but contains another compound. Examples of this "another compound" include the N-substituted sulfonamide compound described above. This suppresses the decomposition reaction of the electrolytic solution as well as the generation of gas due to the decomposition reaction of the electrolytic solution. Consequently, the battery characteristics of a secondary battery including this electrolytic solution can be improved.

In particular, when the divalent hydrocarbon group is an alkylene group or the like, the divalent halogenated hydrocarbon group is a halogenated group of the divalent hydrocarbon group described above, and the monovalent hydrocarbon group is an alkyl group or the like, the monovalent nitrogen-containing hydrocarbon group is a monovalent nitrogen-containing bond group or the like, the monovalent oxygen-containing hydrocarbon group is a monovalent oxygen-containing bond group or the like, the monovalent sulfur-containing hydrocarbon group is a monovalent sulfur-containing bond group or the like, the monovalent halogenated hydrocarbon group is a halogenated group of the monovalent hydrocarbon group described above, and the halogen group is a fluorine group or the like, the chemical stability of the electrolytic solution is sufficiently improved, and thus a higher effect can be attained.

In addition, when the monovalent nitrogen-containing group is a cyano group or the like, the monovalent oxygen-containing group is a hydroxyl group or the like, and the monovalent sulfur-containing group is a sulfonic acid group or the like, the chemical stability of the electrolytic solution is sufficiently improved, and thus a higher effect can be attained.

In addition, when the divalent hydrocarbon group has 18 or less carbon atoms and the monovalent hydrocarbon group has 18 or less carbon atoms, the solubility, compatibility and the like of the sulfonamide compound are secured, and thus a higher effect can be attained.

In addition, when the content of sulfonamide compound in the electrolytic solution is 0.001% by weight to 10% by weight or less, the chemical stability of the electrolytic solution is sufficiently improved, and thus a higher effect can be attained.

In addition, when the electrolytic solution contains an N-substituted sulfonamide compound together with a sulfonamide compound, the chemical stability of the electrolytic solution is further improved by the synergistic action of the two, and thus a higher effect can be attained.

In addition, when the solvent in the electrolytic solution contains each of an unsaturated cyclic carbonate ester, a halogenated cyclic carbonate ester, and a dinitrile compound, the chemical stability of the electrolytic solution is further improved, and thus a higher effect can be attained.

In addition, when the electrolyte salt in the electrolytic solution contains each of lithium tetrafluoroborate, lithium difluorophosphate, and lithium fluorophosphate, the chemical stability of the electrolytic solution is further improved, and thus a higher effect can be attained.

<2. Secondary Battery>

Next, a secondary battery including the electrolytic solution of the present technology described above will be described.

<2-1. Lithium Ion Secondary Battery (Cylindrical Type)>

Figure 2:
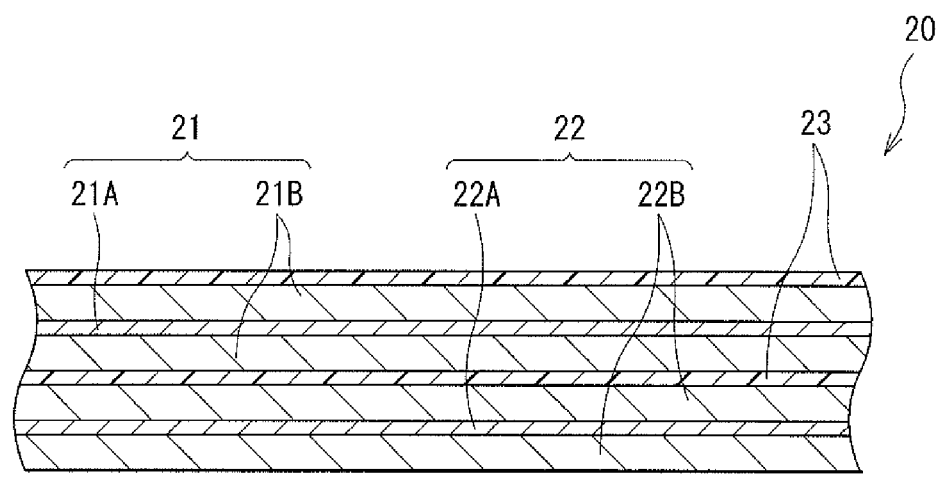
FIG. 2 is an enlarged cross-sectional diagram illustrating a part of the configuration of a wound electrode body illustrated in FIG. 1.

FIG. 1 illustrates a cross-sectional configuration of a secondary battery, and FIG. 2 illustrates an enlarged cross-sectional configuration of a part of a wound electrode body 20 illustrated in FIG. 1.

The secondary battery to be described here is, for example, a lithium ion secondary battery in which the capacity of a negative electrode 22 is attained by storage and release of lithium which is an electrode reactant.

[Overall Configuration]

This secondary battery has a so-called cylindrical type battery structure, and in this secondary battery, a pair of insulating plates 12 and 13 and a wound electrode body 20 which is a battery element are housed inside a hollow cylindrical battery can 11, for example, as illustrated in FIG. 1. In the wound electrode body 20, for example, a positive electrode 21 and a negative electrode 22 are stacked with a separator 23 interposed therebetween and then the positive electrode 21, the negative electrode 22, and the separator 23 are wound. This wound electrode body 20 is impregnated with an electrolytic solution which is a liquid electrolyte.

The battery can 11 has, for example, a hollow structure in which one end portion is closed as well as the other end portion is opened and includes any one kind or two or more kinds among, for example, iron, aluminum, and alloys thereof. Nickel and the like may be plated on the surface of this battery can 11. The pair of insulating plates 12 and 13 are disposed so as to sandwich the wound electrode body 20 therebetween as well as to extend perpendicularly to the wound peripheral surface.

A battery lid 14, a safety valve mechanism 15, and a heat sensitive resistance element (PTC element) 16 are crimped to the open end portion of the battery can 11 with a gasket 17 interposed therebetween. The battery can 11 is thus sealed. The battery lid 14 is formed of, for example, a material similar to that of the battery can 11. Each of the safety valve mechanism 15 and the heat sensitive resistance element 16 is provided inside the battery lid 14, and the safety valve mechanism 15 is electrically connected to the battery lid 14 via the heat sensitive resistance element 16. In this safety valve mechanism 15, a disk plate 15A is reversed when the internal pressure is raised to a certain value or more by an internal short circuit or external heating or the like. The electrical connection between the battery lid 14 and the wound electrode body 20 is thus disconnected. In order to prevent abnormal heat generation due to a large current, the resistance of the heat sensitive resistance element 16 increases as the temperature increases. The gasket 17 is formed of, for example, an insulating material, and the surface of the gasket 17 may be coated with asphalt and the like.

For example, a center pin 24 is inserted in the winding center of the wound electrode body 20. However, the center pin 24 may not be inserted in the winding center of the wound electrode body 20. A positive electrode lead 25 is attached to the positive electrode 21 as well as a negative electrode lead 26 is attached to the negative electrode 22. The positive electrode lead 25 contains, for example, a conductive material such as aluminum. This positive electrode lead 25 is, for example, attached to the safety valve mechanism 15 as well as electrically connected to the battery lid 14. The negative electrode lead 26 contains, for example, a conductive material such as nickel. This negative electrode lead 26 is, for example, attached to the battery can 11 and electrically connected to the battery can 11.

[Positive Electrode]

The positive electrode 21 includes a positive electrode current collector 21A and a positive electrode active material layer 21B provided on each of both surfaces of the positive electrode current collector 21A, for example, as illustrated in FIG. 2. However, the positive electrode active material layer 21B may be provided only on one surface of the positive electrode current collector 21A.

The positive electrode current collector 21A contains any one kind or two or more kinds among, for example, conductive materials. The kind of conductive material is not particularly limited, and examples thereof include metal materials such as aluminum, nickel, and stainless steel. This positive electrode current collector 21A may be a single layer or a multilayer.

The positive electrode active material layer 21B contains any one kind or two or more kinds among positive electrode materials capable of storing and releasing lithium as a positive electrode active material. However, the positive electrode active material layer 21B may contain any one kind or two or more kinds among other materials such as a positive electrode binder and a positive electrode conductive agent in addition to the positive electrode active material.

The positive electrode material is preferably a lithium-containing compound, and more specifically either or both of a lithium-containing composite oxide and a lithium-containing phosphate compound are preferable. This is because a high energy density can be attained.

A lithium-containing composite oxide is an oxide containing lithium and one or two or more other elements (elements other than lithium) as constituent elements and has any crystal structure among, for example, a layered rock salt type crystal structure and a spinel type crystal structure. A lithium-containing phosphate compound is a phosphate compound containing lithium and one or two or more other elements as constituent elements and has, for example, an olivine type crystal structure.

The kind of other elements is not particularly limited as long as it is any one kind or two or more kinds among arbitrary elements. Among others, the other elements are preferably any one kind or two or more kinds among elements belonging to groups 2 to 15 in the extended periodic table. More specifically, the other elements more preferably include any one kind or two or more kinds of metal elements among nickel (Ni), cobalt (Co), manganese (Mn), and iron (Fe). This is because a high voltage is attained.

Examples of the lithium-containing composite oxide having a layered rock salt type crystal structure include compounds represented by the following respective Formulas (21) to (23).

$$Li_aMn_{(1-b-c)}Ni_bM11_cO_{(2-d)}F_e \tag{21}$$

M11 represents at least one kind among cobalt (Co), magnesium (Mg), aluminum (Al), boron (B), titanium (Ti), vanadium (V), chromium (Cr), iron (Fe), copper (Cu), zinc (Zn), zirconium (Zr), molybdenum (Mo), tin (Sn), calcium (Ca), strontium (Sr), and tungsten (W). a to e satisfy $0.8 \le a \le 1.2$, $0 < b < 0.5$, $0 \le c \le 0.5$, $(b+c) < 1$, $-0.1 \le d \le 0.2$, and $0 \le e \le 0.1$. However, the composition of lithium varies depending on the charged and discharged state, and a represents a value in a fully discharged state.

$$Li_aNi_{(1-b)}M12_bO_{(2-c)}F_d \tag{22}$$

M12 represents at least one kind among cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W). a to d satisfy $0.8 \le a \le 1.2$, $0.005 \le b \le 0.5$, $-0.1 \le c \le 0.2$, and $0 \le d \le 0.1$. However, the composition of lithium varies depending on the charged and discharged state, and a represents a value in a fully discharged state.

$$Li_aCO_{(1-b)}M13_bO_{(2-c)}F_d \tag{23}$$

M13 represents at least one kind among nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W). a to d satisfy $0.8 \le a \le 1.2$, $0 \le b \le 0.5$, $-0.1 \le c \le 0.2$, and $0 \le d \le 0.1$. However, the composition of lithium varies depending on the charged and discharged state, and a represents a value in a fully discharged state.

Specific examples of the lithium-containing composite oxide having a layered rock salt type crystal structure include LiNiO$_2$, LiCoO$_2$, LiCo$_{0.98}$Al$_{0.01}$Mg$_{0.01}$O$_2$, LiNi$_{0.5}$CO$_{0.2}$Mn$_{0.3}$O$_2$, LiNi$_{0.8}$CO$_{0.15}$Al$_{0.05}$O$_2$, LiNi$_{0.33}$Co$_{0.33}$Mn$_{0.33}$O$_2$, Li$_{1.2}$Mn$_{0.52}$Co$_{0.52}$Ni$_{0.1}$O$_2$, and Li$_{1.15}$(Mn$_{0.65}$Ni$_{0.22}$Co$_{0.13}$)O$_2$.

Incidentally, in a case in which the lithium-containing composite oxide having a layered rock salt type crystal structure contains nickel, cobalt, manganese, and aluminum as constituent elements, the atomic ratio of nickel is preferably 50 atomic % or more. This is because a high energy density can be attained.

The lithium-containing composite oxide having a spinel type crystal structure is, for example, a compound represented by the following Formula (24).

$$Li_aMn_{(2-b)}M14_bO_cF_d \tag{24}$$

M14 represents at least one kind among cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W). a to d satisfy $0.9 \le a \le 1.1$, $0 \le b \le 0.6$, $3.7 \le c \le 4.1$, and $0 \le d \le 0.1$. However, the composition of lithium varies depending on the charged and discharged state, and a represents a value in a fully discharged state.

Specific examples of the lithium-containing composite oxide having a spinel type crystal structure include LiMn$_2$O$_4$.

Examples of the lithium-containing phosphate compound having an olivine type crystal structure include a compound represented by the following Formula (25).

$$Li_aM15PO_4 \tag{25}$$

M15 represents at least one kind among cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W), and zirconium (Zr). a satisfies $0.9 \le a \le 1.1$. However, the composition of lithium varies depending on the charged and discharged state, and a represents a value in a fully discharged state.

Specific examples of the lithium-containing phosphate compound having an olivine type crystal structure include $LiFePO_4$, $LiMnPO_4$, $LiFe_{0.5}Mn_{0.5}PO_4$, and $LiFe_{0.3}Mn_{0.7}PO_4$.

Incidentally, the lithium-containing composite oxide may be a compound represented by the following Formula (26).

$$(Li_2MnO_3)_x(LiMnO_2)_{1-x} \quad (26)$$

x satisfies 0≤x≤1. However, the composition of lithium varies depending on the charged and discharged state, and x represents a value in a fully discharged state.

In addition to these, the positive electrode material may be any one kind or two or more kinds among, for example, oxides, disulfides, chalcogenides, and conductive polymers. Examples of the oxides include titanium oxide, vanadium oxide, and manganese dioxide. Examples of the disulfides include titanium disulfide and molybdenum sulfide. Examples of the chalcogenides include niobium selenide. Examples of the conductive polymers include sulfur, polyaniline, and polythiophene. However, the positive electrode material may be a material other than the above materials.

The positive electrode binder contains any one kind or two or more kinds among, for example, synthetic rubber and polymer compounds. Examples of the synthetic rubber include styrene butadiene-based rubber, fluorine-based rubber, and ethylene propylene diene. Examples of the polymer compounds include polyvinylidene fluoride and polyimide.

The positive electrode conductive agent contains any one kind or two or more kinds among, for example, carbon materials. Examples of these carbon materials include graphite, carbon black, acetylene black, and ketjen black. However, the positive electrode conductive agent may be a metal material, a conductive polymer and the like as long as they are materials exhibiting conductivity.

[Negative Electrode]

The negative electrode 22 includes a negative electrode current collector 22A and a negative electrode active material layer 22B provided on each of both surfaces of the negative electrode current collector 22A, for example, as illustrated in FIG. 2. However, the negative electrode active material layer 22B may be provided only on one surface of the negative electrode current collector 22A.

The negative electrode current collector 22A contains any one kind or two or more kinds among, for example, conductive materials. The kind of conductive material is not specifically limited, and examples thereof include metal materials such as copper, aluminum, nickel, and stainless steel. This negative electrode current collector 22A may be a single layer or a multilayer.

It is preferable that the surface of the negative electrode current collector 22A is roughened. This is because the close contact property of the negative electrode active material layer 22B to the negative electrode current collector 22A is improved by the so-called anchor effect. In this case, the surface of the negative electrode current collector 22A may be roughened at least in a region facing the negative electrode active material layer 22B. Examples of the roughening method include a method in which fine particles are formed by utilizing an electrolytic treatment. In the electrolytic treatment, fine particles are formed on the surface of the negative electrode current collector 22A in an electrolytic bath by an electrolytic method, and thus irregularities are provided on the surface of the negative electrode current collector 22A. A copper foil fabricated by an electrolytic method is generally called an electrolytic copper foil.

The negative electrode active material layer 22B contains any one kind or two or more kinds among negative electrode materials capable of storing and releasing lithium as a negative electrode active material. However, the negative electrode active material layer 22B may contain any one kind or two or more kinds among other materials such as a negative electrode binder and a negative electrode conductive agent in addition to the negative electrode active material.

In order to prevent unintentional precipitation of lithium metal on the negative electrode 22 during charging, it is preferable that the chargeable capacity of the negative electrode material is greater than the discharge capacity of the positive electrode 21. In other words, it is preferable that the electrochemical equivalent of the negative electrode material capable of storing and releasing lithium is greater than the electrochemical equivalent of the positive electrode 21.

The negative electrode material is, for example, any one kind or two or more kinds among carbon materials. This is because the change in crystal structure at the time of storage and release of lithium is significantly small and thus a high energy density is stably attained. In addition, this is because a carbon material also functions as a negative electrode conductive agent and thus the conductivity of the negative electrode active material layer 22B is improved.

Examples of the carbon material include graphitizable carbon, non-graphitizable carbon, and graphite. However, the spacing of the (002) plane in the non-graphitizable carbon is preferably 0.37 nm or more as well as the spacing of the (002) plane in the graphite is preferably 0.34 nm or less. More specific examples of the carbon material include pyrolytic carbons, cokes, glassy carbon fibers, organic polymer compound fired bodies, activated carbon, and carbon blacks. The cokes include pitch coke, needle coke, petroleum coke and the like. An organic polymer compound fired body is obtained by firing (carbonizing) a polymer compound such as a phenol resin and a furan resin at a proper temperature. In addition to these, the carbon material may be low crystalline carbon subjected to a heat treatment at a temperature of about 1000° C. or less or amorphous carbon. Incidentally, the shape of the carbon material may be any of a fibrous shape, a spherical shape, a granular shape, and a scale shape.

In addition, the negative electrode material is, for example, a material (metal-based material) containing any one kind or two or more kinds among metal elements and metalloid elements as constituent elements. This is because a high energy density can be attained.

The metal-based material may be any of a simple substance, an alloy, and a compound, two or more kinds among these, or a material having phases of one kind or two or more kinds among these at least at a part. However, the alloy includes a material containing one or more kinds of metal elements and one or more kinds of metalloid elements in addition to a material composed of two or more kinds of metal elements. In addition, the alloy may contain a non-metallic element. The construction of this metal-based material is, for example, a solid solution, a eutectic (eutectic mixture), an intermetallic compound, and a material in which two or more kinds among these coexist.

The metal element and metalloid element described above are, for example, any one kind or two or more kinds among metal elements and metalloid elements capable of forming an alloy with lithium. Specific examples thereof include magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc, hafnium (Hf), zirconium, yttrium (Y), palladium (Pd), and platinum (Pt).

Among these, either or both of silicon and tin are preferable. This is because the ability to store and release lithium is excellent and thus a significantly high energy density is attained.

The material containing either or both of silicon and tin as a constituent element may be any of a simple substance, alloy, and compound of silicon, any of a simple substance, alloy, and compound of tin, two or more kinds among these, or a material having phases of one kind or two or more kinds among these at least at a part. The simple substance to be described here means a simple substance (which may contain a small amount of impurities) in a general sense to the utmost but does not necessarily mean to have a purity of 100%.

The alloy of silicon contains any one kind or two or more kinds among tin, nickel, copper, iron, cobalt, manganese, zinc, indium, silver, titanium, germanium, bismuth, antimony, chromium, and the like, for example, as constituent elements other than silicon. The compound of silicon contains any one kind or two or more kinds among carbon, oxygen and the like, for example, as constituent elements other than silicon. Incidentally, the compound of silicon may contain any one kind or two or more kinds among a series of elements described in the alloy of silicon, for example, as constituent elements other than silicon.

Specific examples of each of the alloy of silicon and the compound of silicon include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ (0<v≤2), and LiSiO. Incidentally, v in $SiO_v$ may be 0.2<v<1.4.

The alloy of tin contains any one kind or two or more kinds among silicon, nickel, copper, iron, cobalt, manganese, zinc, indium, silver, titanium, germanium, bismuth, antimony, chromium, and the like, for example, as constituent elements other than tin. The compound of tin contains any one kind or two or more kinds among carbon, oxygen and the like, for example, as constituent elements other than tin. Incidentally, the compound of tin may contain any one kind or two or more kinds among a series of elements described in the alloy of tin, for example, as constituent elements other than tin.

Specific examples of the alloy of tin and compound of tin include $SnO_w$ (0<w≤2), $SnSiO_3$, LiSnO, and $Mg_2Sn$.

In particular, the material containing tin as a constituent element is preferably, for example, a material (Sn-containing material) containing a second constituent element and a third constituent element together with tin which is a first constituent element. The second constituent element includes any one kind or two or more kinds among, for example, cobalt, iron, magnesium, titanium, vanadium, chromium, manganese, nickel, copper, zinc, gallium, zirconium, niobium, molybdenum, silver, indium, cesium (Ce), hafnium (Hf), tantalum, tungsten, bismuth, and silicon. The third constituent element includes any one kind or two or more kinds among, for example, boron, carbon, aluminum, and phosphorus. This is because a high battery capacity, excellent cycle characteristics and the like are attained as the Sn-containing material contains the second and third constituent elements.

Among these, the Sn-containing material is preferably a material (SnCoC-containing material) containing tin, cobalt, and carbon as constituent elements. In this SnCoC-containing material, for example, the carbon content is 9.9% by mass to 29.7% by mass and the proportion (Co/(Sn+Co)) of tin and cobalt content is 20% by mass to 70% by mass. This is because a high energy density can be attained.

It is preferable that the SnCoC-containing material has a phase containing tin, cobalt, and carbon and the phase is low crystalline or amorphous. This phase is a reaction phase capable of reacting with lithium, and thus excellent characteristics are attained by the presence of this reaction phase. It is preferable that the half value width (diffraction angle 2θ) of the diffraction peak attained by X-ray diffraction of this reaction phase is 1° or more when CuKα ray is used as the specific X-ray as well as the insertion speed is set to 1°/min. This is because lithium is more smoothly stored and released and the reactivity with the electrolytic solution decreases. Incidentally, there is also a case in which the SnCoC-containing material has a phase containing a simple substance or a part of the respective constituent elements in addition to a low crystalline or amorphous phase.

It can be easily judged whether or not the diffraction peak attained by X-ray diffraction corresponds to a reaction phase capable of reacting with lithium when the X-ray diffraction charts before and after the electrochemical reaction with lithium are compared to each other. For example, when the position of the diffraction peak changes before and after the electrochemical reaction with lithium, the diffraction peak corresponds to a reaction phase capable of reacting with lithium. In this case, for example, a diffraction peak of a low crystalline or amorphous reaction phase is observed at between 2θ=20° and 50°. It is considered that such a reaction phase contains, for example, the respective constituent elements described above and is low crystallized or amorphized mainly by the presence of carbon.

In the SnCoC-containing material, it is preferable that at least a part of carbon which is a constituent element is bonded to a metal element or a metalloid element which is another constituent element. This is because aggregation or crystallization of tin and the like is suppressed. The bonding state of elements can be confirmed using, for example, X-ray photoelectron spectroscopy (XPS). In a commercially available apparatus, for example, Al-Kα ray or Mg-Kα ray is used as the soft X-ray. In a case in which at least a part of carbon is bonded to a metal element, a metalloid element or the like, the peak of the synthetic wave at the carbon is orbitals (C1s) appears in a region lower than 284.5 eV. Incidentally, the energy calibration is performed so that the peak of the gold atom 4f orbitals (Au4f) is attained at 84.0 eV. At this time, surface-contaminated carbon is usually present on the surface of a substance, and thus the C1s peak of the surface-contaminated carbon is set to 284.8 eV, and this peak is used as an energy reference. In XPS measurement, the waveform of the C1s peak is attained in a form including the peak of surface-contaminated carbon and the peak of carbon in the SnCoC-containing material. For this reason, both peaks are separated from each other by being analyzed using, for example, commercially available software. In the analysis of waveform, the position of the main peak present on the lowest bound energy side is used as the energy reference (284.8 eV).

This SnCoC-containing material is not limited to a material (SnCoC) of which the constituent elements are only tin, cobalt, and carbon. This SnCoC-containing material may contain, for example, any one kind or two or more kinds among silicon, iron, nickel, chromium, indium, niobium, germanium, titanium, molybdenum, aluminum, phosphorus, gallium, bismuth and the like as a constituent element in addition to tin, cobalt, and carbon.

In addition to the SnCoC-containing material, a material (SnCoFeC-containing material) containing tin, cobalt, iron, and carbon as constituent elements is also preferable. The composition of this SnCoFeC-containing material is arbitrary. As an example, in a case in which the iron content is set to be low, the carbon content is 9.9% by mass to 29.7% by mass, the iron content is 0.3% by mass to 5.9% by mass, and the proportion (Co/(Sn+Co)) of tin and cobalt content is 30% by mass to 70% by mass. In addition, in a case in which the iron content is set to be high, the carbon content is 11.9% by mass to 29.7% by mass, the proportion ((Co+Fe)/(Sn+Co+Fe)) of tin, cobalt, and iron content is 26.4% by mass to 48.5% by mass, and the proportion (Co/(Co+Fe)) of cobalt and iron content is 9.9% by mass to 79.5% by mass. This is because a high energy density is attained in such a composition range. Incidentally, the physical properties (half value width and the like) of the SnCoFeC-containing material are similar to the physical properties of the SnCoC-containing material described above.

In addition to these, the negative electrode material may be any one kind or two or more kinds among, for example, metal oxides and polymer compounds. Examples of the metal oxides include iron oxide, ruthenium oxide, and molybdenum oxide. Examples of the polymer compounds include polyacetylene, polyaniline, and polypyrrole.

Among these, it is preferable that the negative electrode material contains both a carbon material and a metal-based material for the following reasons.

The metal-based material, particularly a material containing either or both of silicon and tin as a constituent element has an advantage of having a high theoretical capacity but has a concern of being likely to violently expand and contract at the time of charging and discharging. On the other hand, the carbon material has a concern of having a low theoretical capacity but has an advantage of being less likely to expand and contract at the time of charging and discharging. Hence, expansion and contraction at the time of charging and discharging is suppressed while a high theoretical capacity (namely, battery capacity) is attained by use of both the carbon material and the metal-based material.

The negative electrode active material layer 22B is formed by any one kind or two or more kinds of methods among, for example, a coating method, a vapor phase method, a liquid phase method, a thermal spraying method, and a firing method (sintering method). The coating method is, for example, a method in which a particle (powder) negative electrode active material is mixed with a negative electrode binder and the like and then the mixture is dispersed in an organic solvent and then applied to the negative electrode current collector 22A. Examples of the vapor phase method include a physical deposition method and a chemical deposition method. More specific examples thereof include a vacuum vapor deposition method, a sputtering method, an ion plating method, a laser ablation method, a thermal chemical vapor deposition method, a chemical vapor deposition (CVD) method, and a plasma chemical vapor deposition method. Examples of the liquid phase method include an electrolytic plating method and an electroless plating method. The thermal spraying method is a method in which a negative electrode active material in a molten or semi-molten state is sprayed onto the negative electrode current collector 22A. A firing method is, for example, a method in which a mixture dispersed in an organic solvent and the like is applied to the negative electrode current collector 22A using a coating method and then subjected to a heat treatment at a temperature higher than the melting point of the negative electrode binder or the like. As this firing method, for example, an atmosphere firing method, a reaction firing method, a hot press firing method and the like can be used.

In this secondary battery, the electrochemical equivalent of the negative electrode material capable of storing and releasing lithium is greater than the electrochemical equivalent of the positive electrode in order to prevent unintentional precipitation of lithium on the negative electrode 22 during charging as described above. In addition, when the open circuit voltage (namely, battery voltage) at full charging is 4.25 V or more, the amount of lithium released per unit mass increases as compared to a case of 4.20 V even when the same positive electrode active material is used, and thus the amount of the positive electrode active material and the amount of the negative electrode active material are adjusted depending on this. A high energy density is thus attained.

[Separator]

The separator 23 is disposed between the positive electrode 21 and the negative electrode 22, for example, as illustrated in FIG. 2. This separator 23 separates the positive electrode 21 and the negative electrode 22 from each other as well as allows lithium ions to pass through while preventing a short circuit of current due to contact between both electrodes.

This separator 23 is, for example, any one kind or two or more kinds among porous films of synthetic resins, ceramics and the like and may be a laminated film of two or more kinds of porous films. Examples of the synthetic resins include polytetrafluoroethylene, polypropylene, and polyethylene.

In particular, the separator 23 may include, for example, the above-described porous film (base material layer) and a polymer compound layer provided on one or both surfaces of the base material layer. This is because the close contact property of the separator 23 to each of the positive electrode 21 and the negative electrode 22 is improved and thus the distortion of the wound electrode body 20 is suppressed. By this, the decomposition reaction of the electrolytic solution is suppressed as well as the leakage of the electrolytic solution impregnated in the base material layer is suppressed, and thus the resistance hardly increases even when charging and discharging is repeated as well as battery swelling is suppressed.

The polymer compound layer contains, for example, a polymer compound such as polyvinylidene fluoride. This is because a polymer compound has excellent physical strength as well as is electrochemically stable. However, the polymer compound may be polymer compounds other than polyvinylidene fluoride. In the case of forming this polymer compound layer, for example, a solution in which a polymer compound is dissolved in an organic solvent and the like is applied to the base material layer and then the base material layer is dried. Incidentally, the base material layer may be immersed in a solution and then dried. This polymer compound layer may contain any one kind or two or more kinds among insulating particles such as inorganic particles. Examples of the kind of inorganic particles include aluminum oxide and aluminum nitride.

[Electrolytic Solution]

The wound electrode body 20 is impregnated with an electrolytic solution as described above. This electrolytic solution has the same configuration as the electrolytic solution of the present technology described above. In other words, the electrolytic solution contains a sulfonamide compound.

[Operation]

This secondary battery operates, for example, as follows.

At the time of charging, lithium ions are released from the positive electrode 21 as well as the lithium ions are stored in the negative electrode 22 via the electrolytic solution. On the other hand, at the time of discharging, lithium ions are released from the negative electrode 22 as well as the lithium ions are stored in the positive electrode 21 via the electrolytic solution.

[Manufacturing Method]

This secondary battery is manufactured, for example, according to the following procedure.

In the case of fabricating the positive electrode 21, first, a positive electrode active material and, if necessary, a positive electrode binder, a positive electrode conductive agent and the like are mixed together to obtain a positive electrode mixture. Subsequently, the positive electrode mixture is dispersed in an organic solvent and the like to obtain a paste-like positive electrode mixture slurry. Subsequently, the positive electrode mixture slurry is applied to both surfaces of the positive electrode current collector 21A and then dried to form the positive electrode active material layer 21B. Subsequently, the positive electrode active material layer 21B is compression-molded using a roll press and the like while being heated, if necessary. In this case, compression molding may be repeated a plurality of times.

In the case of fabricating the negative electrode 22, the negative electrode active material layer 22B is formed on both surfaces of the negative electrode current collector 22A according to the same procedure as that for the positive electrode 21 described above. Specifically, a negative electrode active material is mixed with a negative positive electrode binder, a negative electrode conductive agent and the like to obtain a negative electrode mixture, and then the negative electrode mixture is dispersed in an organic solvent and the like to obtain a paste-like negative electrode mixture slurry. Finally, the negative electrode mixture slurry is applied to both surfaces of the negative electrode current collector 22A and then dried to form the negative electrode active material layer 22B. Finally, the negative electrode active material layer 22B is compression-molded using a roll press and the like.

In the case of assembling a secondary battery, the positive electrode lead 25 is attached to the positive electrode current collector 21A by a welding method and the like as well as the negative electrode lead 26 is attached to the negative electrode current collector 22A by a welding method and the like. Subsequently, the positive electrode 21 and the negative electrode 22 are stacked with the separator 23 interposed therebetween, and then the positive electrode 21, the negative electrode 22, and the separator 23 are wound to form the wound electrode body 20. Subsequently, the center pin 24 is inserted into the winding center of the wound electrode body 20.

Subsequently, the wound electrode body 20 is housed inside the battery can 11 while being sandwiched between the pair of insulating plates 12 and 13. In this case, the tip portion of the positive electrode lead 25 is attached to the safety valve mechanism 15 by a welding method and the like as well as the tip portion of the negative electrode lead 26 is attached to the battery can 11 by a welding method and the like. Subsequently, an electrolytic solution is injected into the battery can 11 to impregnate the wound electrode body 20 with the electrolytic solution. Finally, the battery lid 14, the safety valve mechanism 15, and the heat sensitive resistance element 16 are crimped to the opening end portion of the battery can 11 with the gasket 17 interposed therebetween. A cylindrical type secondary battery is thus completed.

[Action and Effect]

According to this cylindrical type lithium ion secondary battery, the electrolytic solution has a configuration similar to that of the electrolytic solution of the present technology described above and thus the decomposition reaction of the electrolytic solution is suppressed at the time of use (charging and discharging) and preservation of the secondary battery as described above. Consequently, excellent battery characteristics can be attained. The actions and effects other than this are similar to the actions and effects of the electrolytic solution of the present are.

<2-2. Lithium Ion Secondary Battery (Laminated Film Type)>

Figure 3:
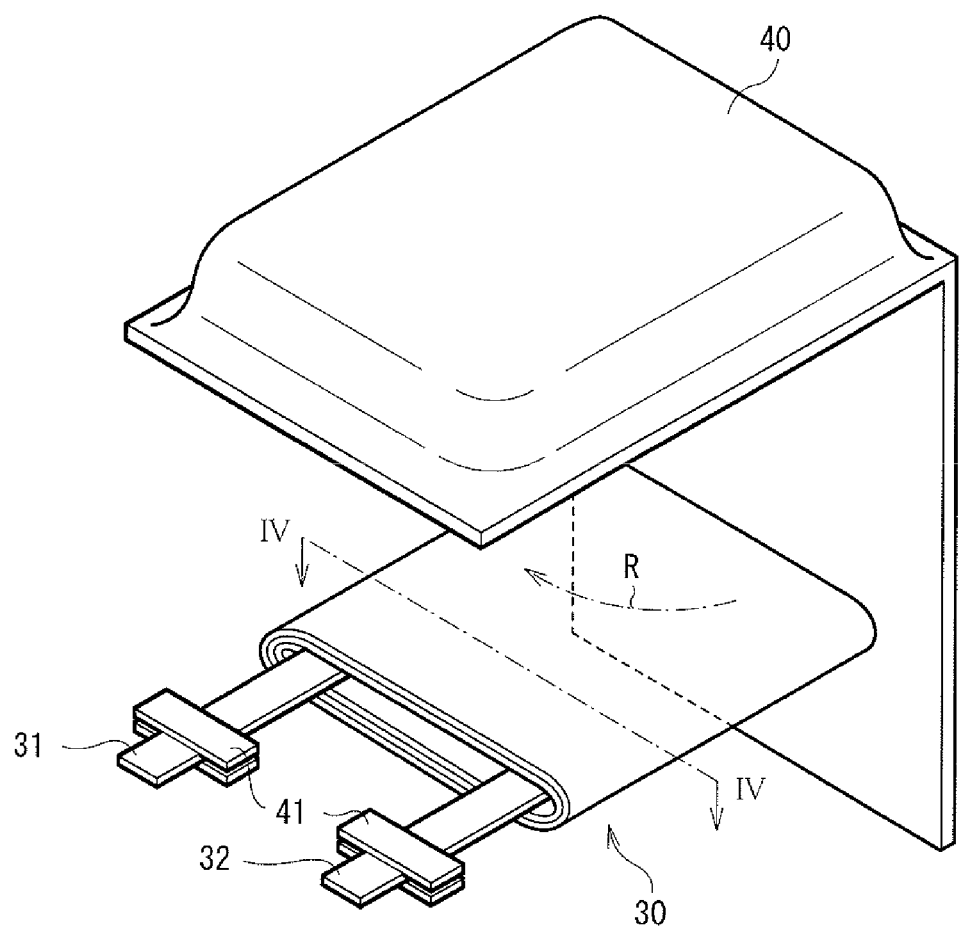
FIG. 3 is a perspective diagram illustrating the configuration of a secondary battery (laminated film type) according to an embodiment of the present technology.
Figure 4:
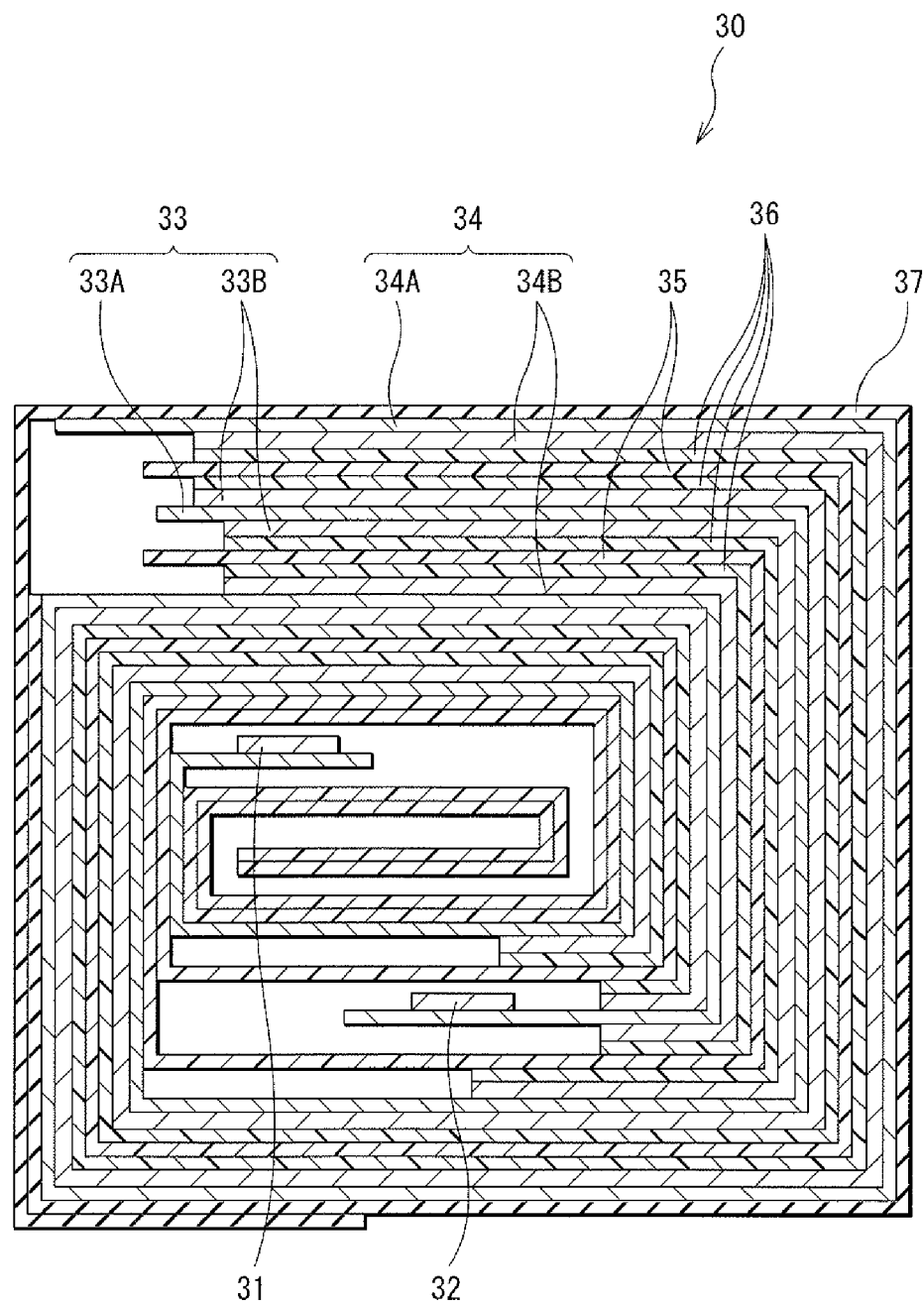
FIG. 4 is a cross-sectional diagram illustrating the configuration of a wound electrode body taken along the line IV-IV in FIG. 3.

FIG. 3 illustrates a perspective configuration of another secondary battery, and FIG. 4 illustrates a cross section of a wound electrode body 30 taken along the line IV-IV in FIG. 3. Incidentally, a state in which the wound electrode body 30 and an exterior member 40 are distant from each other is illustrated in FIG. 3.

In the following description, the constituent elements of the cylindrical type secondary battery already described are referred to as needed.

[Overall Configuration]

This secondary battery is a lithium ion secondary battery having a so-called laminated film type battery structure, and the wound electrode body 30 which is a battery element is housed inside a film-shaped exterior member 40, for example, as illustrated in FIG. 3. In the wound electrode body 30, for example, a positive electrode 33 and a negative electrode 34 are stacked with a separator 35 and an electrolyte layer 36 interposed therebetween, and then the positive electrode 33, the negative electrode 34, the separator 35, and the electrolyte layer 36 are wound. A positive electrode lead 31 is attached to the positive electrode 33 as well as a negative electrode lead 32 is attached to the negative electrode 34. The outermost peripheral portion of the wound electrode body 30 is protected by a protective tape 37.

Each of the positive electrode lead 31 and the negative electrode lead 32 is led out in the same direction, for example, from the inside to the outside of the exterior member 40. The positive electrode lead 31 contains any one kind or two or more kinds among, for example, conductive materials such as aluminum (Al). The negative electrode lead 32 contains any one kind or two or more kinds among, for example, conductive materials such as copper (Cu), nickel (Ni), and stainless steel. These conductive materials have, for example, a thin plate shape or a mesh shape.

The exterior member 40 is, for example, one sheet of film capable of being folded in the direction of the arrow R illustrated in FIG. 3, and a part of the exterior member 40 is provided with a hollow for housing the wound electrode body 30. This exterior member 40 is, for example, a laminated film in which a fusion layer, a metal layer, and a surface protective layer are laminated in this order. In the manufacturing process of the secondary battery, the exterior member 40 is folded so that the fusion layers face each other with the wound electrode body 30 interposed therebetween, and then the peripheral edge portions of the fusion layers are fused to each other. However, the exterior member 40 may be one in which two sheets of laminated films are pasted to each other with an adhesive or the like interposed therebetween. The fusion layer is, for example, any one kind or two or more kinds of films among polyethylene, polypropylene and the like. The metal layer is, for example, any one kind or two or more kinds among an aluminum foil and the like. The surface protective layer is, for example, any one kind or two or more kinds of films among nylon, polyethylene terephthalate and the like.

Among these, the exterior member 40 is preferably an aluminum laminated film in which a polyethylene film, an aluminum foil, and a nylon film are laminated in this order. However, the exterior member 40 may be a laminated film having another laminated structure, a polymer film of polypropylene or the like, or a metal film.

For example, a close contact film 41 is inserted between the exterior member 40 and the positive electrode lead 31 in order to prevent intrusion of outside air. In addition, for example, the close contact film 41 described above is inserted between the exterior member 40 and the negative electrode lead 32. This close contact film 41 contains a material exhibiting close contact property to both the positive electrode lead 31 and the negative electrode lead 32. This material exhibiting close contact property is, for example, a polyolefin resin and more specifically, any one kind or two or more kinds among polyethylene, polypropylene, modified polyethylene, and modified polypropylene.

[Positive Electrode, Negative Electrode, and Separator]

The positive electrode 33 includes, for example, a positive electrode current collector 33A and a positive electrode active material layer 33B as well as the negative electrode 34 includes, for example, a negative electrode current collector 34A and a negative electrode active material layer 34B. The configurations of the positive electrode current collector 33A, positive electrode active material layer 33B, negative electrode current collector 34A, and negative electrode active material layer 34B are, for example, similar to the configurations of the positive electrode current collector 21A, the positive electrode active material layer 21B, negative electrode current collector 22A, and negative electrode active material layer 22B. The configuration of the separator 35 is, for example, similar to the configuration of the separator 23.

[Electrolyte Layer]

The electrolyte layer 36 contains an electrolytic solution and a polymer compound, and the electrolytic solution has a configuration similar to that of the electrolytic solution of the present technology. In other words, the electrolytic solution contains a sulfonyl compound. The electrolyte layer 36 to be described here is a so-called gel-like electrolyte, and the electrolytic solution is retained by the polymer compound. This is because high ionic conductivity (for example, 1 mS/cm or more at room temperature) is attained as well as leakage of the electrolytic solution is prevented. Incidentally, the electrolyte layer 36 may further contain any one kind or two or more kinds among other materials such as additives.

The polymer compound includes, for example, any one kind or two or more kinds among polyacrylonitrile, polyvinylidene fluoride, polytetrafluoroethylene, polyhexafluoropropylene, polyethylene oxide, polypropylene oxide, polyphosphazene, polysiloxane, polyvinyl fluoride, polyvinyl acetate, polyvinyl alcohol, polymethyl methacrylate, polyacrylic acid, polymethacrylic acid, styrene-butadiene rubber, nitrile-butadiene rubber, polystyrene, and polycarbonate. In addition to these, the polymer compound may be a copolymer. This copolymer is, for example, a copolymer of vinylidene fluoride and hexafluoropyrene. Among these, polyvinylidene fluoride is preferable as the homopolymer as well as a copolymer of vinylidene fluoride and hexafluoropyrene is preferable as the copolymer. This is because these are electrochemically stable.

In the electrolyte layer 36 which is a gel-like electrolyte, the solvent contained in the electrolytic solution is a broad concept including not only a liquid material but also a material exhibiting ion conductivity capable of dissociating an electrolyte salt. Hence, in the case of using a polymer compound exhibiting ion conductivity, the polymer compound is also included in the non-aqueous solvent.

Incidentally, the electrolytic solution may be used as it is instead of the electrolyte layer 36. In this case, the wound electrode body 30 is impregnated with the electrolytic solution.

[Operation]

This secondary battery operates, for example, as follows.

At the time of charging, lithium ions are released from the positive electrode 33 as well as the lithium ions are stored in the negative electrode 34 via the electrolyte layer 36. On the other hand, at the time of discharging, lithium ions are released from the negative electrode 34 as well as the lithium ions are stored in the positive electrode 33 via the electrolyte layer 36.

[Manufacturing Method]

The secondary battery including the gel-like electrolyte layer 36 is manufactured, for example, according to the following three kinds of procedures.

In the first procedure, the positive electrode 33 and the negative electrode 34 are fabricated by fabrication procedures similar to those for the positive electrode 21 and the negative electrode 22. In other words, the positive electrode active material layer 33B is formed on both surfaces of the positive electrode current collector 33A in the case of fabricating the positive electrode 33 as well as the negative electrode active material layer 34B is formed on both surfaces of the negative electrode current collector 34A in the case of fabricating the negative electrode 34. Subsequently, a precursor solution is prepared by mixing an electrolytic solution, a polymer compound, an organic solvent and the like together. Subsequently, the precursor solution is applied to the positive electrode 33 and then dried to form the gel-like electrolyte layer 36. In addition, the precursor solution is applied to the negative electrode 34 and then dried to form the gel-like electrolyte layer 36. Subsequently, the positive electrode lead 31 is attached to the positive electrode current collector 33A by a welding method and the like as well as the negative electrode lead 32 is attached to the negative electrode current collector 34A by a welding method and the like. Subsequently, the positive electrode 33 and the negative electrode 34 are stacked with the separator 35 interposed therebetween, and then the positive electrode 33, the negative electrode 34, and the separator 35 are wound to form the wound electrode body 30. Subsequently, the protective tape 37 is pasted to the outermost peripheral portion of the wound electrode body 30. Finally, the exterior member 40 is folded so as to sandwich the wound electrode body 30 therebetween and then the peripheral edge portions of the exterior member 40 are fused to each other by a heat seal method and the like to encapsulate the wound electrode body 30 inside the exterior member 40. In this case, the close contact film 41 is inserted between the positive electrode lead 31 and the exterior member 40 as well as between the negative electrode lead 32 and the exterior member 40.

In the second procedure, the positive electrode lead 31 is attached to the positive electrode 33 as well as the negative electrode lead 32 is attached to the negative electrode 34. Subsequently, the positive electrode 33 and the negative electrode 34 are stacked with the separator 35 interposed therebetween and then wound to fabricate a wound body which is a precursor of the wound electrode body 30, and then the protective tape 37 is pasted to the outermost peripheral portion of the wound body. Subsequently, the exterior member 40 is folded so as to sandwich the wound electrode body 30 therebetween and then the remaining peripheral edge portions of the exterior member 40 excluding the peripheral edge portion on one side are fused to each other by a heat seal method and the like to house the wound body inside the bag-shaped exterior member 40. Subsequently, an electrolyte composition is prepared by mixing an electrolytic solution, a monomer which is a raw material of a polymer compound, a polymerization initiator, and, if necessary, other materials such as a polymerization inhibitor together. Subsequently, the electrolyte composition is injected into the bag-shaped exterior member 40, and then the exterior member 40 is sealed by a heat seal method and the like. Subsequently, a polymer compound is formed by thermally polymerizing the monomer. By this, the electrolytic solution is retained by the polymer compound, and the gel-like electrolyte layer 36 is thus formed.

In the third procedure, a wound body is fabricated and housed inside the bag-shaped exterior member 40 in the same manner as in the second procedure described above except that the separator 35 on which a polymer compound layer is formed is used. Subsequently, the electrolytic solution is prepared and injected into the exterior member 40, and then the opening portion of the exterior member 40 is sealed by a heat seal method and the like. Subsequently, the separator 35 is brought into close contact with the positive electrode 33 with the polymer compound layer interposed therebetween as well as the separator 35 is brought into close contact with the negative electrode 34 with the polymer compound layer interposed therebetween by heating the exterior member 40 while applying a load to the exterior member 40. By this, each of the polymer compound layers is impregnated with the electrolytic solution as well as each of the polymer compound layers gelates, and the electrolyte layer 36 is thus formed.

Swelling of the secondary battery is suppressed in this third procedure more than in the first procedure. Moreover, the non-aqueous solvent and the monomer (raw material of polymer compound) and the like hardly remain in the electrolyte layer 36 in the third procedure as compared to the second procedure, and thus the step of forming a polymer compound is favorably controlled. For this reason, each of the positive electrode 33, the negative electrode 34, and the separator 35 is brought into sufficiently close contact with the electrolyte layer 36.

[Action and Effect]

According to this laminated film type lithium ion secondary battery, the electrolyte layer 36 contains an electrolytic solution, and the electrolytic solution has a configuration similar to that of the electrolytic solution of the present technology, and thus excellent battery characteristics can be attained for the same reasons as those in the cylindrical type lithium ion secondary battery described above. The operations and effects other than these are similar to the operations and effects of the cylindrical type lithium ion secondary battery.

<2-3. Lithium Metal Secondary Battery>

The secondary battery to be described here is a cylindrical type lithium metal secondary battery in which the capacity of a negative electrode 22 is attained by precipitation and dissolution of lithium metal. This secondary battery has a configuration similar to that of the cylindrical type lithium ion secondary battery described above except that the negative electrode active material layer 22B is formed of lithium metal, and is manufactured by the same procedures as those for the cylindrical type lithium ion secondary battery.

A high energy density is attained since lithium metal is used as the negative electrode active material in this secondary battery. The negative electrode active material layer 22B may be already present from the time of assembly but may be not present at the time of assembly and may be formed of lithium metal precipitated at the time of charging. In addition, the negative electrode active material layer 22B may be utilized as a current collector so that the negative electrode current collector 22A may be omitted.

This secondary battery operates, for example, as follows. At the time of charging, lithium ions are released from the positive electrode 21 as well as the lithium ions are precipitated as lithium metal on the surface of the negative electrode current collector 22A via the electrolytic solution. On the other hand, at the time of discharging, lithium metal converts into lithium ions and elutes from the negative electrode active material layer 22B into the electrolytic solution as well as the lithium ions are stored in the positive electrode 21 via the electrolytic solution.

According to this cylindrical type lithium metal secondary battery, the electrolytic solution has a configuration similar to that of the electrolytic solution of the present technology, and thus excellent battery characteristics can be attained for the same reasons as those in the lithium ion secondary battery described above. The operations and effects other than these are similar to the operations and effects of the lithium ion secondary battery.

Incidentally, the configuration of the lithium metal secondary battery described here may be applied to a laminated film type secondary battery instead of a cylindrical type secondary battery. In this case as well, a similar effect can be attained.

<3. Application of Secondary Battery>

Next, application examples of the above-described secondary batteries will be described.

The applications of the secondary batteries are not particularly limited as long as these are machines, devices, instruments, apparatuses, and systems (an assembly of a plurality of devices) which can utilize the secondary batteries as a power source for driving or an electric power storage source for storing electric power. The secondary battery to be used as a power source may be a main power source or an auxiliary power source. The main power source is a power source to be preferentially used regardless of the presence or absence of other power sources. The auxiliary power source may be, for example, a power source to be used instead of the main power source or a power source which can be switched from the main power source, if necessary. In the case of using the secondary batteries as an auxiliary power source, the kind of main power source is not limited to secondary batteries.

The applications of the secondary batteries are, for example, as follows. Electronic devices (including portable electronic devices) such as video cameras, digital still cameras, mobile phones, notebook computers, cordless phones, headphone stereos, portable radios, portable televisions, and portable information terminals. Portable daily appliances such as electric shavers. Memory apparatuses such as backup power sources and memory cards. Electric tools such as electric drills and electric saws. Battery packs to be mounted on notebook computers and the like as a detachable power source. Medical electronic devices such as pacemakers and hearing aids. Electrically driven vehicles such as electric vehicles (including hybrid vehicles). Electric power storage systems such as household battery systems which store electric power in case of an emergency. Of course, the applications of the secondary batteries may be applications other than those mentioned above.

Among these, it is effective that the secondary batteries are applied to a battery pack, an electrically driven vehicle, an electric power storage system, an electric tool, an electronic device, and the like. This is because excellent battery characteristics are required for these applications and thus the performance can be effectively improved by use of the secondary batteries of the present technology. Incidentally, a battery pack is a power source including a secondary battery. A single battery or an assembled battery may be used in this battery pack as to be described later. An electrically driven vehicle is a vehicle which operates (travels) using a secondary battery as a power source for driving and may be a motor vehicle (a hybrid vehicle or the like) provided with a driving source in addition to a secondary battery as described above. The electric power storage system is a system including a secondary battery as a power storage source. For example, in a household electric power storage system, electric power is accumulated in a secondary battery which is an electric power storage source and household electric appliances and the like can be thus used by utilizing the electric power. An electric tool is a tool in which a moving unit (for example, a drill) moves using a secondary battery as a power source for driving. An electronic device is a device which performs various functions using a secondary battery as a power source for driving (power supply source).

Here, several application examples of the secondary batteries will be specifically described. Incidentally, the configurations of the application examples to be described below are an example to the utmost and thus the configurations of the application examples can be appropriately changed.

<3-1. Battery Pack (Single Battery)>

Figure 5:
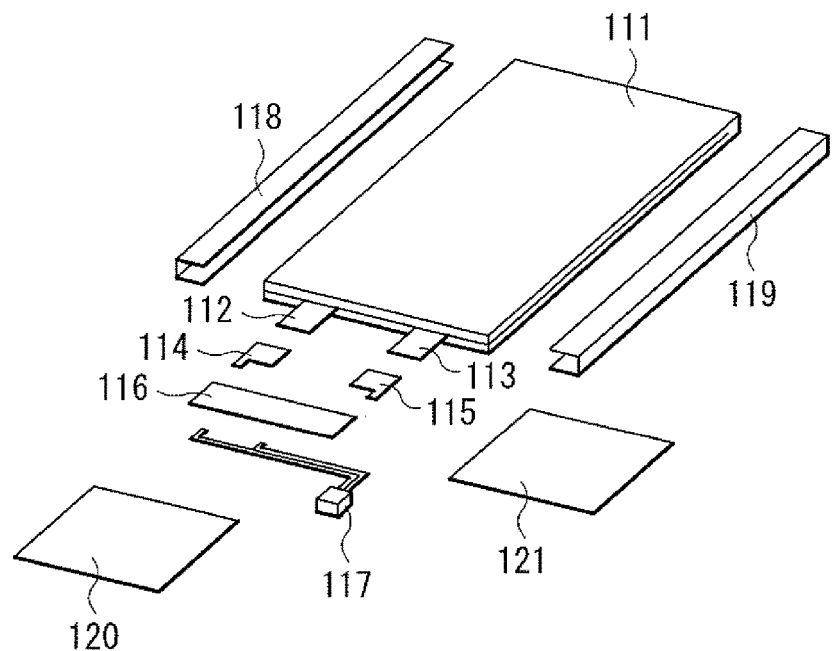
FIG. 5 is a perspective diagram illustrating the configuration of an application example (battery pack: single battery) of a secondary battery.
Figure 6:
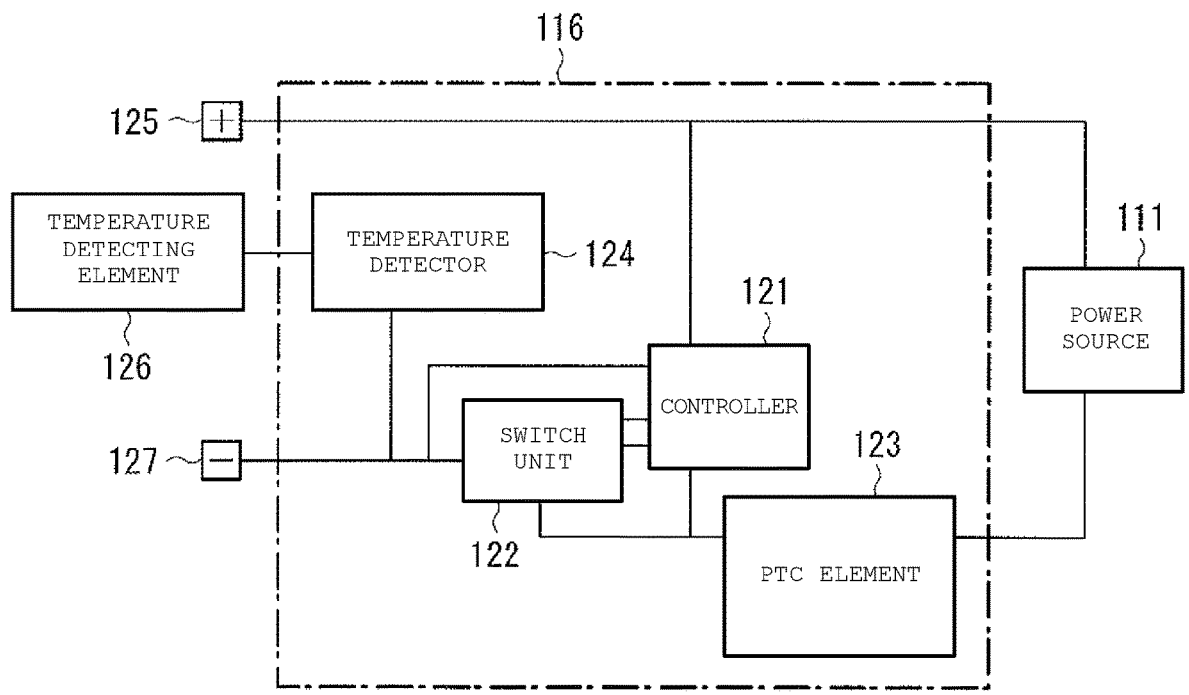
FIG. 6 is a block diagram illustrating the configuration of the battery pack illustrated in FIG. 5.

FIG. 5 illustrates a perspective configuration of a battery pack including a single battery. FIG. 6 illustrates a block configuration of the battery pack illustrated in FIG. 5. Incidentally, a state in which the battery pack is disassembled is illustrated in FIG. 5.

The battery pack to be described here is a simple battery pack (so-called soft pack) including one secondary battery of the present technology and is mounted on, for example, an electronic device typified by a smartphone. This battery pack includes a power source 111 which is a laminated film type secondary battery, and a circuit board 116 to be connected to the power source 111, for example, as illustrated in FIG. 5. A positive electrode lead 112 and a negative electrode lead 113 are attached to this power source 111.

A pair of adhesive tapes 118 and 119 are pasted to both side surfaces of the power source 111. A protection circuit module (PCM) is formed on the circuit board 116. This circuit board 116 is connected to the positive electrode 112 via a tab 114 as well as connected to the negative electrode lead 113 via a tab 115. In addition, the circuit board 116 is connected to a lead wire 117 with a connector for external connection. Incidentally, in a state in which the circuit board 116 is connected to the power source 111, the circuit board 116 is protected by a label 120 and an insulating sheet 121. As this label 120 is pasted, the circuit board 116, the insulating sheet 121 and the like are fixed.

Moreover, the battery pack includes the power source 111 and the circuit board 116, for example, as illustrated in FIG. 6. The circuit board 116 includes, for example, a controller 121, a switch unit 122, a PTC element 123, and a temperature detector 124. The power source 111 can be connected to the outside via a positive terminal 125 and a negative terminal 127 and thus is charged and discharged through the positive terminal 125 and the negative terminal 127. The temperature detector 124 detects the temperature using a temperature detecting terminal (so-called T terminal) 126.

The controller 121 controls the operation (including the usage state of the power source 111) of the entire battery pack. This controller 121 includes, for example, a central processing unit (CPU) and a memory.

This controller 121 cuts off the switch unit 122 so that the charging current does not flow in the current path of the power source 111, for example, when the battery voltage reaches the overcharge detection voltage. In addition, the controller 121 blocks the charging current by cutting off the switch unit 122, for example, when a large current flows at the time of charging.

On the other hand, the controller 121 cuts off the switch unit 122 so that the discharging current does not flow in the current path of the power source 111, for example, when the battery voltage reaches the overdischarge detection voltage. In addition, the controller 121 blocks the discharging current by cutting off the switch unit 122, for example, when a large current flows at the time of discharging.

Incidentally, the overcharge detection voltage is, for example, 4.2 V±0.05 V and the overdischarge detection voltage is, for example, 2.4 V±0.1 V.

The switch unit 122 switches the usage state of the power source 111, namely, the connection state of the power source 111 to an external device in accordance with the instruction from the controller 121. This switch unit 122 includes, for example, a charging control switch and a discharging control switch. Each of the charging control switch and the discharging control switch is, for example, a semiconductor switch such as a metal oxide semiconductor field effect transistor (MOSFET). Incidentally, the charging and discharging current is detected based on, for example, the ON resistance of the switch unit 122.

The temperature detector 124 measures the temperature of the power source 111 as well as outputs the measurement result of temperature to the controller 121. This temperature detector 124 includes, for example, a temperature detecting element such as a thermistor. Incidentally, the measurement result of temperature to be measured by the temperature detector 124 is used in a case in which the controller 121 performs charging and discharging control at the time of abnormal heat generation, a case in which the controller 121 performs correction processing when calculating the remaining capacity, and the like.

Incidentally, the circuit board 116 may not include the PTC element 123. In this case, a PTC element may be separately installed in the circuit board 116.

<3-2. Battery Pack (Assembled Battery)>

Figure 7:
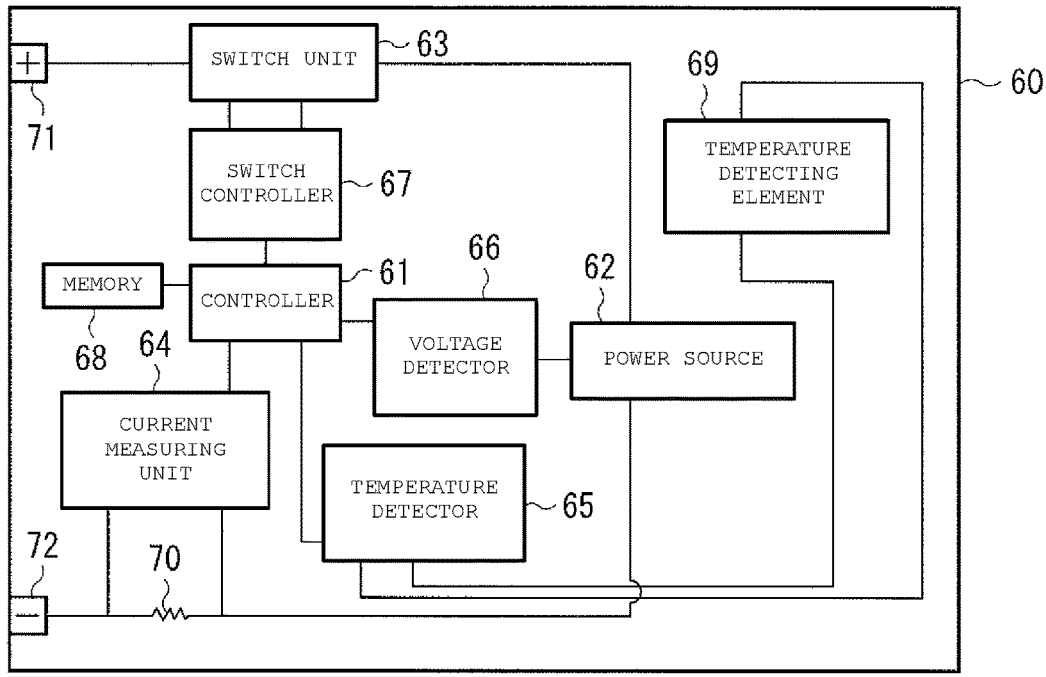
FIG. 7 is a block diagram illustrating the configuration of an application example (battery pack: assembled battery) of a secondary battery.

FIG. 7 illustrates a block configuration of a battery pack including an assembled battery.

This battery pack includes, for example, a controller 61, a power source 62, a switch unit 63, a current measuring unit 64, a temperature detector 65, a voltage detector 66, a switch controller 67, a memory 68, a temperature detecting element 69, a current detecting resistor 70, a positive terminal 71, and a negative terminal 72 inside a housing 60. This housing 60 contains, for example, a plastic material.

The controller 61 controls the operation (including the usage state of the power source 62) of the entire battery pack. This controller 61 includes, for example, a CPU. The power source 62 is an assembled battery including two or more kinds of secondary batteries of the present technology, and the connection form of the two or more kinds of secondary batteries may be series connection, parallel connection, or a mixed form of these. As an example, the power source 62 includes six secondary batteries of which two are connected in parallel and three are connected in series.

The switch unit 63 switches the usage state of the power source 62, namely, the connection state of the power source 62 to an external device in accordance with the instruction from the controller 61. This switch unit 63 includes, for example, a charging control switch, a discharging control switch, a charging diode, and a discharging diode. Each of the charging control switch and the discharging control switch is, for example, a semiconductor switch such as a metal oxide semiconductor field effect transistor (MOSFET).

The current measuring unit 64 measures the current using the current detecting resistor 70 as well as outputs the measurement result of current to the controller 61. The temperature detector 65 measures the temperature using the temperature detecting element 69 as well as outputs the measurement result of temperature to the controller 61. This measurement result of temperature is used in a case in which the controller 61 performs charging and discharging control at the time of abnormal heat generation, a case in which the controller 61 performs correction processing when calculating the remaining capacity, and the like. The voltage detector 66 measures the voltage of the secondary battery in the power source 62 as well as supplies the analog-digital converted measurement result of voltage to the controller 61.

The switch controller 67 controls the operation of the switch unit 63 in accordance with the signals input from the current measuring unit 64 and the voltage detector 66, respectively.

This switch controller 67 cuts off the switch unit 63 (charging control switch) so that the charging current does not flow in the current path of the power source 62, for example, when the battery voltage reaches the overcharge detection voltage. By this, in the power source 62, only discharging is possible through the discharging diode. Incidentally, the switch controller 67 blocks the charging current, for example, when a large current flows at the time of charging.

In addition, the switch controller 67 cuts off the switch unit 63 (discharging control switch) so that the discharging current does not flow in the current path of the power source 62, for example, when the battery voltage reaches the overdischarge detection voltage. By this, in the power source 62, only charging is possible through the charging diode. Incidentally, the switch controller 67 blocks the discharging current, for example, when a large current flows at the time of discharging.

Incidentally, the overcharge detection voltage is, for example, 4.2 V±0.05 V and the overdischarge detection voltage is, for example, 2.4 V±0.1 V.

The memory 68 includes, for example, an EEPROM which is a nonvolatile memory. In this memory 68, for example, numerical values calculated by the controller 61, the information (for example, internal resistance in the initial state) on the secondary battery measured at the manufacturing process stage, and the like are memorized. Incidentally, the controller 61 can grasp information such as the remaining capacity when the full charging capacity of the secondary battery is memorized in the memory 68.

The temperature detecting element 69 measures the temperature of the power source 62 and outputs the measurement result of temperature to the controller 61. This temperature detecting element 69 includes, for example, a thermistor.

Each of the positive terminal 71 and the negative terminal 72 is a terminal to be connected to an external device (for example, a notebook personal computer) which works using a battery pack, an external device (for example, a charger) which is used to charge a battery pack, and the like. The power source 62 is charged and discharged through the positive terminal 71 and the negative terminal 72.

<3-3. Electrically Driven Vehicle>

Figure 8:
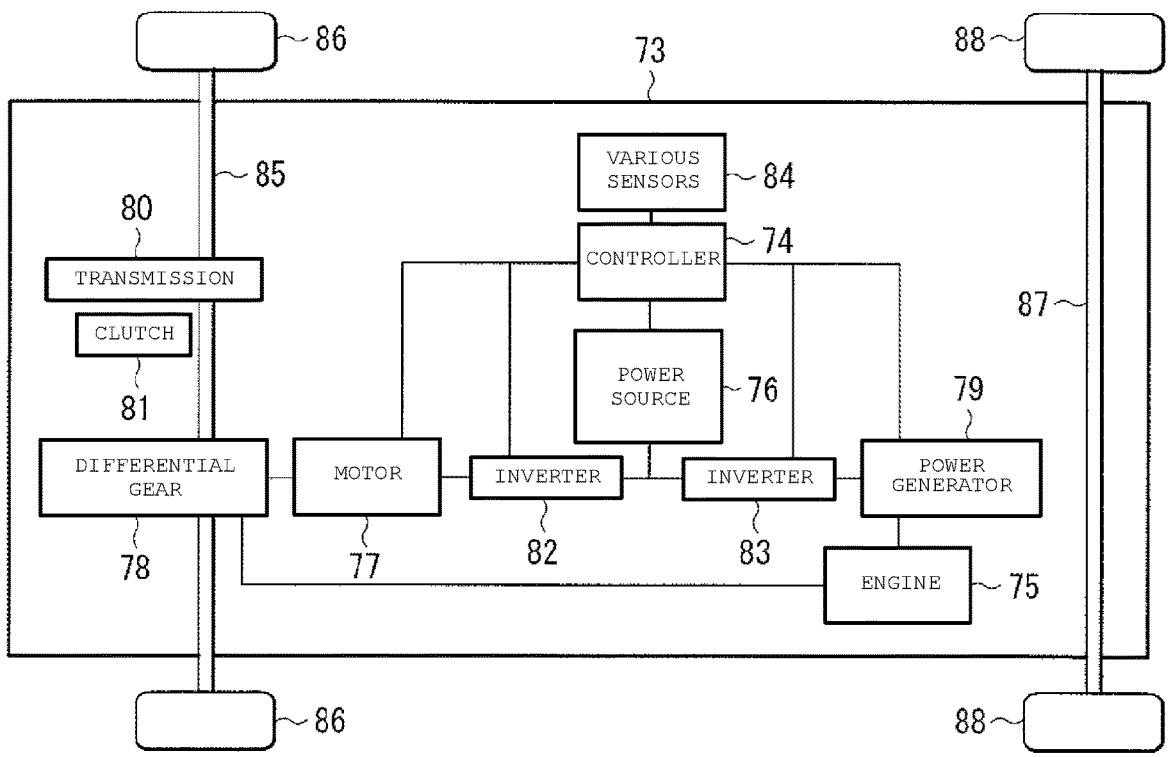
FIG. 8 is a block diagram illustrating the configuration of an application example (electrically driven vehicle) of a secondary battery.

FIG. 8 illustrates a block configuration of a hybrid vehicle which is an example of an electrically driven vehicle.

This electrically driven vehicle includes, for example, a controller 74, an engine 75, a power source 76, a driving motor 77, a differential gear 78, a power generator 79, a transmission 80 and a clutch 81, inverters 82 and 83, and various sensors 84 inside a metal housing 73. In addition to these, the electrically driven vehicle includes, for example, a front wheel drive shaft 85 connected to the differential gear 78 and the transmission 80, a front wheel 86, a rear wheel drive shaft 87, and a rear wheel 88.

This electrically driven vehicle can travel using, for example, either of the engine 75 or the motor 77 as a driving source. The engine 75 is a main power source, and examples thereof include a gasoline engine. In the case of using the engine 75 as a power source, for example, the driving force (turning force) of the engine 75 is transmitted to the front wheels 86 and the rear wheels 88 via the differential gear 78, the transmission 80, and the clutch 81 which are driving units. Incidentally, the turning force of the engine 75 is transmitted to the power generator 79, thus the power generator 79 generates alternating current power utilizing the turning force as well as the alternating current power is converted into direct current power by the inverter 83, and the direct current power is thus accumulated in the power source 76. Meanwhile, in the case of using the motor 77 which is a converter as a power source, the electric power (direct current power) supplied from the power source 76 is converted into alternating current power by the inverter 82, and thus the motor 77 is driven utilizing the alternating current power. The driving force (turning force) converted from electric power by this motor 77 is transmitted to the front wheels 86 and the rear wheels 88, for example, via the differential gear 78, the transmission 80, and the clutch 81 which are driving units.

Incidentally, when the electrically driven vehicle is decelerated by the brake mechanism, the resistance force at the time of deceleration is transmitted to the motor 77 as a turning force, and thus the motor 77 may generate alternating current power utilizing the turning force. This alternating current power is converted into direct current power by the inverter 82, and thus the direct current regenerative electric power is preferably accumulated in the power source 76.

The controller 74 controls the operation of the entire electrically driven vehicle. This controller 74 includes, for example, a CPU. The power source 76 includes one kind or two or more kinds of secondary batteries of the present technology. This power source 76 may be connected to an external power source as well as receives electric power supply from the external power source to accumulate electric power in the power source 76. The various sensors 84 are used, for example, to control the number of revolutions of the engine 75 as well as to control the opening of the throttle valve (throttle opening). These various sensors 84 include any one kind or two or more kinds among, for example, a speed sensor, an acceleration sensor, and an engine speed sensor.

Incidentally, a case in which the electrically driven vehicle is a hybrid vehicle is taken as an example, but the electrically driven vehicle may be a vehicle (electric vehicle) which operates using only the power source 76 and the motor 77 without using the engine 75.

<3-4. Electric Power Storage System>

Figure 9:
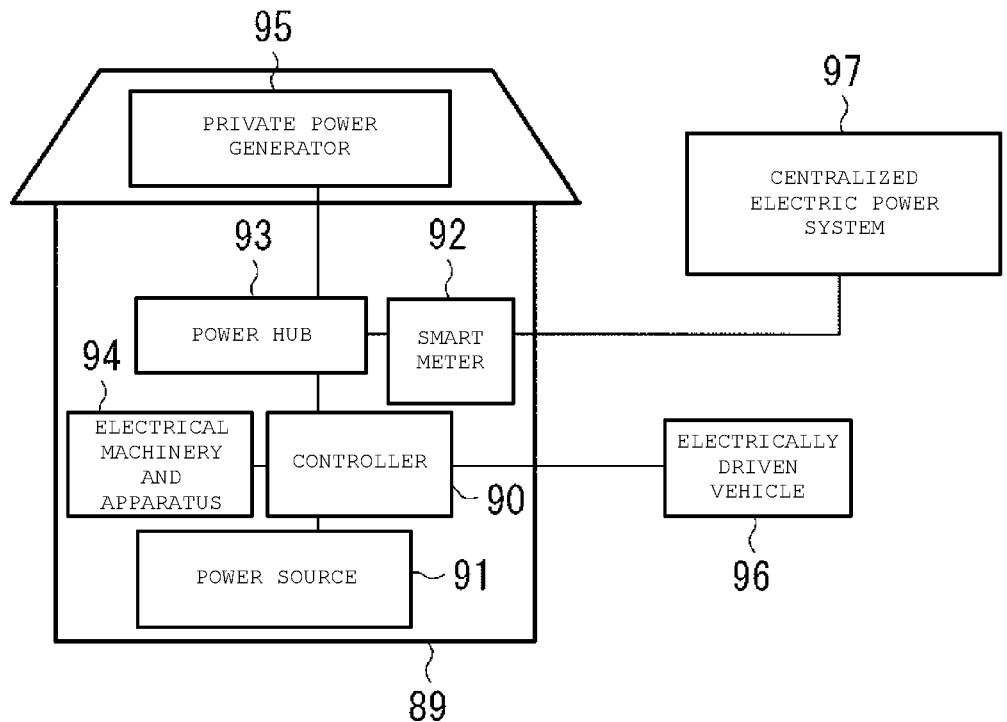
FIG. 9 is a block diagram illustrating the configuration of an application example (electric power storage system) of a secondary battery.

FIG. 9 illustrates a block configuration of an electric power storage system.

This electric power storage system includes, for example, a controller 90, a power source 91, a smart meter 92, and a power hub 93 inside a house 89 such as a general house and a commercial building.

Here, the power source 91 can be connected to, for example, an electrical machinery and apparatus 94 installed inside the house 89 as well as an electrically driven vehicle 96 stopped outside the house 89. In addition, the power source 91 can be connected to, for example, a private power generator 95 installed in the house 89 via the power hub 93 as well as an external centralized electric power system 97 via the smart meter 92 and the power hub 93.

Incidentally, the electrical machinery and apparatus 94 includes, for example, one kind or two or more kinds of household appliances, and examples of the household appliances include a refrigerator, an air conditioner, a television, and a water heater. The private power generator 95 includes any one kind or two or more kinds among, for example, a solar power generator and a wind power generator. The electrically driven vehicle 96 includes any one kind or two or more kinds among, for example, an electric vehicle, an electric motorcycle, a hybrid vehicle. The centralized electric power system 97 includes any one kind or two or more kinds among, for example, a thermal power plant, a nuclear power plant, a hydroelectric power plant, and a wind power plant.

The controller 90 controls the operation (including the usage state of the power source 91) of the entire electric power storage system. This controller 90 includes, for example, a CPU. The power source 91 includes one kind or two or more kinds of secondary batteries of the present technology. The smart meter 92 is, for example, a network-compatible electric power meter installed in the house 89 on the electric power demand side and can communicate with the electric power supply side. Accordingly, the smart meter 92 enables highly efficient and stable energy supply, for example, by controlling the balance between the supply and demand of electric power in the house 89 while communicating with the outside.

In this electric power storage system, for example, electric power is accumulated in the power source 91 from the centralized electric power system 97 which is an external power source via the smart meter 92 and the power hub 93 as well as from the private power generator 95 which is an independent power source via the power hub 93. The electric power accumulated in this power source 91 is supplied to the electrical machinery and apparatus 94 and the electrically driven vehicle 96 in accordance with the instruction from the controller 90, and thus the electrical machinery and apparatus 94 can work as well as the electrically driven vehicle 96 can be charged. In other words, the electric power storage system is a system which makes it possible to accumulate and supply electric power in the house 89 using the power source 91.

The electric power accumulated in this power source 91 can be used if necessary. For this reason, for example, electric power can be accumulated from the centralized electric power system 97 to the power source 91 at midnight when the electricity usage fee is low and the electric power accumulated in this power source 91 can be used during the day when the electricity usage fee is high.

Incidentally, the electric power storage system described above may be installed for each house (one household) or for a plurality of houses (multiple households).

<3-5. Electric Tool>

Figure 10:
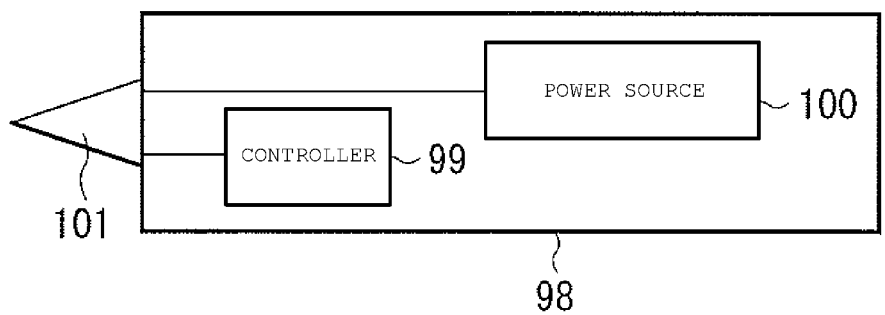
FIG. 10 is a block diagram illustrating the configuration of an application example (electric tool) of a secondary battery.

FIG. 10 illustrates a block configuration of an electric tool.

Examples of the electric tool to be described here include an electric drill. This electric tool includes, for example, a controller 99 and a power source 100 inside a tool body 98. For example, a drill unit 101 which is a moving unit is attached to this tool body 98 so as to work (rotate).

The tool body 98 contains, for example, a plastic material. The controller 99 controls the operation (including the usage state of the power source 100) of the entire electric tool. This controller 99 includes, for example, a CPU. The power source 100 includes one kind or two or more kinds of secondary batteries of the present technology. The controller 99 supplies electric power from the power source 100 to the drill unit 101 in accordance with the operation of the operation switch.

EXAMPLES

Hereinafter, Examples of the present technology will be described.

Experimental Examples 1-1 to 1-57

The laminated film type lithium ion secondary battery illustrated in FIGS. 3 and 4 was fabricated according to the following procedure.

In the case of fabricating the positive electrode 33, first, lithium carbonate ($Li_2CO_3$) and cobalt carbonate ($CoCO_3$) were mixed together, and then the mixture was fired (firing temperature=900° C., firing time=5 hours) in the air, thereby obtaining lithium cobalt oxide ($LiCoO_2$) which was a lithium-containing compound. In this case, the mixing ratio (molar ratio) between lithium carbonate and cobalt carbonate was set to lithium carbonate:cobalt carbonate=0.5:1.

Subsequently, a positive electrode mixture was prepared by mixing 91 parts by mass of a positive electrode active material (lithium cobalt oxide), 3 parts by mass of a positive electrode binder (polyvinylidene fluoride), and 6 parts by mass of a positive electrode conductive agent (graphite) together. Subsequently, the positive electrode mixture was added to an organic solvent (N-methyl-2-pyrrolidone), and then the organic solvent was stirred to obtain a paste-like positive electrode mixture slurry. Subsequently, the positive electrode mixture slurry was applied to both surfaces of the positive electrode current collector 33A (12 μm thick strip-shaped aluminum foil) using a coating apparatus and then dried to form the positive electrode active material layer 33B. Finally, the positive electrode active material layer 33B was compression-molded using a roll press.

In the case of fabricating the negative electrode 34, a negative electrode mixture was first prepared by mixing 96 parts by mass of a negative electrode active material (graphite, median diameter D50=15 μm), 1.5 parts by mass of a negative electrode binder (acrylic acid-modified product of styrene butadiene rubber copolymer), and 1.5 parts by mass of a thickener (carboxymethylcellulose) together. Subsequently, the negative electrode mixture was added to an aqueous solvent (pure water), and then the pure water was stirred to obtain a paste-like negative electrode mixture slurry. Subsequently, the negative electrode mixture slurry was applied to both surfaces of the negative electrode current collector 34A (15 μm thick strip-shaped copper foil)

using a coating apparatus and then dried to form the negative electrode active material layer 34B. Finally, the negative electrode active material layer 34B was compression-molded using a roll press.

As an electrolyte, an electrolytic solution which was a liquid electrolyte was used. In the case of preparing the electrolytic solution, an electrolyte salt (LiPF$_6$) was added to a solvent (ethylene carbonate, propylene carbonate, ethyl methyl carbonate, and propyl propionate), the solvent was stirred, then a sulfonamide compound was further added to the solvent, and the solvent was stirred. In this case, the mixing ratio (weight ratio) of solvent was set to ethylene carbonate:propylene carbonate:ethyl methyl carbonate:propyl propionate=30:10:40:20. The content of electrolyte salt was set to 1.2 mol/kg with respect to the solvent. The kind of sulfonamide compound and the content (% by weight) of sulfonamide compound in the electrolytic solution are as presented in Tables 1 to 3.

Incidentally, for comparison, an electrolytic solution was prepared according to the same procedure except that a sulfonamide compound was not used. In addition, for comparison, an electrolytic solution was prepared according to the same procedure except that another compound (N-substituted sulfonamide compound) was used instead of a sulfonamide compound. The kind of another compound and the content (% by weight) of another compound in the electrolytic solution are as presented in Table 3.

As the separator 35, a base material layer of which both surfaces were provided with a polymer compound layer was used. In the case of fabricating the separator 35, first, a polymer compound (polyvinylidene fluoride) and inorganic particles (aluminum oxide, median diameter D50=0.3 μm) were added to an organic solvent (N-methyl-2-pyrrolidone), and then the organic solvent was stirred to obtain a dispersion. In this case, the mixing ratio (weight ratio) between the polymer compound and the inorganic particles was set to polymer compound:inorganic particles=20:80. Subsequently, the base material layer (12 μm thick microporous polyethylene film) was immersed in the dispersion. Subsequently, the base material layer was taken out from the dispersion, and then the organic solvent was removed from the base material layer using an aqueous solvent (pure water). Finally, the base material layer was dried using hot air (temperature=80° C.). By this, a polymer compound layer (total thickness=5 μm) was formed on both surfaces of the base material layer, and the separator 35 was thus obtained.

In the case of assembling a secondary battery, first, the aluminum positive electrode lead 31 was welded to the positive electrode current collector 33A as well as the copper negative electrode lead 32 was welded to the negative electrode current collector 34A. Subsequently, the positive electrode 33 and the negative electrode 34 were stacked with the separator 35 interposed therebetween to obtain a stacked body. Subsequently, the stacked body was wound in the longitudinal direction, and then a protective tape 37 was pasted to the outermost peripheral portion of the stacked body, thereby fabricating the wound electrode body 30. Finally, the exterior member 40 was folded so as to sandwich the wound electrode body 30 therebetween and then the peripheral edge portions on three sides of the exterior member 40 were heat-sealed to each other. As the exterior member 40, an aluminum laminated film in which a 25 μm thick nylon film, a 40 μm thick aluminum foil, and a 30 μm thick polypropylene film were laminated in this order from the outside was used. In this case, the close contact film 41 was inserted between the positive electrode lead 31 and the exterior member 40 as well as between the negative electrode lead 32 and the exterior member 40. Finally, the wound electrode body 30 was impregnated with the electrolytic solution by injecting the electrolytic solution into the exterior member 40, and then the peripheral edge portions on the remaining one side of the exterior member 40 were heat-sealed to each other in a reduced pressure environment.

By this, the wound electrode body 30 was encapsulated inside the exterior member 40, and a laminated film type lithium ion secondary battery was thus completed. In this case, the amount of the positive electrode active material and the amount of the negative electrode active material were adjusted so that the open circuit voltage (so-called battery voltage) was 4.45 V when the secondary battery was fully charged.

In order to evaluate the battery characteristics of secondary batteries, the swelling characteristics of the secondary batteries were examined, and the results presented in Tables 1 to 3 were attained.

In the case of examining the swelling characteristics, the secondary battery was first charged and discharged (2 cycles) in a normal temperature environment (temperature=23° C.) in order to stabilize the state of the secondary battery. Subsequently, the secondary battery was charged again, and then the thickness of the secondary battery in the charged state was measured. Subsequently, the secondary battery in the charged state was preserved (preserved time=150 hours) in a high temperature environment (temperature=75° C.), and then the thickness of the secondary battery in the charged state was measured. Finally, the swelling percentage (%)=(thickness after preservation/thickness before preservation)×100 was calculated.

At the time of charging, constant current charging was performed at a current of 0.2 C until the voltage reached 4.45 V, and then constant voltage charging was performed at a voltage of 4.45 V until the current reached 0.05 C. At the time of discharging, constant current discharging was performed at a current of 0.2 C until the voltage reached 2.5 V. "0.2 C" is a current value at which the battery capacity (theoretical capacity) can be discharged in 5 hours, and "0.05 C" is a current value at which the battery capacity can be discharged in 20 hours.

TABLE 1

Negative electrode active material: graphite, Electrolyte: liquid electrolyte (electrolytic solution)

| | Sulfonamide compound | | Other compounds | | |
|---|---|---|---|---|---|
| Experimental Example | Kind | Content (% by weight) | Kind | Content (% by weight) | Swelling percentage (%) |
| 1-1 | Formula (1-2) | 0.001 | — | — | 144 |
| 1-2 | | 0.01 | | | 142 |
| 1-3 | | 0.1 | | | 137 |
| 1-4 | | 1 | | | 143 |
| 1-5 | | 5 | | | 154 |
| 1-6 | | 10 | | | 160 |
| 1-7 | Formula (1-5) | 0.001 | — | — | 149 |
| 1-8 | | 0.01 | | | 145 |
| 1-9 | | 0.1 | | | 141 |
| 1-10 | | 1 | | | 146 |
| 1-11 | | 5 | | | 155 |
| 1-12 | | 10 | | | 164 |
| 1-13 | Formula (1-11) | 0.001 | — | — | 142 |
| 1-14 | | 0.01 | | | 138 |
| 1-15 | | 0.1 | | | 133 |
| 1-16 | | 1 | | | 139 |
| 1-17 | | 5 | | | 148 |

TABLE 1-continued

Negative electrode active material: graphite, Electrolyte: liquid electrolyte (electrolytic solution)

| Experimental Example | Sulfonamide compound | | Other compounds | | Swelling percentage (%) |
|---|---|---|---|---|---|
| | Kind | Content (% by weight) | Kind | Content (% by weight) | |
| 1-18 | | 10 | | | 157 |
| 1-19 | Formula (1-12) | 0.001 | — | — | 143 |
| 1-20 | | 0.01 | | | 137 |
| 1-21 | | 0.1 | | | 134 |
| 1-22 | | 1 | | | 140 |
| 1-23 | | 5 | | | 149 |
| 1-24 | | 10 | | | 159 |

TABLE 2

Negative electrode active material: graphite, Electrolyte: liquid electrolyte (electrolytic solution)

| Experimental Example | Sulfonamide compound | | Other compounds | | Swelling percentage (%) |
|---|---|---|---|---|---|
| | Kind | Content (% by weight) | Kind | Content (% by weight) | |
| 1-25 | Formula (1-15) | 0.001 | — | — | 142 |
| 1-26 | | 0.01 | | | 139 |
| 1-27 | | 0.1 | | | 136 |
| 1-28 | | 1 | | | 142 |
| 1-29 | | 5 | | | 151 |
| 1-30 | | 10 | | | 159 |
| 1-31 | Formula (1-21) | 0.001 | — | — | 153 |
| 1-32 | | 0.01 | | | 148 |
| 1-33 | | 0.1 | | | 143 |
| 1-34 | | 1 | | | 150 |
| 1-35 | | 5 | | | 160 |
| 1-36 | | 10 | | | 167 |
| 1-37 | Formula (1-22) | 0.001 | — | — | 164 |
| 1-38 | | 0.01 | | | 160 |
| 1-39 | | 0.1 | | | 155 |
| 1-40 | | 1 | | | 158 |
| 1-41 | | 5 | | | 168 |
| 1-42 | | 10 | | | 169 |
| 1-43 | Formula (1-25) | 0.001 | — | — | 150 |
| 1-44 | | 0.01 | | | 146 |
| 1-45 | | 0.1 | | | 142 |
| 1-46 | | 1 | | | 148 |
| 1-47 | | 5 | | | 158 |
| 1-48 | | 10 | | | 166 |

TABLE 3

Negative electrode active material: graphite, Electrolyte: liquid electrolyte (electrolytic solution)

| Experimental Example | Sulfonamide compound | | Other compounds | | Swelling percentage (%) |
|---|---|---|---|---|---|
| | Kind | Content (% by weight) | Kind | Content (% by weight) | |
| 1-49 | Formula (1-26) | 0.001 | — | — | 149 |
| 1-50 | | 0.01 | | | 145 |
| 1-51 | | 0.1 | | | 142 |
| 1-52 | | 1 | | | 147 |
| 1-53 | | 5 | | | 156 |
| 1-54 | | 10 | | | 166 |
| 1-55 | — | — | — | — | 205 |
| 1-56 | — | — | Formula (2-2) | 1 | 172 |
| 1-57 | — | — | Formula (2-25) | 1 | 175 |

In a case in which a sulfonamide compound was used (Experimental Examples 1-1 to 1-54), the swelling percentage was greatly improved as compared to a case in which the sulfonamide compound was not used (Experimental Examples 1-55 to 1-57).

In detail, in a case in which a sulfonamide compound was not used but another compound (N-substituted sulfonamide compound) was used (Experimental Examples 1-56 and 1-57), the swelling percentage decreased as compared to a case in which neither a sulfonamide compound nor another compound was used (Experimental Example 1-55). However, the proportion of the swelling percentage decreased was only about 16% at the maximum.

In contrast, in a case in which a sulfonamide compound was used (Experimental Examples 1-1 to 1-54), the swelling percentage greatly decreased as compared to a case in which neither a sulfonamide compound nor another compound was used (Experimental Example 1-55). The proportion of swelling percentage decreased in this case reached about 32% at the maximum.

Incidentally, in a case in which a sulfonamide compound was used, the swelling percentage fluctuated depending on the kind of sulfonamide compound and thus the proportion of swelling percentage decreased also fluctuated. However, the proportion of swelling percentage decreased reached about 23% at the minimum to be far higher than the proportion of swelling percentage decreased (=about 16%) in a case in which another compound was used.

Particularly in a case in which a sulfonamide compound was used, the swelling percentage sufficiently decreased when the content of sulfonamide compound in the electrolytic solution was 0.001% by weight to 10% by weight. In this case, the swelling percentage further decreased when the content of sulfonamide compound is 0.001% by weight to 5% by weight, and the swelling percentage still further decreased when the content of sulfonamide compound is 0.001% by weight to 1% by weight.

Experimental Examples 2-1 to 2-36

As presented in Tables 4 and 5, secondary batteries were fabricated and then the battery characteristics thereof were examined according to the same procedures as in Experimental Examples 1-1 to 1-54 except that additives were added to the electrolytic solution as well as the cycle characteristics were examined together with the swelling characteristics.

As the additives, an N-substituted sulfonamide compound, an unsaturated cyclic carbonate ester, a halogenated cyclic carbonate ester, a dinitrile compound, and an additional electrolyte salt were used. The kinds of additives and the contents of additives in the electrolyte solution are as presented in Tables 4 and 5. Incidentally, "VC" denotes vinylene carbonate, "FEC" denotes 4-fluoro-1,3-dioxolan-2-one, and "SN" denotes succinonitrile, respectively.

In the case of examining the cycle characteristics, the secondary battery was first charged and discharged (2 cycles) in a normal temperature environment (temperature=23° C.) in order to stabilize the state of the secondary battery. Subsequently, the secondary battery was charged and discharged (1 cycle) in the same environment to measure the discharge capacity in the third cycle. Subsequently, the secondary battery was charged and discharged (100 cycles) in a high temperature environment (temperature=75° C.) to measure the discharge capacity in the 103rd cycle. Finally, the capacity retention percentage (%)=(discharge capacity in 103th cycle/discharge capacity in third cycle)× 100 was calculated. The charging and discharging conditions in the case of examining the cycle characteristics were similar to the charging and discharging conditions in the case of examining the swelling characteristics.

Incidentally, the capacity retention percentage in a case in which additives were not used (Experimental Examples 1-1, 1-4, 1-13, 1-16, 1-43, and 1-46) are also presented in Table 5.

TABLE 4

Negative electrode active material: graphite, Electrolyte: liquid electrolyte (electrolytic solution)

| Experimental Example | Sulfonamide compound Kind | Content (% by weight) | Other compounds Kind | Content (% by weight) | Swelling percentage (%) | Capacity retention percentage (%) |
|---|---|---|---|---|---|---|
| 2-1 | Formula (1-2) | 0.001 | Formula (2-2) | 1 | 143 | 79 |
| 2-2 | | | VC | 1 | 148 | 79 |
| 2-3 | | | FEC | 2 | 150 | 80 |
| 2-4 | | | SN | 2 | 140 | 79 |
| 2-5 | | | LiBF$_4$ | 1 | 146 | 76 |
| 2-6 | | | LiPF$_2$O$_2$ | 1 | 145 | 77 |
| 2-7 | Formula (1-2) | 1 | Formula (2-2) | 1 | 140 | 76 |
| 2-8 | | | VC | 1 | 147 | 77 |
| 2-9 | | | FEC | 2 | 150 | 78 |
| 2-10 | | | SN | 2 | 138 | 77 |
| 2-11 | | | LiBF$_4$ | 1 | 144 | 74 |
| 2-12 | | | LiPF$_2$O$_2$ | 1 | 143 | 73 |
| 2-13 | Formula (1-11) | 0.001 | Formula (2-7) | 1 | 141 | 76 |
| 2-14 | | | VC | 1 | 144 | 76 |
| 2-15 | | | FEC | 2 | 145 | 76 |
| 2-16 | | | SN | 2 | 141 | 77 |
| 2-17 | | | LiBF$_4$ | 1 | 142 | 70 |
| 2-18 | | | LiPF$_2$O$_2$ | 1 | 143 | 70 |
| 2-19 | Formula (1-11) | 1 | Formula (2-7) | 1 | 137 | 73 |
| 2-20 | | | VC | 1 | 140 | 71 |
| 2-21 | | | FEC | 2 | 142 | 72 |
| 2-22 | | | SN | 2 | 135 | 73 |
| 2-23 | | | LiBF$_4$ | 1 | 140 | 67 |
| 2-24 | | | LiPF$_2$O$_2$ | 1 | 139 | 67 |

TABLE 5

Negative electrode active material: graphite, Electrolyte: liquid electrolyte (electrolytic solution)

| Experimental Example | Sulfonamide compound Kind | Content (% by weight) | Other compounds Kind | Content (% by weight) | Swelling percentage (%) | Capacity retention percentage (%) |
|---|---|---|---|---|---|---|
| 2-25 | Formula (1-25) | 0.001 | Formula (2-25) | 1 | 148 | 65 |
| 2-26 | | | VC | 1 | 152 | 63 |
| 2-27 | | | FEC | 2 | 155 | 64 |
| 2-28 | | | SN | 2 | 147 | 67 |
| 2-29 | | | LiBF$_4$ | 1 | 151 | 61 |
| 2-30 | | | LiPF$_2$O$_2$ | 1 | 149 | 61 |
| 2-31 | Formula (1-25) | 1 | Formula (2-25) | 1 | 147 | 66 |
| 2-32 | | | VC | 1 | 150 | 66 |
| 2-33 | | | FEC | 2 | 153 | 67 |
| 2-34 | | | SN | 2 | 145 | 67 |
| 2-35 | | | LiBF$_4$ | 1 | 149 | 62 |
| 2-36 | | | LiPF$_2$O$_2$ | 1 | 149 | 61 |
| 1-1 | Formula (1-2) | 0.001 | — | — | 144 | 65 |
| 1-4 | | 1 | | | 143 | 62 |
| 1-13 | Formula (1-11) | 0.001 | — | — | 142 | 66 |
| 1-16 | | 1 | | | 139 | 63 |
| 1-43 | Formula (1-25) | 0.001 | — | — | 150 | 60 |
| 1-46 | | 1 | | | 148 | 58 |

In a case in which additives were added to the electrolytic solution (Experimental Examples 2-1 to 2-36), the capacity retention percentage increased while an increase in the swelling percentage was minimized as compared to a case in which additives were not added to the electrolytic solution (Experimental Examples 1-1, 1-4, 1-13, 1-16, 1-43, and 1-46).

In particular, when an N-substituted sulfonamide compound and a dinitrile compound were used as additives, the swelling percentage decreased as well as the capacity retention percentage increased as compared to a case in which the additives were not added to the electrolytic solution.

Experimental Examples 3-1 to 3-57

As presented in Tables 6 to 8, secondary batteries were fabricated and then the battery characteristics thereof were examined according to the same procedures as in Experimental Examples 1-1 to 1-57 except that the kind of negative electrode active material and the kind of electrolyte were changed.

In the case of fabricating the negative electrode 34, a negative electrode mixture was first prepared by mixing 90 parts by mass of a negative electrode active material (silicon, median diameter D50=5 μm), 5 parts by mass of a negative electrode binder (polyimide precursor), and 5 parts by mass of a negative electrode conductive agent (graphite) together. Subsequently, the negative electrode mixture was added to an organic solvent (N-methyl-2-pyrrolidone), and then the organic solvent was stirred to obtain a paste-like negative electrode mixture slurry. Subsequently, the negative electrode mixture slurry was applied to both surfaces of the negative electrode current collector 34A (15 μm thick strip-shaped copper foil) using a coating apparatus and then dried. Subsequently, the polyimide precursor was reacted by heating (heating temperature=400° C., heating time=12 hours) the negative electrode current collector 34A coated with the negative electrode mixture slurry in a vacuum atmosphere. The negative electrode active material layer 34B containing a negative electrode binder (polyimide) was thus formed.

Finally, the negative electrode active material layer 34B was compression-molded using a roll press.

As an electrolyte, the electrolyte layer 36 which was a gel-like electrolyte was used. In the case of forming the electrolyte layer 36, first an electrolyte salt ($LiPF_6$) was added to a solvent (ethylene carbonate and propylene carbonate), the solvent was stirred, then a sulfonamide compound was further added to the solvent, and the solvent was stirred. In this case, the mixing ratio (weight ratio) of solvent was set to ethylene carbonate:propylene carbonate=50:50. The content of electrolyte salt was set to 1 mol/kg with respect to the solvent. The kind of sulfonamide compound and the content (% by weight) of sulfonamide compound in the electrolytic solution are as presented in Tables 6 to 8.

Incidentally, for comparison, an electrolytic solution was prepared according to the same procedure except that a sulfonamide compound was not used. In addition, for comparison, an electrolytic solution was prepared according to the same procedure except that another compound (N-substituted sulfonamide compound) was used instead of a sulfonamide compound. The kind of another compound and the content (% by weight) of another compound in the electrolytic solution are as presented in Table 8.

Subsequently, a polymer compound (copolymer of vinylidene fluoride and hexafluoropropylene, copolymerized amount of hexafluoropropylene=6.9% by weight), the electrolytic solution, inorganic particles (aluminum oxide, median diameter D50=0.3 μm), and an organic solvent for dilution (dimethyl carbonate) were mixed together, and then the mixture was stirred to prepare a sol-like electrolyte solution. In this case, the mixing ratio (weight ratio) was set to polymer compound:electrolytic solution:inorganic particles=1:15:2.

Finally, the electrolyte solution was applied to the surface of the positive electrode 33 and then dried to form an electrolyte layer 36. In addition, the electrolyte solution was applied to the surface of the negative electrode 34 and then dried to form the electrolyte layer 36.

In the case of assembling a secondary battery, the positive electrode 34 on which the electrolyte layer 36 was formed and the negative electrode 34 on which the electrolyte layer 36 was formed were used.

TABLE 6

Negative electrode active material: silicon, Electrolyte: gel-like electrolyte (electrolyte layer)

| | Sulfonamide compound | | Other compounds | | |
|---|---|---|---|---|---|
| Experimental Example | Kind | Content (% by weight) | Kind | Content (% by weight) | Swelling percentage (%) |
| 3-1 | Formula (1-2) | 0.001 | — | — | 184 |
| 3-2 | | 0.01 | | | 181 |
| 3-3 | | 0.1 | | | 175 |
| 3-4 | | 1 | | | 182 |
| 3-5 | | 5 | | | 193 |
| 3-6 | | 10 | | | 198 |
| 3-7 | Formula (1-5) | 0.001 | — | — | 193 |
| 3-8 | | 0.01 | | | 186 |
| 3-9 | | 0.1 | | | 183 |
| 3-10 | | 1 | | | 188 |
| 3-11 | | 5 | | | 199 |
| 3-12 | | 10 | | | 210 |
| 3-13 | Formula (1-11) | 0.001 | — | — | 176 |
| 3-14 | | 0.01 | | | 173 |
| 3-15 | | 0.1 | | | 166 |
| 3-16 | | 1 | | | 175 |
| 3-17 | | 5 | | | 180 |
| 3-18 | | 10 | | | 190 |

TABLE 6-continued

Negative electrode active material: silicon, Electrolyte: gel-like electrolyte (electrolyte layer)

| | Sulfonamide compound | | Other compounds | | |
|---|---|---|---|---|---|
| Experimental Example | Kind | Content (% by weight) | Kind | Content (% by weight) | Swelling percentage (%) |
| 3-19 | Formula (1-12) | 0.001 | — | — | 177 |
| 3-20 | | 0.01 | | | 174 |
| 3-21 | | 0.1 | | | 169 |
| 3-22 | | 1 | | | 176 |
| 3-23 | | 5 | | | 184 |
| 3-24 | | 10 | | | 193 |

TABLE 7

Negative electrode active material: silicon, Electrolyte: gel-like electrolyte (electrolyte layer)

| | Sulfonamide compound | | Other compounds | | |
|---|---|---|---|---|---|
| Experimental Example | Kind | Content (% by weight) | Kind | Content (% by weight) | Swelling percentage (%) |
| 3-25 | Formula (1-15) | 0.001 | — | — | 179 |
| 3-26 | | 0.01 | | | 176 |
| 3-27 | | 0.1 | | | 173 |
| 3-28 | | 1 | | | 178 |
| 3-29 | | 5 | | | 188 |
| 3-30 | | 10 | | | 197 |
| 3-31 | Formula (1-21) | 0.001 | — | — | 195 |
| 3-32 | | 0.01 | | | 191 |
| 3-33 | | 0.1 | | | 184 |
| 3-34 | | 1 | | | 190 |
| 3-35 | | 5 | | | 198 |
| 3-36 | | 10 | | | 219 |
| 3-37 | Formula (1-22) | 0.001 | — | — | 209 |
| 3-38 | | 0.01 | | | 203 |
| 3-39 | | 0.1 | | | 200 |
| 3-40 | | 1 | | | 203 |
| 3-41 | | 5 | | | 210 |
| 3-42 | | 10 | | | 215 |
| 3-43 | Formula (1-25) | 0.001 | — | — | 192 |
| 3-44 | | 0.01 | | | 188 |
| 3-45 | | 0.1 | | | 183 |
| 3-46 | | 1 | | | 188 |
| 3-47 | | 5 | | | 197 |
| 3-48 | | 10 | | | 211 |

TABLE 8

Negative electrode active material: silicon, Electrolyte: gel-like electrolyte (electrolyte layer)

| | Sulfonamide compound | | Other compounds | | |
|---|---|---|---|---|---|
| Experimental Example | Kind | Content (% by weight) | Kind | Content (% by weight) | Swelling percentage (%) |
| 3-49 | Formula (1-26) | 0.001 | — | — | 191 |
| 3-50 | | 0.01 | | | 185 |
| 3-51 | | 0.1 | | | 192 |
| 3-52 | | 1 | | | 187 |
| 3-53 | | 5 | | | 197 |
| 3-54 | | 10 | | | 209 |
| 3-55 | — | — | — | — | 258 |
| 3-56 | — | — | Formula (2-2) | 1 | 224 |
| 3-57 | — | — | Formula (2-25) | 1 | 225 |

The same results as in Tables 1 to 3 were attained even in a case in which the kind of negative electrode active material and the kind of electrolyte were changed (Tables 6 to 8).

In other words, in a case in which a sulfonamide compound was used (Experimental Examples 3-1 to 3-54), the swelling percentage was greatly improved as compared to a case in which the sulfonamide compound was not used (Experimental Examples 3-55 to 3-57).

In detail, in a case in which a sulfonamide compound was not used but another compound (N-substituted sulfonamide compound) was used (Experimental Examples 3-56 and 3-57), the swelling percentage decreased as compared to a case in which neither a sulfonamide compound nor another compound was used (Experimental Example 3-55), but the proportion of swelling percentage decreased was only about 13% at the maximum.

In contrast, in a case in which a sulfonamide compound was used (Experimental Examples 3-1 to 31-54), the swelling percentage decreased as compared to a case in which neither a sulfonamide compound nor another compound was used (Experimental Example 3-55), and the proportion of swelling percentage decreased reached about 32% at the maximum.

Incidentally, in a case in which a sulfonamide compound was used, the swelling percentage fluctuated depending on the kind of sulfonamide compound and thus the proportion of swelling percentage decreased also fluctuated. However, the proportion of swelling percentage decreased reached about 21% at the minimum to be far higher than the proportion of swelling percentage decreased (=about 13%) in a case in which another compound was used.

Particularly in a case in which a sulfonamide compound was used, the swelling percentage sufficiently decreased when the content of sulfonamide compound in the electrolytic solution was 0.001% by weight to 10% by weight. In this case, the swelling percentage further decreased when the content of sulfonamide compound is 0.001% by weight to 5% by weight, and the swelling percentage still further decreased when the content of sulfonamide compound is 0.001% by weight to 1% by weight.

From the results presented in Tables 1 to 8, the swelling characteristics were improved when the electrolytic solution contained a sulfonamide compound. Consequently, excellent battery characteristics were attained in the secondary batteries.

The present technology has been described above with reference to an embodiment and Examples, but the present technology is not limited to the aspect described in an embodiment and Examples, and various modifications can be made.

Specifically, a case in which the battery structure of a secondary battery is a cylindrical type and a laminated film type has been described, but the battery structure of the secondary battery of the present technology is not particularly limited. Specifically, the battery structure of the secondary battery may be other battery structures such as a square type and a coin type.

Moreover, a case in which the battery element has a winding structure has been described, but the structure of the battery element in the secondary battery of the present technology is not particularly limited. Specifically, the battery element may have another structure such as a stacked structure.

In addition, a secondary battery (lithium ion secondary battery) in which the capacity of the negative electrode is attained by storage and release of lithium and a secondary battery (lithium metal secondary battery) in which the capacity of the negative electrode is attained by precipitation and dissolution of lithium have been described, but the principle by which the capacity of the negative electrode in the secondary battery of the present technology is attained is not particularly limited. Specifically, the secondary battery may be, for example, a secondary battery in which the capacity of the negative electrode is attained by the sum of the capacity due to storage and release of lithium and the capacity due to precipitation and dissolution of lithium by setting the capacity of a negative electrode material capable of storing and releasing lithium to be smaller than the capacity of the positive electrode.

Moreover, a case in which lithium was used as an electrode reactant has been described, but the present technology is not limited to this. The electrode reactant may be, for example, other group 1 elements in the extended periodic table such as sodium (Na) and potassium (K), group 2 elements in the extended periodic table such as magnesium (Mg) and calcium (Ca), or other light metals such as aluminum (Al). In addition, the electrode reactant may be an alloy containing any one kind or two or more kinds among the series of elements described above.

Incidentally, the effects described in the present specification are an illustration to the utmost and are not limited. Moreover, there may be other effects.

Incidentally, the present technology can also take the following configurations.

(1)
A secondary battery including:
a positive electrode;
a negative electrode; and
an electrolytic solution containing a sulfonamide compound represented by the following Formula (1):

[Chem. 20]

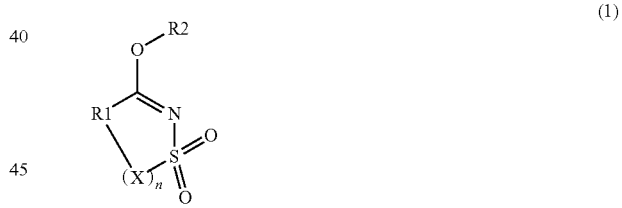

R1 represents either a divalent hydrocarbon group or a divalent halogenated hydrocarbon group. R2 represents any of a hydrogen group (—H), a monovalent hydrocarbon group, a monovalent nitrogen-containing hydrocarbon group, a monovalent oxygen-containing hydrocarbon group, a monovalent sulfur-containing hydrocarbon group, a monovalent halogenated hydrocarbon group, and a monovalent group in which two or more kinds among these groups are bonded to each other. X represents any of an ether bond (—O—), a thio bond (—S—), and an amine bond (—NR3-), where R3 represents either of a hydrogen group or a monovalent hydrocarbon group. n represents either 0 or 1.

(2)
The secondary battery according to (1), in which the divalent hydrocarbon group is any of an alkylene group, an alkenylene group, an alkynylene group, a cycloalkylene group, an arylene group, and a divalent group in which two or more kinds among these groups are bonded to each other, the divalent halogenated hydrocarbon group is a group in which at least one hydrogen group in the divalent hydrocarbon group is substituted with a halogen group, the monovalent hydrocarbon group is any of an alkyl group, an alkenyl group, an alkynyl group, a cycloalkyl group, an aryl group, and a monovalent group in which two or more among these groups are bonded to each other, the monovalent nitrogen-containing hydrocarbon group is any of a monovalent group in which the one monovalent hydrocarbon group and one or two or more monovalent nitrogen-containing groups are bonded to each other, a monovalent group in which one or two or more of the monovalent hydrocarbon groups and one or two or more of the amine bonds are bonded to each other, and a monovalent group in which two or more kinds among these groups are bonded to each other, the monovalent oxygen-containing hydrocarbon group is any of a monovalent group in which the one monovalent hydrocarbon group and one or two or more monovalent oxygen-containing groups are bonded to each other, a monovalent group in which one or two or more of the monovalent hydrocarbon groups and one or two or more of the ether bonds are bonded to each other, and a monovalent group in which two or more kinds among these groups are bonded to each other, the monovalent sulfur-containing hydrocarbon group is any of a monovalent group in which the one monovalent hydrocarbon group and one or two or more monovalent sulfur-containing groups are bonded to each other, a monovalent group in which one or two or more of the monovalent hydrocarbon groups and one or two or more of the thio bonds are bonded to each other, and a monovalent group in which two or more kinds among these groups are bonded to each other, and the monovalent halogenated hydrocarbon group is a group in which at least one hydrogen group in the monovalent hydrocarbon group is substituted with a halogen group, and the halogen group includes at least one kind among a fluorine group (—F), a chlorine group (—Cl), a bromine group (—Br), and an iodine group (—I).

(3)

The secondary battery according to (2), in which the monovalent nitrogen-containing group includes a cyano group (—CN), a nitro group (—NO$_2$), an amino group (—NH$_2$), an isocyanate group (—NCO), and an amide group (—CONH$_2$—), the monovalent oxygen-containing group includes a hydroxyl group (—OH), an aldehyde group (—CHO), and a carboxyl group (—COOH), and the monovalent sulfur-containing group includes a sulfonic acid group (—SO$_3$H) and a sulfonyl type group (—SO$_2$R: R represents a monovalent hydrocarbon group).

(4)

The secondary battery according to any one of (1) to (3), in which the divalent hydrocarbon group has 18 or less carbon atoms, and the monovalent hydrocarbon group has 18 or less carbon atoms.

(5)

The secondary battery according to any one of (1) to (4), in which a content of the sulfonamide compound in the electrolytic solution is 0.001% by weight or more and 10% by weight or less.

(6)

The secondary battery according to any one of (1) to (5), in which the electrolytic solution further contains an N-substituted sulfonamide compound represented by the following Formula (2):

[Chem. 21]

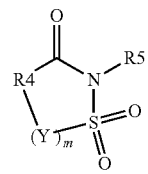

(2)

R4 represents either a divalent hydrocarbon group or a divalent halogenated hydrocarbon group. R5 represents any of a hydrogen group, a monovalent hydrocarbon group, and a monovalent halogenated hydrocarbon group. Y represents any of an ether bond, a thio bond, and an amine bond (—NR6-), where R6 represents either of a hydrogen group or a monovalent hydrocarbon group. m represents either 0 or 1.

(7)

The secondary battery according to any one of (1) to (6), in which the electrolytic solution further contains at least one kind among unsaturated cyclic carbonate esters represented by the following respective Formulas (3), (4), and (5):

[Chem. 22]

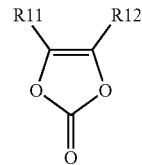

(3)

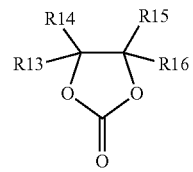

(4)

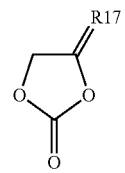

(5)

R11 and R12 each represent either a hydrogen group or an alkyl group. R13 to R16 each represent any of a hydrogen group, an alkyl group, a vinyl group, and an allyl group, and at least one of R13 to R16 represents either a vinyl group or an allyl group. R17 represents a group represented by =CR171R172, where R171 and R172 each represents either a hydrogen group or an alkyl group.

(8)

The secondary battery according to any one of (1) to (7), in which the electrolytic solution further contains at least one among halogenated carbonate esters represented by the following respective Formulas (6) and (7):

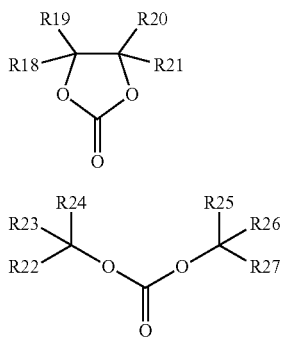

R18 to R21 each represent any of a hydrogen group, a halogen group, an alkyl group, and a halogenated alkyl group, and at least one of R18 to R21 represents either a halogen group or a halogenated alkyl group. R22 to R27 each represent any of a hydrogen group, a halogen group, an alkyl group, and a halogenated alkyl group, and at least one of R22 to R27 represents either a halogen group or a halogenated alkyl group.

(9) The secondary battery according to any one of (1) to (8), in which the electrolytic solution further contains a dinitrile compound represented by the following Formula (8):

R28 represents either an alkylene group or an arylene group.

(10) The secondary battery according to any one of (1) to (9), in which the electrolytic solution further contains an electrolyte salt, and the electrolyte salt contains at least one kind among lithium tetrafluoroborate (LiBF$_4$), lithium difluorophosphate (LiPF$_2$O$_2$), and lithium fluorophosphate (Li$_2$PFO$_3$).

(11) The secondary battery according to any one of (1) to (10), which is a lithium ion secondary battery.

(12) An electrolytic solution for secondary battery containing:

a sulfonamide compound represented by the following Formula (1):

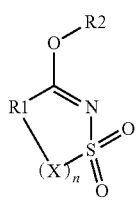

R1 represents either a divalent hydrocarbon group or a divalent halogenated hydrocarbon group. R2 represents any of a hydrogen group, a monovalent hydrocarbon group, a monovalent nitrogen-containing hydrocarbon group, a monovalent oxygen-containing hydrocarbon group, a monovalent sulfur-containing hydrocarbon group, a monovalent halogenated hydrocarbon group, and a monovalent group in which two or more kinds among these groups are bonded to each other. X represents any of an ether bond, a thio bond, and an amine bond (—NR3-), where R3 represents either of a hydrogen group or a monovalent hydrocarbon group. n represents either 0 or 1.

(13) A battery pack including:

the secondary battery according to any one of (1) to (11);

a controller that controls operation of the secondary battery; and a switch unit that switches the operation of the secondary battery in accordance with instruction from the controller.

(14) An electrically driven vehicle including:

the secondary battery according to any one of (1) to (11);

a converter that converts electric power supplied from the secondary battery into driving force;

a driving unit to be driven in accordance with the driving force; and a controller that controls operation of the secondary battery.

(15) An electric power storage system including:

the secondary battery according to any one of (1) to (11);

one or two or more electrical machinery and apparatuses to which electric power is supplied from the secondary battery; and a controller that controls electric power supply from the secondary battery to the electrical machinery and apparatuses.

(16) An electric tool including:

the secondary battery according to any one of (1) to (11); and a moving unit to which electric power is supplied from the secondary battery.

(17) An electronic device including:

the secondary battery according to any one of (1) to (11) as an electric power supply source.

This application is based upon and claims the benefit of priority of the prior Japanese Patent Application No. 2017-025963 filed on Feb. 15, 2017 at the Japan Patent Office, the entire contents of which are incorporated herein by reference.

Those skilled in the art can conceive of various modifications, combinations, sub-combinations, and changes depending on design requirements and other factors, but it is understood that they are intended to be included within the scope of the appended claims and their equivalents.

The invention claimed is:

1. A secondary battery comprising:

a positive electrode;

a negative electrode; and an electrolytic solution containing a sulfonamide compound represented by Formula (1) below:

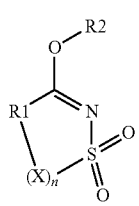

(1)

R1 represents either a divalent hydrocarbon group or a divalent halogenated hydrocarbon group; R2 represents any of a monovalent hydrocarbon group, a monovalent nitrogen-containing hydrocarbon group, a monovalent oxygen-containing hydrocarbon group, a monovalent sulfur-containing hydrocarbon group, a monovalent halogenated hydrocarbon group, and a monovalent group in which two or more kinds among these groups are bonded to each other; X represents any of an ether bond (—O—), a thio bond (—S—), and an amine bond (—NR3-), where R3 represents either of a hydrogen group or a monovalent hydrocarbon group; and n represents either 0 or 1.

2. The secondary battery according to claim 1, wherein
the divalent hydrocarbon group is any of an alkylene group, an alkenylene group, an alkynylene group, a cycloalkylene group, an arylene group, and a divalent group in which two or more kinds among these groups are bonded to each other,
the divalent halogenated hydrocarbon group is a group in which at least one hydrogen group in the divalent hydrocarbon group is substituted with a halogen group,
the monovalent hydrocarbon group is any of an alkyl group, an alkenyl group, an alkynyl group, a cycloalkyl group, an aryl group, and a monovalent group in which two or more among these groups are bonded to each other,
the monovalent nitrogen-containing hydrocarbon group is any of a monovalent group in which the one monovalent hydrocarbon group and one or two or more monovalent nitrogen-containing groups are bonded to each other, a monovalent group in which one or two or more of the monovalent hydrocarbon groups and one or two or more of the amine bonds are bonded to each other, and a monovalent group in which two or more kinds among these groups are bonded to each other,
the monovalent oxygen-containing hydrocarbon group is any of a monovalent group in which the one monovalent hydrocarbon group and one or two or more monovalent oxygen-containing groups are bonded to each other, a monovalent group in which one or two or more of the monovalent hydrocarbon groups and one or two or more of the ether bonds are bonded to each other, and a monovalent group in which two or more kinds among these groups are bonded to each other,
the monovalent sulfur-containing hydrocarbon group is any of a monovalent group in which the one monovalent hydrocarbon group and one or two or more monovalent sulfur-containing groups are bonded to each other, a monovalent group in which one or two or more of the monovalent hydrocarbon groups and one or two or more of the thio bonds are bonded to each other, and a monovalent group in which two or more kinds among these groups are bonded to each other, and
the monovalent halogenated hydrocarbon group is a group in which at least one hydrogen group in the monovalent hydrocarbon group is substituted with a halogen group, and the halogen group includes at least one kind among a fluorine group (—F), a chlorine group (—Cl), a bromine group (—Br), and an iodine group (—I).

3. The secondary battery according to claim 2, wherein
the monovalent nitrogen-containing group includes a cyano group (—CN), a nitro group (—NO$_2$), an amino group (—NH$_2$), an isocyanate group (—NCO), and an amide group (—CONH$_2$—),
the monovalent oxygen-containing group includes a hydroxyl group (—OH), an aldehyde group (—CHO), and a carboxyl group (—COOH), and
the monovalent sulfur-containing group includes a sulfonic acid group (—SO$_3$H) and a sulfonyl type group (—SO$_2$R: R represents a monovalent hydrocarbon group).

4. The secondary battery according to claim 1, wherein
the divalent hydrocarbon group has 18 or less carbon atoms, and
the monovalent hydrocarbon group has 18 or less carbon atoms.

5. The secondary battery according to claim 1, wherein a content of the sulfonamide compound in the electrolytic solution is 0.001% by weight or more and 10% by weight or less.

6. The secondary battery according to claim 1, wherein the electrolytic solution further contains an N-substituted sulfonamide compound represented by Formula (2) below:

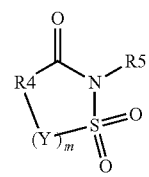

(2)

R4 represents either a divalent hydrocarbon group or a divalent halogenated hydrocarbon group; R5 represents any of a hydrogen group, a monovalent hydrocarbon group, and a monovalent halogenated hydrocarbon group; Y represents any of an ether bond, a thio bond, and an amine bond (—NR6-), where R6 represents either of a hydrogen group or a monovalent hydrocarbon group; and m represents either 0 or 1.

7. The secondary battery according to claim 1, wherein the electrolytic solution further contains at least one kind among unsaturated cyclic carbonate esters represented by respective Formulas (3), (4), and (5) below:

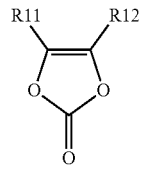

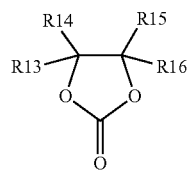

(4)

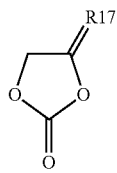 (5)

R11 and R12 each represent either a hydrogen group or an alkyl group; R13 to R16 each represent any of a hydrogen group, an alkyl group, a vinyl group, and an allyl group, and at least one of R13 to R16 represents either a vinyl group or an allyl group; and R17 represents a group represented by =CR171R172, where R171 and R172 each represents either a hydrogen group or an alkyl group.

8. The secondary battery according to claim 1, wherein the electrolytic solution further contains at least one among halogenated carbonate esters represented by respective Formulas (6) and (7) below:

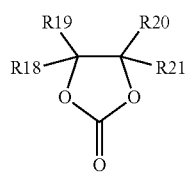 (6)

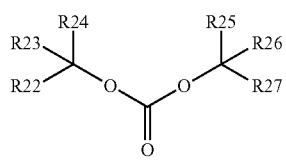 (7)

R18 to R21 each represent any of a hydrogen group, a halogen group, an alkyl group, and a halogenated alkyl group, and at least one of R18 to R21 represents either a halogen group or a halogenated alkyl group; and R22 to R27 each represent any of a hydrogen group, a halogen group, an alkyl group, and a halogenated alkyl group, and at least one of R22 to R27 represents either a halogen group or a halogenated alkyl group.

9. The secondary battery according to claim 1, wherein the electrolytic solution further contains a dinitrile compound represented by Formula (8) below:

NC-R28-CN          (8)

R28 represents either an alkylene group or an arylene group.

10. The secondary battery according to claim 1, wherein the electrolytic solution further contains an electrolyte salt, and
the electrolyte salt contains at least one kind among lithium tetrafluoroborate (LiBF$_4$), lithium difluorophosphate (LiPF$_2$O$_2$), and lithium fluorophosphate (Li$_2$PFO$_3$).

11. The secondary battery according to claim 1, which is a lithium ion secondary battery.

12. An electrolytic solution for secondary battery comprising:
a sulfonamide compound represented by Formula (1) below:

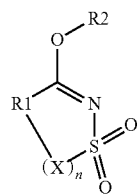 (1)

R1 represents either a divalent hydrocarbon group or a divalent halogenated hydrocarbon group; R2 represents any of a hydrogen group, a monovalent hydrocarbon group, a monovalent nitrogen-containing hydrocarbon group, a monovalent oxygen-containing hydrocarbon group, a monovalent sulfur-containing hydrocarbon group, a monovalent halogenated hydrocarbon group, and a monovalent group in which two or more kinds among these groups are bonded to each other, X represents any of an ether bond, a thio bond, and an amine bond (—NR3-), where R3 represents either of a hydrogen group or a monovalent hydrocarbon group; and n represents either 0 or 1.

13. A battery pack comprising:
a secondary battery;
a controller that controls operation of the secondary battery; and
a switch unit that switches the operation of the secondary battery in accordance with instruction from the controller, wherein
the secondary battery includes:
a positive electrode;
a negative electrode; and
an electrolytic solution containing a sulfonamide compound represented by Formula (1) below:

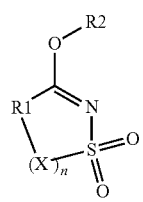 (1)

R1 represents either a divalent hydrocarbon group or a divalent halogenated hydrocarbon group; R2 represents any of a monovalent hydrocarbon group, a monovalent nitrogen-containing hydrocarbon group, a monovalent oxygen-containing hydrocarbon group, a monovalent sulfur-containing hydrocarbon group, a monovalent halogenated hydrocarbon group, and a monovalent group in which two or more kinds among these groups are bonded to each other, X represents any of an ether bond, a thio bond, and an amine bond (—NR3-), where R3 represents either of a hydrogen group or a monovalent hydrocarbon group; and n represents either 0 or 1.

14. An electrically driven vehicle comprising:
a secondary battery;
a converter that converts electric power supplied from the secondary battery into driving force;
a driving unit to be driven in accordance with the driving force; and
a controller that controls operation of the secondary battery, wherein the secondary battery includes:
 a positive electrode;
 a negative electrode; and
 an electrolytic solution containing a sulfonamide compound represented by Formula (1) below:

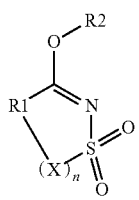

(1)

R1 represents either a divalent hydrocarbon group or a divalent halogenated hydrocarbon group; R2 represents any of a monovalent hydrocarbon group, a monovalent nitrogen-containing hydrocarbon group, a monovalent oxygen-containing hydrocarbon group, a monovalent sulfur-containing hydrocarbon group, a monovalent halogenated hydrocarbon group, and a monovalent group in which two or more kinds among these groups are bonded to each other, X represents any of an ether bond, a thio bond, and an amine bond (—NR3-), where R3 represents either of a hydrogen group or a monovalent hydrocarbon group; and n represents either 0 or 1.

15. An electric power storage system comprising:
 a secondary battery;
 one or two or more electrical machinery and apparatuses to which electric power is supplied from the secondary battery; and
 a controller that controls electric power supply from the secondary battery to the electrical machinery and apparatuses, wherein
 the secondary battery includes:
  a positive electrode;
  a negative electrode; and
  an electrolytic solution containing a sulfonamide compound represented by Formula (1) below:

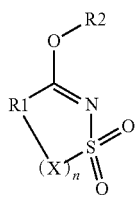

(1)

R1 represents either a divalent hydrocarbon group or a divalent halogenated hydrocarbon group; R2 represents any of a monovalent hydrocarbon group, a monovalent nitrogen-containing hydrocarbon group, a monovalent oxygen-containing hydrocarbon group, a monovalent sulfur-containing hydrocarbon group, a monovalent halogenated hydrocarbon group, and a monovalent group in which two or more kinds among these groups are bonded to each other, X represents any of an ether bond, a thio bond, and an amine bond (—NR3-), where R3 represents either of a hydrogen group or a monovalent hydrocarbon group; and n represents either 0 or 1.

16. An electric tool comprising:
 a secondary battery; and
 a moving unit to which electric power is supplied from the secondary battery, wherein
 the secondary battery includes:
  a positive electrode;
  a negative electrode; and
  an electrolytic solution containing a sulfonamide compound represented by Formula (1) below:

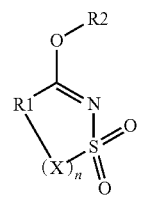

(1)

R1 represents either a divalent hydrocarbon group or a divalent halogenated hydrocarbon group; R2 represents any of a monovalent hydrocarbon group, a monovalent nitrogen-containing hydrocarbon group, a monovalent oxygen-containing hydrocarbon group, a monovalent sulfur-containing hydrocarbon group, a monovalent halogenated hydrocarbon group, and a monovalent group in which two or more kinds among these groups are bonded to each other, X represents any of an ether bond, a thio bond, and an amine bond (—NR3-), where R3 represents either of a hydrogen group or a monovalent hydrocarbon group; and n represents either 0 or 1.

17. An electronic device comprising:
 a secondary battery as an electric power supply source, wherein
 the secondary battery includes:
  a positive electrode;
  a negative electrode; and
  an electrolytic solution containing a sulfonamide compound represented by Formula (1) below:

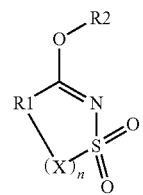

(1)

R1 represents either a divalent hydrocarbon group or a divalent halogenated hydrocarbon group; R2 represents any of a monovalent hydrocarbon group, a monovalent nitrogen-containing hydrocarbon group, a monovalent oxygen-containing hydrocarbon group, a monovalent sulfur-containing hydrocarbon group, a monovalent halogenated hydrocarbon group, and a monovalent group in which two or more kinds among these groups are bonded to each other, X represents any of an ether bond, a thio bond, and an amine bond (—NR3-), where R3 represents either of a hydrogen group or a monovalent hydrocarbon group; and n represents either 0 or 1.

* * * * *